(12) United States Patent
Zong et al.

(10) Patent No.: US 12,302,366 B2
(45) Date of Patent: *May 13, 2025

(54) COMMUNICATION METHOD AND APPARATUS, AND DEVICE

(71) Applicant: HUAWEI TECHNOLOGIES CO., LTD., Guangdong (CN)

(72) Inventors: Zaifeng Zong, Nanjing (CN); Fenqin Zhu, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/609,869

(22) Filed: Mar. 19, 2024

(65) Prior Publication Data

US 2024/0237033 A1    Jul. 11, 2024

Related U.S. Application Data

(63) Continuation of application No. 17/734,862, filed on May 2, 2022, now Pat. No. 11,968,694, which is a (Continued)

(30) Foreign Application Priority Data

Nov. 7, 2019    (CN) .................... 201911084275.7
May 13, 2020    (CN) .................... 202010403074.5

(51) Int. Cl.
*H04J 3/14*      (2006.01)
*H04L 12/18*      (2006.01)
(Continued)

(52) U.S. Cl.
CPC ........... *H04W 72/30* (2023.01); *H04L 12/185* (2013.01); *H04W 4/08* (2013.01); *H04W 28/0252* (2013.01)

(58) Field of Classification Search
CPC ... H04W 72/30; H04W 4/08; H04W 28/0252; H04W 76/40; H04W 4/06; H04L 12/185
(Continued)

(56) References Cited

U.S. PATENT DOCUMENTS 11,968,694 B2 *   4/2024   Zong .................... H04L 12/185
2013/0007287 A1    1/2013   Chu et al.
(Continued)

FOREIGN PATENT DOCUMENTS

CN      109391909 A     2/2019
CN      109699013 A     4/2019
(Continued)

OTHER PUBLICATIONS

Qualcomm Incorporated, "Solution: System Architecture Proposal for Objective B," SA WG2 Meeting #135, S2-1909903, Split, Croatia, Oct. 14-18, 2019, 4 pages.
(Continued)

*Primary Examiner* — Chuong T Ho
(74) *Attorney, Agent, or Firm* — Fish & Richardson P.C.

(57) ABSTRACT

Embodiments of this application provide a communication method and apparatus, and a device. An example method includes: A base station receives a first message from a first network device, the first message includes first indication information, and the first indication information indicates a multicast session. The base station sends radio bearer information corresponding to the multicast session to a terminal device based on the first message, where the first message includes information indicating the terminal device, and where the radio bearer information indicates to the terminal device to join the multicast session.

20 Claims, 20 Drawing Sheets

Related U.S. Application Data continuation of application No. PCT/CN2020/123095, filed on Oct. 23, 2020.

(51) Int. Cl.
*H04W 4/08* (2009.01)
*H04W 28/02* (2009.01)
*H04W 72/30* (2023.01)

(58) Field of Classification Search
USPC .......................................................... 370/230
See application file for complete search history.

(56) References Cited

U.S. PATENT DOCUMENTS

| | | | |
|---|---|---|---|
| 2014/0133383 | A1 | 5/2014 | Park |
| 2015/0350098 | A1 | 12/2015 | Du et al. |
| 2018/0123812 | A1 | 5/2018 | Hu |
| 2020/0092923 | A1 | 3/2020 | Abraham et al. |
| 2020/0260233 | A1 | 8/2020 | Yang et al. |
| 2020/0323024 | A1* | 10/2020 | Huang ................. H04L 12/185 |
| 2021/0076166 | A1 | 3/2021 | Navratil et al. |
| 2021/0234717 | A1 | 7/2021 | Speicher et al. |
| 2021/0392466 | A1 | 12/2021 | Liu et al. |
| 2022/0256505 | A1 | 8/2022 | Qi et al. |
| 2022/0322050 | A1 | 10/2022 | Xie et al. |
| 2022/0323024 | A1 | 10/2022 | Olsen |
| 2023/0081286 | A1 | 3/2023 | Liang et al. |

FOREIGN PATENT DOCUMENTS

| | | | |
|---|---|---|---|
| CN | 109769150 | A | 5/2019 |
| CN | 109936506 | A | 6/2019 |
| CN | 109982266 | A | 7/2019 |
| CN | 110012437 | A | 7/2019 |
| CN | 110366011 | A | 10/2019 |
| EP | 3700223 | A1 | 8/2020 |
| EP | 3723395 | A1 | 10/2020 |
| WO | 2019091456 | A1 | 5/2019 |
| WO | 2019101104 | A1 | 5/2019 |
| WO | 2019114938 | A1 | 6/2019 |
| WO | 2019129212 | A1 | 7/2019 |
| WO | 2019136128 | A1 | 7/2019 |

OTHER PUBLICATIONS

Huawei et al., "Overview of Rel-17 Work Areas for NR and LTE," 3GPP TSG RAN Meeting #84, RP-191007, Newport Beach, USA, Jun. 3-6, 2019, 22 pages.

3GPP TS 29.502 V16.1.1, "3rd Generation Partnership Project; Technical Specification Group Core Network and Terminals; 5G System; Session Management Services; Stage 3 (Release 16)," Oct. 2019, 186 pages.

Samsung, "5G MBMS Architecture," SA WG2 Meeting #128-bis, S2-187850, Sophia Antipolis, France, Aug. 20-24, 2018, 10 pages.

3GPP TS 38.413 V15.5.0, "3rd Generation Partnership Project; Technical Specification Group Radio Access Network; NG-RAN; NG Application Protocol (NGAP) (Release 15)," Sep. 2019, 329 pages.

Office Action in Chinese Appln. No. 202010403074.5, dated Jun. 1, 2022, 5 pages.

Office Action in Chinese Appln. No. 202010403074.5, dated Nov. 1, 2021, 28 pages (with English Translation).

Office Action in Chinese Appln. No. 202010403074.5, dated Mar. 11, 2022, 17 pages (with English Translation).

Extended European Search Report in European Appln No. 20884869.7, dated Oct. 20, 2022, 7 pages.

International Search Report and Written Opinion in International Appln. No. PCT/CN2020/123095, mailed on Jan. 20, 2021, 17 pages (with English translation).

* cited by examiner

COMMUNICATION METHOD AND APPARATUS, AND DEVICE

CROSS-REFERENCE TO RELATED APPLICATIONS

This application is a continuation of U.S. patent application Ser. No. 17/734,862, filed on May 2, 2022, which is a continuation of International Application No. PCT/CN2020/123095, filed on Oct. 23, 2020, which claims priority to Chinese Patent Application No. 201911084275.7, filed on Nov. 7, 2019, and Chinese Patent Application No. 202010403074.5, filed on May 13, 2020. All of the aforementioned patent applications are hereby incorporated by reference in their entireties.

TECHNICAL FIELD

This application relates to the field of communication technologies, and in particular, to a communication method and apparatus, and a device.

BACKGROUND

With development of the mobile Internet, many services (for example, a video viewing service and a video calling service) occupy lots of network resources.

Currently, when transmitting various service data to a terminal device, a network device usually sends the service data to the terminal device in a unicast manner. When a service occupies a large quantity of network resources, the network device consumes a large quantity of network resources to transmit data of the service to the terminal device. Consequently, frequency utilization is low.

SUMMARY

This application provides a communication method and apparatus, and a device, to improve resource utilization.

According to a first aspect, an embodiment of this application provides a communication method. A base station receives a first message from a first network device, and the base station sends radio bearer information corresponding to a multicast session to a terminal device based on the first message, where the first message is used to indicate to add the terminal device to the multicast session corresponding to a multicast service, the first message includes first indication information, the first indication information is used to indicate the multicast session, and the radio bearer information is used by the terminal device to join the multicast session.

In the foregoing process, the first network device may send the first message to the base station, so that the base station adds the terminal device to the multicast session corresponding to the multicast service based on the first message, and therefore service data can be sent to the terminal device in a multicast manner, to improve resource utilization.

In a possible implementation, the first message further includes second indication information, and the second indication information is used to indicate to add the terminal device to the multicast session.

In a possible implementation, the radio bearer information includes configuration information of a radio bearer corresponding to the multicast session, and the configuration information includes an identifier of the radio bearer and an identifier of a multicast quality of service (QOS) flow mapped to the radio bearer.

In a possible implementation, the base station determines a manner of receiving data of the multicast session by the terminal device.

When the manner of receiving the data of the multicast session by the terminal device is multicast, the radio bearer information further includes first information of the multicast session, and the first information is used to indicate radio resource information for sending and/or receiving the data of the multicast session.

In a possible implementation, when the base station has not established the multicast session corresponding to the multicast service, the base station sends a first request message to a second network device, where the first request message is used to request to establish the multicast session corresponding to the multicast service, and the first request message includes an identifier of the multicast service. The base station receives multicast information of the multicast service from the second network device. The base station determines the radio bearer information based on the multicast information.

In the foregoing process, when the base station has not established the multicast session corresponding to the multicast service, the base station may first obtain the multicast information, establish the multicast session based on the multicast information, and then add the terminal device to the multicast session.

In a possible implementation, the first request message further includes indication information used to indicate to establish the multicast session.

In a possible implementation, the base station further receives a second message from a second network device, where the second message is used to indicate the base station to establish the multicast session corresponding to the multicast service, and the second message includes multicast information of the multicast service. The base station establishes the multicast session based on the second message.

In a possible implementation, the second message further includes third indication information, and the third indication information is used to indicate the base station to establish the multicast session.

In a possible implementation, before the base station receives the second message from the second network device, the base station sends indication information to the second network device when the base station has not established the multicast session corresponding to the multicast service, where the indication information is used to indicate that the base station has no information about the multicast service.

In the foregoing process, when the base station has not established the multicast session corresponding to the multicast service, the base station sends the indication information to the second network device, so that the second network device learns that the multicast session corresponding to the multicast service has not been established on the base station.

In a possible implementation, the first message further includes the multicast information of the multicast service. Correspondingly, the base station establishes the multicast session based on the multicast information, and the base station determines the radio bearer information based on the multicast information.

In the foregoing process, when the first message includes the multicast information, the base station may establish the multicast session based on the first message. In other words, the base station may establish the multicast session without a message sent to the base station to indicate to establish the multicast session. This reduces signaling overheads.

In a possible implementation, when the base station has not established the multicast session corresponding to the multicast service, the base station establishes the multicast session based on the multicast information.

In the foregoing process, the base station establishes the multicast session only when the base station has not established the multicast session corresponding to the multicast service. This avoids establishing a duplicate multicast session.

In a possible implementation, the first message further includes fourth indication information, where the fourth indication information is used to indicate the base station to establish the multicast session corresponding to the multicast service. Correspondingly, the base station establishes the multicast session based on the multicast information and the fourth indication information.

In a possible implementation, the base station may send the first request message to the second network device in the following manner: The base station determines an access and mobility management function (AMF) network element serving the multicast session, and the base station sends the first request message to the second network device through the AMF network element.

In a possible implementation, the base station may determine, in the following manner, the AMF network element serving the multicast session: The base station determines the AMF network element based on at least one of location information of the base station or the identifier of the multicast service. Alternatively, the base station determines an AMF network element serving the terminal device as the AMF network element serving the multicast session.

In a possible implementation, the multicast information includes: quality of service (QoS) information of a multicast QoS flow of the multicast service and an identifier of the multicast QoS flow.

In a possible implementation, after the base station establishes the multicast session, the base station further allocates an identifier of the multicast session, and sends the identifier of the multicast session to the first network device or the second network device. Alternatively, the base station receives an identifier of the multicast session from the first network device or the second network device.

In a possible implementation, after the base station establishes the multicast session, the base station further sends user plane tunnel information of the multicast session on the base station to the first network device or the second network device.

In a possible implementation, after the terminal device successfully joins the multicast session, the base station sends, to a session management function (SMF) network element, indication information used to indicate that the terminal device successfully joins the multicast session.

In the foregoing process, after the indication information is sent to the SMF network element, the SMF network element may perform correct charging on the terminal device based on the indication information.

In a possible implementation, the identifier of the multicast service is a globally unique identifier of the multicast service or multicast address information of the multicast service.

In a possible implementation, the first network device is the SMF network element serving the terminal device, and the second network device is the SMF network element or a multicast control function (MCF) network element.

According to a second aspect, an embodiment of this application provides a communication method. An SMF network element receives a third message from a terminal device, where the third message is used to request a multicast service, and the third message includes an identifier of the multicast service. The SMF network element sends a first message to a base station, where the first message is used to indicate to add the terminal device to a multicast session corresponding to the multicast service, the first message includes first indication information, the first indication information is used to indicate the multicast session, and the base station is a base station accessed by the terminal device.

In the foregoing process, after the SMF network element receives the third message, the SMF network element sends the first message to the base station, so that the base station adds the terminal device to the multicast session corresponding to the multicast service based on the first message, and therefore service data can be sent to the terminal device in a multicast manner, to improve resource utilization.

In a possible implementation, the first message further includes second indication information, and the second indication information is used to indicate to add the terminal device to the multicast session.

In a possible implementation, the third message further includes indication information used to request the multicast service.

In a possible implementation, when the base station has established the multicast session corresponding to the multicast service, the SMF network element sends the first message to the base station.

In the foregoing process, the SMF network element sends the first message to the base station after determining that the base station has established the multicast session corresponding to the multicast service, to request the base station to add the terminal device to the corresponding multicast session.

In a possible implementation, the SMF network element sends a second message to the base station, where the second message is used to indicate the base station to establish the multicast session corresponding to the multicast service, and the second message includes multicast information of the multicast service.

In a possible implementation, when the base station has not established the multicast session corresponding to the multicast service, the SMF network element sends the second message to the base station, where the second message is used to indicate the base station to establish the multicast session corresponding to the multicast service.

In the foregoing process, the SMF network element sends the second message to the base station only when determining that the base station has not established the multicast session corresponding to the multicast service, to indicate the base station to establish the multicast session corresponding to the multicast service. This can avoid sending an unnecessary message to the base station, to reduce signaling overheads.

In a possible implementation, the second message further includes third indication information, and the third indication information is used to indicate the base station to establish the multicast session.

In a possible implementation, before the SMF network element sends the second message to the base station, the SMF network element receives a first request message from the base station, where the first request message includes the identifier of the multicast service, and the first request message is used to request the multicast information of the multicast service, or is used to request to establish the multicast session corresponding to the multicast service.

In the foregoing process, the SMF network element sends the second message to the base station only after the SMF network element receives the first request message from the base station, to indicate the base station to establish the multicast session corresponding to the multicast service. This can avoid sending an unnecessary message to the base station, to reduce signaling overheads.

In a possible implementation, the first message further includes the multicast information of the multicast service. Alternatively, the first message further includes the multicast information of the multicast service and fourth indication information, where the fourth indication information is used to indicate the base station to establish the multicast session.

In a possible implementation, when the base station has not established the multicast session corresponding to the multicast service, the first message further includes the multicast information of the multicast service, or the first message further includes the multicast information of the multicast service and the fourth indication information.

In the foregoing process, when the SMF network element determines that the base station has not established the multicast session corresponding to the multicast service, the SMF network element may include the multicast information of the multicast service in the first message, or include the multicast information of the multicast service and the fourth indication information in the first message, so that the base station may establish the multicast session based on the first message. In this way, the SMF network element does not need to send, to the base station, a message used to indicate to establish the multicast session, to reduce the signaling overheads.

In a possible implementation, the multicast information includes: quality of service (QOS) information of a multicast QoS flow of the multicast service and an identifier of the multicast QoS flow.

In a possible implementation, the SMF network element further obtains the multicast information according to a PCC rule of the multicast service. The PCC rule includes at least one of the following information: a multicast broadcast service identifier (MBS-ID) of the multicast service, description information of the multicast QoS flow of the multicast service, the identifier of the multicast QoS flow of the multicast service, the QoS information of the multicast QoS flow of the multicast service, a list of terminal devices supported by the multicast service, or a service range supported by the multicast service.

In a possible implementation, when the base station is located within the service range of the multicast service, the SMF network element sends the second message to the base station.

The foregoing process can avoid sending data of the multicast service to a terminal device outside the service range of the multicast service, where the sending violates the intention of a multicast service provider and causes unnecessary disputes.

In a possible implementation, the SMF network element further obtains policy information, where the policy information includes the service range of the multicast service. The SMF network element determines, based on the policy information and information about the base station, that the base station is located within the service range of the multicast service.

In a possible implementation, the SMF network element further obtains the information about the base station.

In a possible implementation, the SMF network element further obtains access control information, where the access control information includes any one of the list of terminal devices allowed to access the multicast service or a list of multicast services allowed to be accessed by the terminal device. Correspondingly, the SMF network element sends the first message when determining, based on the access control information, that the terminal is allowed to access the multicast service.

In the foregoing process, the SMF network element sends the first message to the base station only when the SMF network element determines that the terminal is allowed to access the multicast service. This avoids sending an unnecessary message to the base station.

In a possible implementation, the SMF network element obtains, from a first device, the multicast session that corresponds to the multicast service and that has been established by the base station, where the first device stores information about the established multicast session, and the information about the established multicast session includes at least one of the identifier of the multicast service corresponding to the established multicast session, an identifier of a base station corresponding to the established multicast session, an identifier of a serving SMF network element of the established multicast session, the multicast information of the multicast service, or an identifier of the established multicast session.

In a possible implementation, after the SMF network element determines that the base station has established the multicast session corresponding to the multicast service, the SMF network element sends fifth indication information to the first device, where the fifth indication information is used to indicate that the base station has established the multicast session corresponding to the multicast service.

In the foregoing process, after the SMF network element sends the fifth indication information to the first device, the first device may update, based on the fifth indication information, the information that is about the established multicast session and that is stored in the first device, to ensure accuracy of the information that is about the established multicast session and that is stored in the first device.

In a possible implementation, the SMF network element sends first identification information to an MCF network element, and the SMF network element receives the multicast information of the multicast service from the MCF network element, where the first identification information is a multicast address of the multicast service or an MBS-ID of the multicast service.

In a possible implementation, before the SMF network element sends the first message to the base station, the SMF network element sends a second request message to the MCF network element, where the second request message includes first identification information and identification information of the base station. The SMF network element receives a response message from the MCF network element, where the response message includes second identification information. The first identification information is a multicast address of the multicast service, and the second identification information is an MBS-ID of the multicast service. Alternatively, the first identification information is a multicast address of the multicast service or an MBS-ID of the multicast service, and the second identification information is the identifier of the multicast session or the MBS-ID of the multicast service.

In a possible implementation, the response message further includes the multicast information of the multicast service.

In a possible implementation, the second request message further includes an identifier of the terminal device, and the identifier of the terminal device is used by the MCF network element to determine whether the terminal device is allowed to perform the multicast service. Alternatively, the response message includes the list of terminal devices supported by the multicast service. Correspondingly, the SMF network element determines, based on the list of terminal devices supported by the multicast service, whether the terminal device is allowed to perform the multicast service.

In a possible implementation, the SMF network element selects the MCF network element based on at least one of the identifier of the multicast service or location information of the base station.

In a possible implementation, after the terminal device successfully joins the multicast session, the SMF network element receives, from the base station, indication information used to indicate that the terminal device successfully joins the multicast session.

In the foregoing process, after the SMF network element receives the indication information, the SMF network element may perform correct charging on the terminal device.

In a possible implementation, after the base station establishes the multicast session, the SMF network element receives, from the base station, user plane tunnel information of the multicast session on the base station. The SMF network element sends the user plane tunnel information of the multicast session on the base station to a user plane function (UPF) network element, and/or the SMF network element sends the user plane tunnel information of the multicast session on the base station or user plane tunnel information of the multicast session on the UPF network element to the MCF network element.

In the foregoing process, a downlink tunnel between the base station and the UPF network element or a MUF network element may be established, or a downlink tunnel among a MUF network element, the UPF network element, and the base station may be established, so that the data of the multicast service can be sent to the base station through the downlink tunnel.

In a possible implementation, after the base station establishes the multicast session, the SMF network element sends, to the MCF network element, information about a QoS flow that is successfully established and/or information about a QoS flow that fails to be established in the multicast session, where the information about the QoS flow includes an identifier of the QoS flow.

In the foregoing process, the MCF network element may perform correct charging on the multicast service based on the information about the QoS flow that is successfully established or fails to be established.

In a possible implementation, the identifier of the multicast service is the MBS-ID of the multicast service or the multicast address of the multicast service.

According to a third aspect, an embodiment of this application provides a communication method. An MCF network element receives location information of a terminal device and a first identifier of a multicast service from a session management function (SMF) network element. When a base station corresponding to the location information of the terminal device has not established a multicast session corresponding to the multicast service, the MCF network element sends a first request message to the base station, where the first request message is used to request to establish the multicast session.

In the foregoing process, after the SMF network element sends the location information of the terminal device and the first identifier of the multicast service to the MCF network element, the MCF network element may determine whether the base station corresponding to the location information of the terminal device has established the multicast session corresponding to the multicast service. In addition, when determining that the base station has not established the multicast session corresponding to the multicast service, the MCF network element may send the first request message to the base station, to request the base station to establish the multicast session corresponding to the multicast service, so that service data can be sent to the terminal device in a multicast manner, to improve resource utilization.

In a possible implementation, the first request message includes a second identifier of the multicast service.

In a possible implementation, the first request message further includes multicast information of the multicast service.

In a possible implementation, the first request message further includes indication information used to indicate the base station to establish the multicast session.

In a possible implementation, the multicast information includes: quality of service (QoS) information of a multicast QoS flow of the multicast service and an identifier of the multicast QoS flow.

In a possible implementation, the MCF network element may obtain the multicast information in the following manner: The MCF network element obtains the multicast information according to a policy and charging control (PCC) rule of the multicast service, where the PCC rule includes at least one of the following information: a multicast broadcast service identifier (MBS-ID) of the multicast service, description information of the multicast QoS flow of the multicast service, the identifier of the multicast QoS flow of the multicast service, the QoS information of the multicast QoS flow of the multicast service, a list of terminal devices supported by the multicast service, or location information supported by the multicast service.

In a possible implementation, after the MCF network element sends the first request message to the base station, the method further includes: The MCF network element receives user plane tunnel information of the multicast session on the base station. The MCF network element sends the user plane tunnel information of the multicast session on the base station to a MUF network element, where the user plane tunnel information is used to establish a user plane tunnel between the MUF network element and the base station.

In a possible implementation, after the MCF network element sends the first request message to the base station, the MCF network element receives user plane tunnel information of the multicast session on a user plane function (UPF) network element. The MCF network element sends the user plane tunnel information of the multicast session on the UPF network element to the MUF network element, where the user plane tunnel information is used to establish a user plane tunnel between the MUF network element and the UPF network element.

In a possible implementation, after the base station establishes the multicast session, the MCF network element receives an identifier of the multicast session from the base station, or the MCF network element allocates an identifier to the multicast session, and sends the identifier of the multicast session to the base station.

In a possible implementation, the MCF network element sends the identifier of the multicast session or the second identifier of the multicast service to the SMF network element.

In a possible implementation, the MCF network element sends the multicast information of the multicast service to the SMF network element.

In a possible implementation, the MCF network element further receives an identifier of the terminal device from the SMF network element, and the MCF network element obtains access control information of the terminal device based on the identifier of the terminal device, where the access control information includes any one of the list of terminal devices allowed to access the multicast service or a list of multicast services allowed to be accessed by the terminal device. When the MCF network element determines, based on the access control information, that the terminal device is allowed to perform the multicast service, the MCF network element sends the identifier of the multicast session or the second identifier of the multicast service to the SMF network element.

In the foregoing process, the MCF network element sends the identifier of the multicast session or the second identifier of the multicast service to the SMF network element only when determining that the terminal device is allowed to perform the multicast service. This can avoid sending an unnecessary message to the SMF network element, to reduce signaling overheads.

In a possible implementation, the first identifier of the multicast service is the MBS-ID of the multicast service or multicast address information corresponding to the multicast service, and the second identifier of the multicast service is the MBS-ID of the multicast service.

According to a fourth aspect, an embodiment of this application provides a communication method. A first network device receives a first request message from a base station, where the first request message includes a first identifier of a multicast service, and the first request message is used to establish a multicast session of the multicast service on the base station. When the base station is located within a service range of the multicast service, the first network device establishes the multicast session corresponding to the multicast service.

In the foregoing process, after the first network device receives the first request message from the base station, the first network device determines whether the base station is located within the service range of the multicast service. When determining that the base station is located within the service range of the multicast service, the first network device establishes the multicast session corresponding to the multicast service, so that service data can be sent to a terminal device in a multicast manner, to improve resource utilization.

In a possible implementation, the first network device may determine, in the following manner, that the base station is located within the service range of the multicast service: The first network device obtains policy information, where the policy information includes the service range of the multicast service. The first network device determines, based on information about the base station, that the base station is located within the service range of the multicast service.

In a possible implementation, before the first network device determines whether the base station is located within the service range of the multicast service, the first network device further obtains the information about the base station.

According to a fifth aspect, an embodiment of this application provides a communication method. An AMF network element receives a first request message from a base station, where the first request message is used to request to establish a multicast session for a multicast service, the first request message includes user plane tunnel information of the multicast session on the base station, and the user plane tunnel information is used to establish a user plane tunnel between the base station and a user plane function (UPF) network element. The AMF network element sends a second request message to a first network element, where the second request message is used to request the first network element to establish the multicast session, and the second request message includes the user plane tunnel information of the multicast session on the base station.

In the foregoing process, after the AMF network element receives the first request message from the base station, the AMF network element sends the second request message to the first network element, to request the first network element to establish the multicast session, so that service data can be sent to a terminal device in a multicast manner, to improve resource utilization.

In a possible implementation, the first request message and/or the second request message further include/includes indication information used to indicate to establish the multicast session.

In a possible implementation, before the AMF network element sends the second request message to the first network element, the AMF network element determines the first network element based on at least one of an identifier of the base station or an identifier of the multicast service.

In a possible implementation, when the first network element is a multicast control function (MCF) network element, the AMF network element selects an SMF network element based on at least one of the identifier of the base station or the identifier of the multicast service. The AMF network element sends the user plane tunnel information of the multicast session on the base station to the SMF network element. The AMF network element receives user plane tunnel information of the multicast session on the UPF network element from the SMF network element. The AMF network element sends the user plane tunnel information of the multicast session on the UPF network element to the MCF network element.

According to a sixth aspect, an embodiment of this application provides a communication apparatus, including a receiving module and a sending module.

The receiving module is configured to receive a first message from a first network device, where the first message is used to indicate to add a terminal device to a multicast session corresponding to a multicast service, the first message includes first indication information, and the first indication information is used to indicate the multicast session.

The sending module is configured to send radio bearer information corresponding to the multicast session to the terminal device based on the first message, where the radio bearer information is used by the terminal device to join the multicast session.

In a possible implementation, the first message further includes second indication information, and the second indication information is used to indicate to add the terminal device to the multicast session.

In a possible implementation, the radio bearer information includes configuration information of a radio bearer corresponding to the multicast session, and the configuration information includes an identifier of the radio bearer and an identifier of a multicast quality of service (QOS) flow mapped to the radio bearer.

In a possible implementation, the apparatus further includes a processing module.

The processing module is configured to determine a manner of receiving data of the multicast session by the terminal device.

When the manner of receiving the data of the multicast session by the terminal device is multicast, the radio bearer information further includes first information of the multicast session, and the first information is used to indicate radio resource information for sending and/or receiving the data of the multicast session.

In a possible implementation, the sending module is further configured to: when a base station has not established the multicast session corresponding to the multicast service, send a first request message to a second network device, where the first request message is used to request to establish the multicast session corresponding to the multicast service, and the first request message includes an identifier of the multicast service.

The receiving module is further configured to receive multicast information of the multicast service from the second network device.

The processing module is further configured to determine the radio bearer information based on the multicast information.

In a possible implementation, the first request message further includes indication information used to indicate to establish the multicast session.

In a possible implementation, the receiving module is further configured to receive a second message from a second network device, where the second message is used to indicate a base station to establish the multicast session corresponding to the multicast service, and the second message includes multicast information of the multicast service.

The processing module is further configured to establish the multicast session based on the second message.

In a possible implementation, the second message further includes third indication information, and the third indication information is used to indicate the base station to establish the multicast session.

In a possible implementation, the sending module is further configured to send indication information to the second network device when the base station has not established the multicast session corresponding to the multicast service, where the indication information is used to indicate that the base station has no information about the multicast service.

In a possible implementation, the first message further includes the multicast information of the multicast service, and the processing module is further configured to:
establish the multicast session based on the multicast information; and
determine the radio bearer information based on the multicast information.

In a possible implementation, the processing module is specifically configured to: when the base station has not established the multicast session corresponding to the multicast service, establish, the multicast session based on the multicast information.

In a possible implementation, the first message further includes fourth indication information, where the fourth indication information is used to indicate the base station to establish the multicast session corresponding to the multicast service.

The processing module is specifically configured to establish the multicast session based on the multicast information and the fourth indication information.

In a possible implementation, the processing module is further configured to determine an access and mobility management function (AMF) network element serving the multicast session.

The sending module is further configured to send the first request message to the second network device through the AMF network element.

In a possible implementation, the processing module is specifically configured to:
determine the AMF network element based on at least one of location information of the base station or the identifier of the multicast service; or
determine an AMF network element serving the terminal device as the AMF network element serving the multicast session.

In a possible implementation, the multicast information includes: quality of service (QoS) information of a multicast QoS flow of the multicast service and an identifier of the multicast QoS flow.

In a possible implementation, the processing module is further configured to allocate an identifier of the multicast session. The sending module is further configured to send the identifier of the multicast session to the first network device or the second network device.

Alternatively, the receiving module is further configured to receive an identifier of the multicast session from the first network device or the second network device.

In a possible implementation, the sending module is further configured to send user plane tunnel information of the multicast session on the base station to the first network device or the second network device.

In a possible implementation, the sending module is further configured to send, to a session management function (SMF) network element, indication information used to indicate that the terminal device successfully joins the multicast session.

In a possible implementation, the identifier of the multicast service is a globally unique identifier of the multicast service or multicast address information of the multicast service.

In a possible implementation, the first network device is an SMF network element serving the terminal device, and the second network device is the SMF network element or a multicast control function (MCF) network element.

According to a seventh aspect, an embodiment of this application provides a communication apparatus, including a receiving module and a sending module.

The receiving module is configured to receive a third message from a terminal device, where the third message is used to request a multicast service, and the third message includes an identifier of the multicast service.

The sending module is configured to send a first message to a base station, where the first message is used to indicate to add the terminal device to a multicast session corresponding to the multicast service, the first message includes first indication information, the first indication information is used to indicate the multicast session, and the base station is a base station accessed by the terminal device.

In a possible implementation, the first message further includes second indication information, and the second indication information is used to indicate to add the terminal device to the multicast session.

In a possible implementation, the third message further includes indication information used to request the multicast service.

In a possible implementation, the sending module is specifically configured to:
when the base station has established the multicast session corresponding to the multicast service, send the first message to the base station.

In a possible implementation, the sending module is further configured to:
send a second message to the base station, where the second message is used to indicate the base station to establish the multicast session corresponding to the multicast service, and the second message includes multicast information of the multicast service.

In a possible implementation, the sending module is specifically configured to:

when the base station has not established the multicast session corresponding to the multicast service, send the second message to the base station, where the second message is used to indicate the base station to establish the multicast session corresponding to the multicast service.

In a possible implementation, the second message further includes third indication information, and the third indication information is used to indicate the base station to establish the multicast session.

In a possible implementation, the receiving module is further configured to receive a first request message from the base station, where the first request message includes the identifier of the multicast service, and the first request message is used to request the multicast information of the multicast service, or is used to request to establish the multicast session corresponding to the multicast service.

In a possible implementation, the first message further includes the multicast information of the multicast service.

Alternatively, the first message further includes the multicast information of the multicast service and fourth indication information, where the fourth indication information is used to indicate the base station to establish the multicast session.

In a possible implementation, when the base station has not established the multicast session corresponding to the multicast service, the first message further includes the multicast information of the multicast service, or the first message further includes the multicast information of the multicast service and the fourth indication information.

In a possible implementation, the multicast information includes: quality of service (QoS) information of a multicast QoS flow of the multicast service and an identifier of the multicast QoS flow.

In a possible implementation, the apparatus further includes a processing module.

The processing module is further configured to obtain the multicast information according to a PCC rule of the multicast service.

The PCC rule includes at least one of the following information: a multicast broadcast service identifier (MBS-ID) of the multicast service, description information of the multicast QoS flow of the multicast service, the identifier of the multicast QoS flow of the multicast service, the QoS information of the multicast QoS flow of the multicast service, a list of terminal devices supported by the multicast service, or a service range supported by the multicast service.

In a possible implementation, the sending module is specifically configured to send the second message to the base station when the base station is located within the service range of the multicast service.

In a possible implementation, the processing module is specifically configured to:

obtain policy information, where the policy information includes the service range of the multicast service; and determine, based on information about the base station, that the base station is located within the service range of the multicast service.

In a possible implementation, the processing module is further configured to: obtain the information about the base station.

In a possible implementation, the processing module is further configured to obtain access control information, where the access control information includes any one of the list of terminal devices allowed to access the multicast service or a list of multicast services allowed to be accessed by the terminal device.

The sending module is specifically configured to send the first message when the communication apparatus determines, based on the access control information, that the terminal is allowed to access the multicast service.

In a possible implementation, the processing module is further configured to obtain, from a first device, the multicast session that corresponds to the multicast service and that has been established by the base station.

The first device stores information about the established multicast session, and the information about the established multicast session includes at least one of the identifier of the multicast service corresponding to the established multicast session, an identifier of a base station corresponding to the established multicast session, an identifier of a serving SMF network element of the established multicast session, the multicast information of the multicast service, or an identifier of the established multicast session.

In a possible implementation, the sending module is further configured to send fifth indication information to the first device, where the fifth indication information is used to indicate that the base station has established the multicast session corresponding to the multicast service.

In a possible implementation, the sending module is further configured to send a second request message to an MCF network element, where the second request message includes first identification information and identification information of the base station.

The receiving module is further configured to receive a response message from the MCF network element, where the response message includes second identification information.

The first identification information is a multicast address of the multicast service, and the second identification information is an MBS-ID of the multicast service. Alternatively, the first identification information is a multicast address of the multicast service or an MBS-ID of the multicast service, and the second identification information is the identifier of the multicast session or the MBS-ID of the multicast service.

In a possible implementation, the second request message further includes an identifier of the terminal device, and the identifier of the terminal device is used by the MCF network element to determine whether the terminal device is allowed to perform the multicast service.

Alternatively, the response message includes the list of terminal devices supported by the multicast service, and the processing module is further configured to determine, based on the list of terminal devices supported by the multicast service, whether the terminal device is allowed to perform the multicast service.

In a possible implementation, the processing module is further configured to select the MCF network element based on at least one of the identifier of the multicast service or location information of the base station.

In a possible implementation, the receiving module is further configured to receive, from the base station, indication information used to indicate that the terminal device successfully joins the multicast session.

In a possible implementation, the receiving module is further configured to receive, from the base station, user plane tunnel information of the multicast session on the base station.

The sending module is further configured to send the user plane tunnel information of the multicast session on the base station to a user plane function (UPF) network element, and/or send the user plane tunnel information of the multicast session on the base station or user plane tunnel information of the multicast session on the UPF network element to the MCF network element.

In a possible implementation, the sending module is further configured to send, to the MCF network element, information about a QoS flow that is successfully established and/or information about a QoS flow that fails to be established in the multicast session, where the information about the QoS flow includes an identifier of the QoS flow.

In a possible implementation, the identifier of the multicast service is the MBS-ID of the multicast service or the multicast address of the multicast service.

According to an eighth aspect, an embodiment of this application provides a communication apparatus, including a receiving module and a sending module.

The receiving module is configured to receive location information of a terminal device and a first identifier of a multicast service from a session management function (SMF) network element.

The sending module is configured to: when a base station corresponding to the location information of the terminal device has not established a multicast session corresponding to the multicast service, send a first request message to the base station, where the first request message is used to request to establish the multicast session, and the first request message includes a second identifier of the multicast service and multicast information of the multicast service.

In a possible implementation, the first request message further includes indication information used to indicate the base station to establish the multicast session.

In a possible implementation, the multicast information includes: quality of service (QoS) information of a multicast QoS flow of the multicast service and an identifier of the multicast QoS flow.

In a possible implementation, the apparatus further includes a processing module.

The processing module is configured to obtain the multicast information according to a policy and charging control (PCC) rule of the multicast service.

The PCC rule includes at least one of the following information: a multicast broadcast service identifier (MBS-ID) of the multicast service, description information of the multicast QoS flow of the multicast service, the identifier of the multicast QoS flow of the multicast service, the QoS information of the multicast QoS flow of the multicast service, a list of terminal devices supported by the multicast service, or location information supported by the multicast service.

In a possible implementation, the receiving module is further configured to receive user plane tunnel information of the multicast session on the base station.

The sending module is further configured to send the user plane tunnel information of the multicast session on the base station to a MUF network element, where the user plane tunnel information is used to establish a user plane tunnel between the MUF network element and the base station.

In a possible implementation, the receiving module is further configured to receive user plane tunnel information of the multicast session on a user plane function (UPF) network element.

The sending module is further configured to send the user plane tunnel information of the multicast session on the UPF network element to the MUF network element, where the user plane tunnel information is used to establish a user plane tunnel between the MUF network element and the UPF network element.

In a possible implementation, the receiving module is further configured to receive an identifier of the multicast session from the base station.

Alternatively, the MCF network element allocates an identifier to the multicast session, and sends the identifier of the multicast session to the base station.

In a possible implementation, the sending module is further configured to send a response message to the SMF network element, where the response message includes the identifier of the multicast session or the second identifier of the multicast service.

In a possible implementation, the receiving module is further configured to receive an identifier of the terminal device from the SMF network element.

The processing module is further configured to obtain access control information of the terminal device based on the identifier of the terminal device, where the access control information includes any one of the list of terminal devices allowed to access the multicast service or a list of multicast services allowed to be accessed by the terminal device.

The sending module is further configured to: when the communication apparatus determines, based on the access control information, that the terminal device is allowed to perform the multicast service, send the identifier of the multicast session or the second identifier of the multicast service to the SMF network element.

In a possible implementation, the first identifier of the multicast service is the MBS-ID of the multicast service or multicast address information corresponding to the multicast service.

The second identifier of the multicast service is the MBS-ID of the multicast service.

According to a ninth aspect, an embodiment of this application provides a communication apparatus, including a receiving module and a processing module.

The receiving module is configured to receive a first request message from a base station, where the first request message includes a first identifier of a multicast service, and the first request message is used to establish a multicast session of the multicast service on the base station.

The processing module is configured to: when the base station is located within a service range of the multicast service, establish the multicast session corresponding to the multicast service.

In a possible implementation, the processing module is further configured to:
  obtain policy information, where the policy information includes the service range of the multicast service; and
  determine, based on information about the base station, that the base station is located within the service range of the multicast service.

In a possible implementation, the processing module is further configured to:
  obtain the information about the base station.

According to a tenth aspect, an embodiment of this application provides a communication apparatus, including a receiving module and a sending module.

The receiving module is configured to receive a first request message from a base station, where the first request message is used to request to establish a multicast session for a multicast service, the first request message includes user plane tunnel information of the multicast session on the base station, and the user plane tunnel information is used to establish a user plane tunnel between the base station and a user plane function (UPF) network element.

The sending module is configured to send a second request message to a first network element, where the second request message is used to request the first network element to establish the multicast session, and the second request message includes the user plane tunnel information of the multicast session on the base station.

In a possible implementation, the first request message and/or the second request message further include/includes indication information used to indicate to establish the multicast session.

In a possible implementation, the apparatus further includes a processing module.

The processing module is configured to determine the first network element based on at least one of an identifier of the base station or an identifier of the multicast service.

In a possible implementation, the first network element is a multicast control function (MCF) network element.

The processing module is further configured to select an SMF network element based on at least one of the identifier of the base station or the identifier of the multicast service.

The sending module is further configured to send the user plane tunnel information of the multicast session on the base station to the SMF network element.

The receiving module is further configured to receive user plane tunnel information of the multicast session on the UPF network element from the SMF network element.

The sending module is further configured to send the user plane tunnel information of the multicast session on the UPF network element to the MCF network element.

According to an eleventh aspect, an embodiment of this application provides a communication apparatus, including a memory and a processor. The processor executes program instructions in the memory, to implement the communication method according to any implementation of the first aspect.

According to a twelfth aspect, an embodiment of this application provides a communication apparatus, including a memory and a processor. The processor executes program instructions in the memory, to implement the communication method according to any implementation of the second aspect.

According to a thirteenth aspect, an embodiment of this application provides a communication apparatus, including a memory and a processor. The processor executes program instructions in the memory, to implement the communication method according to any implementation of the third aspect.

According to a fourteenth aspect, an embodiment of this application provides a communication apparatus, including a memory and a processor. The processor executes program instructions in the memory, to implement the communication method according to any implementation of the fourth aspect.

According to a fifteenth aspect, an embodiment of this application provides a communication apparatus, including a memory and a processor. The processor executes program instructions in the memory, to implement the communication method according to any implementation of the fifth aspect.

According to a sixteenth aspect, an embodiment of this application provides a computer program product. The computer program product includes instructions; and when the instructions are executed, a computer is enabled to perform the communication method according to any implementation of the first aspect.

According to a seventeenth aspect, an embodiment of this application provides a computer program product. The computer program product includes instructions; and when the instructions are executed, a computer is enabled to perform the communication method according to any implementation of the second aspect.

According to an eighteenth aspect, an embodiment of this application provides a computer program product. The computer program product includes instructions; and when the instructions are executed, a computer is enabled to perform the communication method according to any implementation of the third aspect.

According to a nineteenth aspect, an embodiment of this application provides a computer program product. The computer program product includes instructions; and when the instructions are executed, a computer is enabled to perform the communication method according to any implementation of the fourth aspect.

According to a twentieth aspect, an embodiment of this application provides a computer program product. The computer program product includes instructions; and when the instructions are executed, a computer is enabled to perform the communication method according to any implementation of the fifth aspect.

According to a twenty-first aspect, an embodiment of this application provides a system-on-a-chip or a system chip. The system-on-a-chip or the system chip may be used in a base station, and includes at least one communication interface, at least one processor, and at least one memory. The communication interface, the memory, and the processor are interconnected via a bus, and the processor executes instructions stored in the memory, so that the base station can perform the communication method according to any implementation of the first aspect of this application.

According to a twenty-second aspect, an embodiment of this application provides a system-on-a-chip or a system chip. The system-on-a-chip or the system chip may be used in an SMF network element, and includes at least one communication interface, at least one processor, and at least one memory. The communication interface, the memory, and the processor are interconnected via a bus, and the processor executes instructions stored in the memory, so that the SMF network element can perform the communication method according to any implementation of the second aspect of this application.

According to a twenty-third aspect, an embodiment of this application provides a system-on-a-chip or a system chip. The system-on-a-chip or the system chip may be used in an MCF network element, and includes at least one communication interface, at least one processor, and at least one memory. The communication interface, the memory, and the processor are interconnected via a bus, and the processor executes instructions stored in the memory, so that the MCF network element can perform the communication method according to any implementation of the third aspect of this application.

According to a twenty-fourth aspect, an embodiment of this application provides a system-on-a-chip or a system chip. The system-on-a-chip or the system chip may be used in a first network device, where the first network device may be an SMF network element or an MCF network element.

The system-on-a-chip or the system chip includes at least one communication interface, at least one processor, and at least one memory. The communication interface, the memory, and the processor are interconnected via a bus, and the processor executes instructions stored in the memory, so that the first network device can perform the communication method according to any implementation of the fourth aspect of this application.

According to a twenty-fifth aspect, an embodiment of this application provides a system-on-a-chip or a system chip. The system-on-a-chip or the system chip may be used in an AMF network element, and includes at least one communication interface, at least one processor, and at least one memory. The communication interface, the memory, and the processor are interconnected via a bus, and the processor executes instructions stored in the memory, so that the AMF network element can perform the communication method according to any implementation of the fifth aspect of this application.

According to a twenty-sixth aspect, an embodiment of this application provides a communication system. The communication system includes at least two of the communication apparatuses described in the eleventh aspect to the fifteenth aspect.

According to the communication method and apparatus and the device provided in embodiments of this application, the first network device may send the first message to the base station, so that the base station adds the terminal device to the multicast session corresponding to the multicast service based on the first message, and therefore the service data can be sent to the terminal device in the multicast manner, to improve the resource utilization.

DESCRIPTION OF EMBODIMENTS

Technical solutions in this application may be applied to a 5th generation mobile communication technology (5G) system, may be applied to a long term evolution (LTE) system, or may be applied to a universal mobile telecommunications system (UMTS) terrestrial radio access network (UTRAN) system or a global system for mobile communications (GSM)/enhanced data rates for GSM evolution (EDGE) radio access network (GSM/EDGE radio access network, GERAN) architecture. For example, the technical solutions may be applied to a vehicle-to-everything (vehicle-to-X, V2X) system, a device-to-device (D2D) system, or a machine type communication (MTC) system in 5G systems.

The technical solutions in this application may be further applied to another communication system, for example, an evolved communication system in the 5G systems. This is not limited in this application.

The following describes in detail the technical solutions in this application by using an example in which a communication system used in this application is a 5G communication system.

Figure 1A:
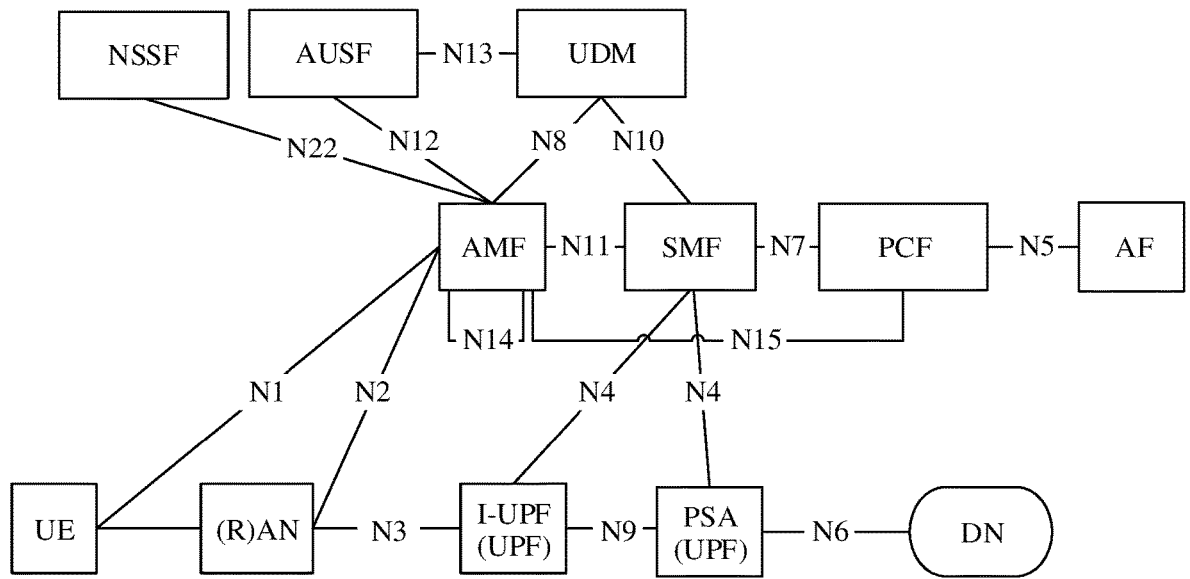
FIG. 1A is a diagram of an architecture of a 5G communication system according to an embodiment of this application.

FIG. 1A is a diagram of an architecture of a 5G communication system according to an embodiment of this application. Refer to FIG. 1A. The system includes user equipment (UE), an access network (AN) node, an intermediate user plane function (I-UPF) network element, a protocol data unit session anchor user plane function (PSA-UPF) network element, a data network (DN), an access and mobility management function (AMF) network element, a session management function (SMF) network element, a policy control function (PCF) network element, an application function (AF) network element, a network slice selection function (NSSF) network element, an authentication server function (AUSF) network element, and a unified data management (UDM) network element.

The UE may be a mobile phone (or referred to as a "cellular" phone) or a computer having a mobile terminal. For example, the UE may be a portable, pocket-sized, handheld, computer built-in, or in-vehicle mobile apparatus. In addition, the UE may also be referred to as a mobile station (MS), a terminal, or a terminal device. This is not limited in this application.

The AN node may be a device that provides wireless access for the UE, and includes but is not limited to an evolved NodeB (eNB for short), a wireless fidelity access point (Wi-Fi AP for short), a worldwide interoperability for microwave access base station (WiMAX BS for short), a base station (for example, a gNodeB, gNB) in a 5G network, and the like. The AN node may alternatively be a radio access network (RAN) node.

The I-UPF network element is located on a user plane path of a protocol data unit (PDU) session, and is separately connected to the AN node and the protocol data unit session anchor user plane function (PSA-UPF) network element. The I-UPF network element may transmit an uplink/downlink user plane data packet between the PSA-UPF network element and the AN node.

The PSA-UPF network element is an anchor UPF network element of the PDU session. The PSA-UPF network element may send uplink user plane data to the DN, and send, to a downstream node (for example, the I-UPF network element or the AN node) through a tunnel corresponding to the PDU session, downlink user plane data that is to be sent by the DN to the UE.

The DN is configured to provide a data service for the UE, and may be an access destination of the protocol data unit (PDU) session of a user.

The AMF network element may perform mobility management such as user location update, user network registration, and user handover in a mobile network. The AMF network element may access non-access stratum (NAS) signaling (including session management (SM) signaling) of the UE through an N1 interface and access signaling of a RAN through an N2 interface, to complete a registration procedure of the user, forwarding of the SM signaling, and the mobility management. The AMF network element may forward a message between the SMF network element and the UE.

The SMF network element may perform session management such as session establishment, session modification, and session release in the mobile network.

The PCF network element may manage user policies, including mobility-related policies and PDU session-related policies, such as a quality of service (QOS) policy and a charging policy.

The AF network element may send a request to affect a routing policy of the SMF, and is responsible for selecting and relocating an application in the local DN.

The NSSF network element is configured to select a network slice.

The AUSF network element provides an authentication service function, and is configured to perform authentication and authorization on the terminal device.

The UDM network element may store information such as user subscription data.

A person skilled in the art may understand that, characters on connection lines between the network elements in FIG. 1A identify communication interfaces between the network elements.

The 5G communication system shown in FIG. 1A does not support a multicast service. To enable the 5G communication system to support the multicast service, the architecture of the 5G communication system shown in FIG. 1A may be extended. The following describes a structure of an extended 5G communication system with reference to FIG. 1B to FIG. 1D. The multicast service in embodiments of this application is a multicast broadcast service.

Figure 1B:
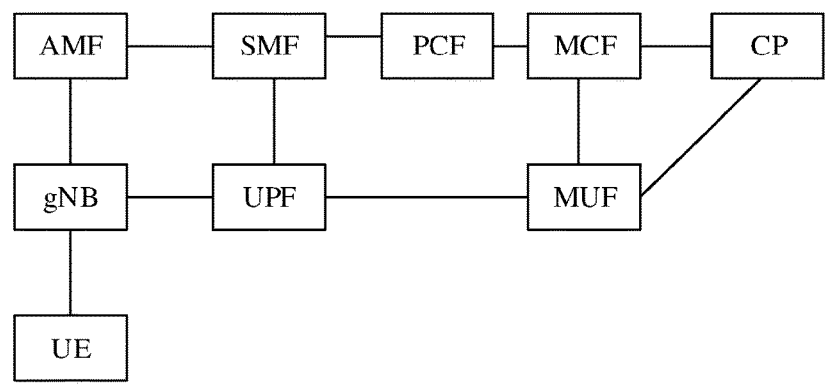
FIG. 1B is a diagram of an architecture of another 5G communication system according to an embodiment of this application.

FIG. 1B is a diagram of an architecture of another 5G communication system according to an embodiment of this application. Refer to FIG. 1B. A multicast control function (MCF) network element and a multicast user plane function (MUF) network element are added based on the architecture of the 5G communication system shown in FIG. 1A. FIG. 1B further shows a content provider (CP). It should be noted that, for ease of understanding and description, FIG. 1B shows only some network elements in FIG. 1A. Certainly, FIG. 1B may further include another network element in FIG. 1A. This is not specifically limited in this embodiment of this application.

The MCF network element may control a multicast service. There is a communication interface between the MCF network element and the CP, so that the MCF network element can receive multicast service information (for example, a description of the multicast service) from the CP. There is a communication interface between the MCF network element and the PCF network element, so that the PCF network element can establish a resource for the multicast service.

The multicast service information may include description information of the multicast service. Optionally, the multicast service information further includes information about the terminal device, for example, one or more identifiers of one or more terminal devices that are allowed (or request) to join the multicast service or an identifier of a terminal device group.

Optionally, the description information of the multicast service includes description information of one or more multicast service flows. The description information of the multicast service flow may include at least one of the following content: feature information of the multicast service flow, a bandwidth requirement of the multicast service flow, a priority of the multicast service flow, a QoS requirement (for example, a jitter, a latency, or a packet loss rate) of the multicast service flow, or the like. The feature information of the multicast service flow may include a multicast address, a destination port number, a source address, or the like of the multicast service.

The MUF network element may transmit a multicast packet. For example, the MUF network element may send a multicast packet received from the CP to the UPF network element.

In the architecture of the communication system shown in FIG. 1B, the MCF network element may be integrated into the PCF network element, and the MUF network element may be integrated into the UPF network element. This is not limited in this embodiment of this application.

Figure 1C:
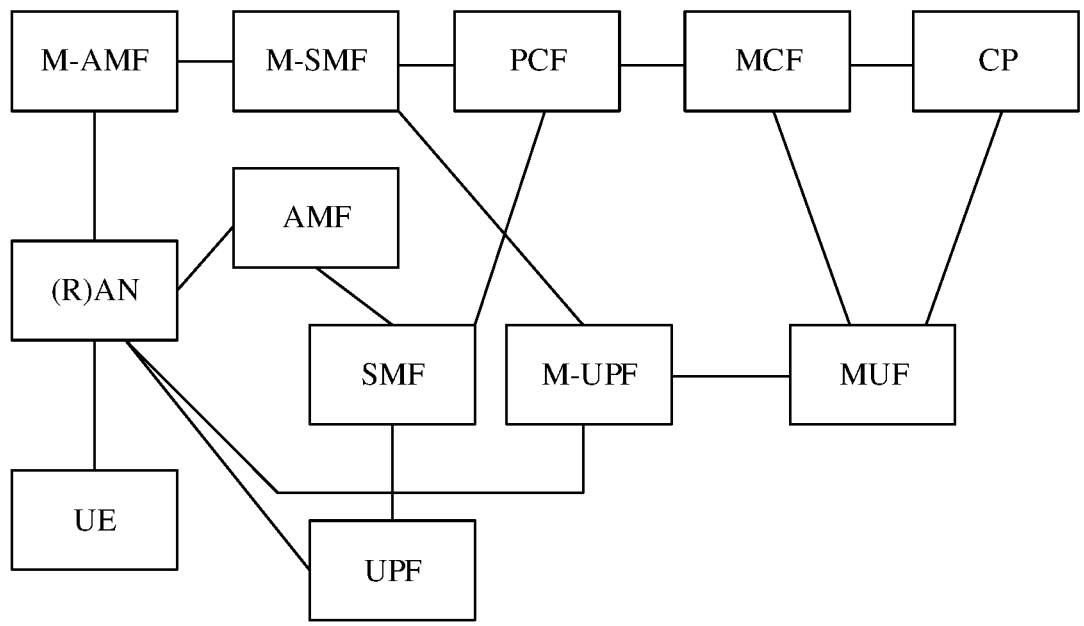
FIG. 1C is a diagram of an architecture of still another 5G communication system according to an embodiment of this application.

FIG. 1C is a diagram of an architecture of still another 5G communication system according to an embodiment of this application. Refer to FIG. 1C. An MCF network element, a MUF network element, a multicast broadcast service (M)-AMF network element, an M-SMF network element, an M-PCF network element, and an M-UPF network element are added based on the architecture of the 5G communication system shown in FIG. 1A. FIG. 1C further shows a CP network element. It should be noted that, for ease of understanding and description, FIG. 1C shows only some network elements in FIG. 1A. Certainly, FIG. 1C may further include another network element in FIG. 1A. This is not specifically limited in this embodiment of this application.

In FIG. 1C, the AMF network element, the SMF network element, and the UPF network element are network elements that provide services for the UE. The UPF is only responsible for transmitting data of a unicast service of the UE. Data of a multicast service is sent to the UE through the MUF network element, the M-UPF network element, and the (R)AN node. The M-SMF network element, the M-AMF network element, and the M-PCF network element are configured to manage a resource of the multicast service. For example, the M-PCF network element formulates QoS of the multicast service based on a service description of the MCF network element, and the M-SMF network element and the M-AMF network element are configured to establish a multicast session on the (R)AN node. There is a communication interface (not shown in FIG. 1C) between the SMF network element and the MCF network element, or there is a communication interface (not shown in FIG. 1C) between the SMF network element and the M-PCF network element.

In FIG. 1C, the SMF network element and the AMF network element may also allocate the resource to the multicast service. In actual deployment, the M-SMF network element and the M-AMF network element may serve the UE, or may not serve the UE. For example, when the M-SMF network element and the M-AMF network element manage the multicast service, the M-SMF network element and the M-AMF network element do not necessarily serve the UE that is receiving the multicast service.

The M-SMF network element may be configured to manage the multicast session, for example, establish the multicast session, modify the multicast session, or release the multicast session. The M-AMF network element may be configured to transmit a multicast session-related message between the M-SMF and a base station.

Figure 1D:
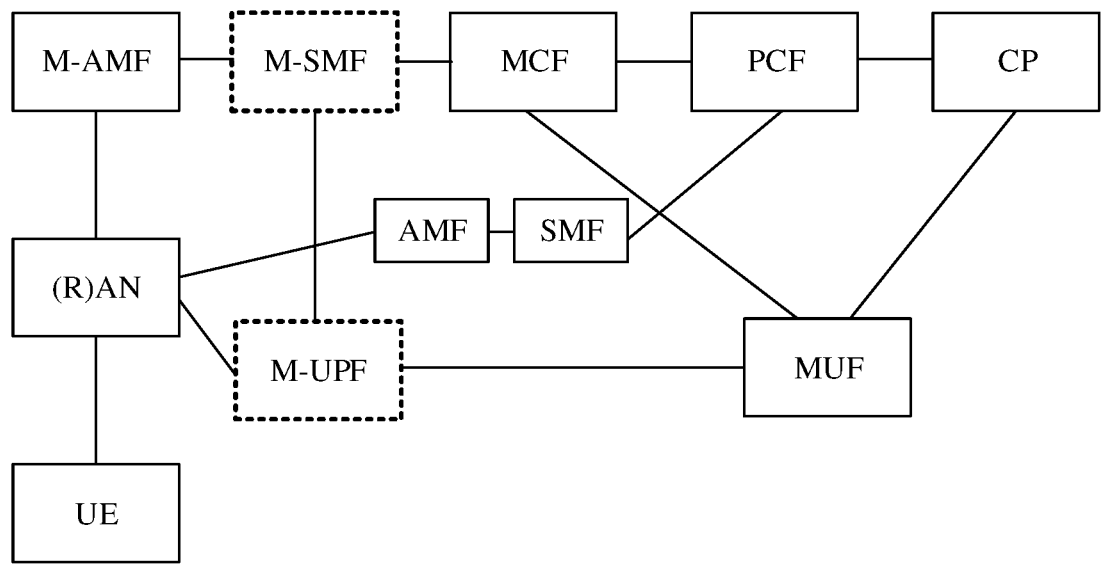
FIG. 1D is a diagram of an architecture of yet another 5G communication system according to an embodiment of this application.

FIG. 1D is a diagram of an architecture of yet another 5G communication system according to an embodiment of this application. Refer to FIG. 1D. An MCF network element, a MUF network element, an M-AMF network element, an M-SMF network element, and an M-UPF network element are added based on the architecture of the 5G communication system shown in FIG. 1A. FIG. 1D further shows a CP. It should be noted that, for ease of understanding and description, FIG. 1D shows only some network elements in FIG. 1A. Certainly, FIG. 1D may further include another network element in FIG. 1A. This is not specifically limited in this embodiment of this application.

In FIG. 1D, a function of the MCF network element is similar to that of the SMF network element, and the MCF network element may manage a multicast service. When the MCF network element has the function of the SMF network element, the MCF network element may also provide a service for a session of the UE. This is not limited in this embodiment of this application.

In FIG. 1D, there is a communication interface between the CP and each of the PCF network element and a network exposure function (NEF) network element (not shown in FIG. 1D), so that the CP can send multicast service information to the PCF network element. If there is the communication interface between the CP and the NEF network element, the CP first sends the multicast service information to the NEF network element, and then the NEF network element sends the multicast service information to the PCF network element. The MCF network element may obtain a policy and charging control (PCC) rule corresponding to the multicast service from the PCF network element, to establish a multicast session for the multicast service.

The MCF network element may interface with a base station through the M-AMF network element, and the M-AMF network element may also provide a service for the UE. The SMF network element serving the UE may interface with the PCF network element, so that the SMF network element can obtain multicast service-related information from the PCF network element.

The network elements in FIG. 1A to FIG. 1D may be network elements implemented on special-purpose hardware, or may be software instances running on special-purpose hardware or instances of virtualized functions on an appropriate platform. For example, a virtualization platform may be a cloud platform.

It should be noted that FIG. 1B to FIG. 1D are merely examples used to illustrate an architecture of a communication system usable in this application, and are not intended to limit the architecture of the communication system usable in this application.

For ease of understanding, concepts in this application are described below.

Multicast service: which includes a multicast-type service or a broadcast-type service, namely, a multicast service or a broadcast service. For example, the multicast service may be a live television program.

Multicast session: a session established for a multicast service, where the session is used to send data of the multicast service from a core network node (for example, a UPF network element) to an node. The multicast session may be used to transmit the data of the multicast service to a plurality of terminal devices. For example, the core network device may send the data of the multicast service to the AN node through the multicast session, and the AN node sends the data of the multicast service to one or more terminal devices. Specifically, multicast sessions may be established for a multicast service on different AN nodes.

Radio bearer information: which may include an identifier of a radio bearer and an identifier of a multicast QoS flow mapped to the radio bearer. The multicast QoS flow mapped to the radio bearer may be a multicast QoS flow sent on the radio bearer. The identifier of the multicast QoS flow may be a multicast QoS flow identifier (QFI).

When a base station sends data to a terminal device in a multicast manner, the radio bearer information may further include first information of a multicast session, where the first information is used to indicate radio resource information for sending and/or receiving data of the multicast session. The terminal device may obtain the radio resource information based on the first information, and then receive the data of the multicast session based on the radio resource information. The first information may be a radio network temporary identifier (RNTI) allocated to the multicast session.

The radio resource information may include frequency and time information used for sending or receiving the data.

Multicast information of a multicast service: which may include information about a multicast QoS flow used to transmit data of the multicast service, for example, QoS information of the multicast QoS flow of the multicast service and a QFI corresponding to the multicast QoS flow.

Embodiments of this application provide a communication method based on the architectures of the communication systems shown in FIG. 1B to FIG. 1D. In the communication method, a network device may enable a terminal device to access a multicast service, so that the network device can send service data to the terminal device in a multicast manner, to improve resource utilization.

Specific embodiments are used below to describe in detail the technical solutions in this application. It should be noted that the following several embodiments may exist alone or may be combined with each other. Same or similar content such as explanations and description of terms or nouns and steps may be mutually referenced in different embodiments, and no repeated description is provided.

Figure 2:
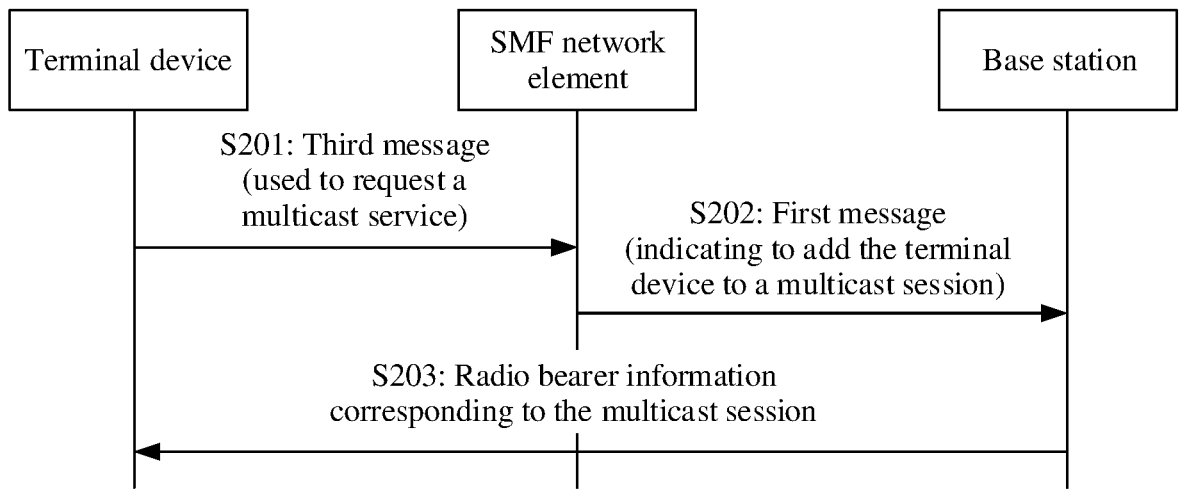
FIG. 2 is a schematic flowchart of a communication method according to an embodiment of this application.

With reference to FIG. 2, the following describes a process of adding a terminal device to a multicast session corresponding to a multicast service.

FIG. 2 is a schematic flowchart of a communication method according to an embodiment of this application. Refer to FIG. 2. The method may include the following steps.

S201: The terminal device sends a third message to an SMF network element.

The third message may be used to request the multicast service. In an example, a name of the third message has the function of requesting the multicast service. For example, the name is a multicast service request message.

In another example, the third message includes indication information used to request the multicast service, and the indication information may correspond to a preset field in the third message. For example, when a value of the preset field is a preset value, the preset field may be used to indicate to request the multicast service.

The third message may include an identifier of the multicast service. The identifier of the multicast service is used to identify the multicast service, and may be a globally unique identifier of the multicast service or a multicast address of the multicast service. This is not limited. The identifier of the multicast service may uniquely indicate the multicast service. For example, a carrier network may allocate a unique identifier of the multicast service to the multicast service, and the unique identifier may be a multicast broadcast service identifier (MBS-ID).

S202: The SMF network element sends a first message to a base station.

Specifically, in step S202, the SMF network element may send the first message to the base station based on the third message in step S201.

The base station may be a base station accessed by the terminal device, namely, a serving base station of the terminal device.

The first message may be used to indicate to add the terminal device to the multicast session corresponding to the multicast service.

In an example, a message name of the first message has the function of indicating to add the terminal device to the multicast session corresponding to the multicast service. For example, the message name is a multicast service joining command.

In another example, the first message includes second indication information, and the second indication information is used to indicate to add the terminal device to the multicast session. The second indication information in the first message may correspond to a preset field in the first message. For example, when a value of the preset field is a preset value, the preset field may be used to indicate to add the terminal device to the multicast session.

The first message may include first indication information, and the first indication information is used to indicate the multicast session corresponding to the multicast service.

Optionally, the first indication information includes an identifier of the multicast session. For example, the identifier of the multicast session may be an identifier of an N2 signaling connection.

Optionally, the first indication information includes the identifier of the multicast service.

Specifically, the SMF network element may send the first message to the base station through an AMF network element. For example, the SMF network element may first send a fourth message to the AMF network element, and then the AMF network element sends the first message and an identifier of the terminal device to the base station. The fourth message includes a second identifier of the terminal device. For example, the second identifier is a subscriber permanent identifier (SUPI) of the terminal device, and the identifier of the terminal device may be a RAN UE next generation application protocol (NGAP) ID and/or a PDU session ID. The fourth message includes information transparently sent by the AMF network element to the base station, and the information may be located in a transparent container. For example, the transparent container of the fourth message may include the first message.

S203: The base station sends radio bearer information corresponding to the multicast session to the terminal device based on the first message.

The radio bearer information may be used by the terminal device to join the multicast session. In other words, the radio bearer information may be used by the terminal device to receive data of the multicast session.

Optionally, the first message is a trigger condition for the base station to send the radio bearer information corresponding to the multicast session to the terminal device. For example, after receiving the first message, the base station sends the radio bearer information corresponding to the multicast session to the terminal device.

Optionally, before the base station sends the radio bearer information corresponding to the multicast session to the terminal device, the base station has established the multicast session. If the base station has not established the multicast session, the base station may first establish the multicast session, and then send the radio bearer information corresponding to the multicast session to the terminal device.

Optionally, in S203, the base station may first obtain multicast information of the multicast service based on the first message, and then determine the radio bearer information based on the multicast information of the multicast service. For example, the base station determines, based on one or more QFIs of one or more QoS flows and a QoS parameter corresponding to each QoS flow that are included in the multicast information, a quantity of radio bearers required by the multicast service and a QoS parameter corresponding to a QoS flow mapped to each radio bearer. The base station determines a configuration parameter of the radio bearer (for example, a maximum bandwidth corresponding to the bearer) based on the QoS parameter of the QoS flow mapped to the radio bearer, and the base station further determines a media access control (MAC) layer configuration parameter, a radio link control (RLC) layer configuration parameter, and a packet data convergence protocol (PDCP) layer configuration parameter that correspond to the radio bearer. For example, the MAC layer configuration parameter may include a logical channel identifier corresponding to the radio bearer. The RLC layer configuration parameter may include a transmission mode (for example, an acknowledged mode or an unacknowledged mode). The PDCP layer configuration parameter may include whether to support header compression or the like. For obtaining the multicast information by the base station, refer to a method used in each implementation scenario of this embodiment, and details are not described again.

Optionally, the foregoing method further includes: The base station identifies the terminal device as a terminal device having joined the multicast session. For example, the base station may add the identifier of the terminal device to a context of the multicast session.

The base station may send data to the terminal device in a multicast manner or a unicast manner. When the base station sends the data to the terminal device in the unicast manner, the radio bearer information may include an identifier of the radio bearer and an identifier of the multicast QoS flow mapped to the radio bearer. Alternatively, when the base station sends the data to the terminal device in the multicast manner, the radio bearer information may further include first information of the multicast session, where the first information is used to indicate radio resource information for sending and/or receiving the data of the multicast session. Further, the terminal device may obtain the radio resource information based on the first information, and receive the data of the multicast session based on the radio resource information.

Optionally, the foregoing method further includes:

The base station determines a manner of receiving the data of the multicast session by the terminal device.

Specifically, the base station may determine, based on strength of a radio signal received by the terminal device, a quantity of terminal devices that join the multicast service, and the like, a manner of sending the data to the terminal device. For example, when the strength of the radio signal received by the terminal device is weak (for example, is lower than a preset threshold), the base station may send the data to the terminal device in the unicast manner. For another example, when the strength of the radio signal received by the terminal device is sufficiently strong (for example, is higher than a preset threshold), the base station may send the data to the terminal device in the multicast manner. For another example, when a plurality of terminal devices whose signals are sufficiently strong (for example, are higher than a preset threshold) join the multicast service, the data may be sent to the terminal device in the multicast manner.

According to the communication method provided in this embodiment of this application, after the SMF network element receives the third message sent by the terminal device to request the multicast service, the SMF network element sends the first message to the base station, so that the base station adds the terminal device to the multicast session corresponding to the multicast service based on the first message, and therefore service data can be sent to the terminal device in the multicast manner, to improve resource utilization.

Optionally, the foregoing method further includes:

The base station sends, to the session management function (SMF) network element, indication information used to indicate that the terminal device successfully joins the multicast session, for example, an identifier of a QoS flow in the multicast session that the terminal successfully joins.

The SMF network element may perform charging on the terminal device based on the indication information used to indicate that the terminal device successfully joins the multicast session.

Optionally, when the terminal device needs to be added to the multicast session corresponding to the multicast service, the multicast session corresponding to the multicast service further needs to be established on the base station.

Optionally, in a first method for establishing the multicast session, the foregoing method further includes:

The SMF network element sends a second message to the base station, where the second message may be used to indicate the base station to establish the multicast session corresponding to the multicast service, and the second message includes the multicast information of the multicast service.

Correspondingly, the base station establishes the multicast session based on the second message.

The second message may further include third indication information, and the third indication information is used to indicate the base station to establish the multicast session.

According to the communication method provided in this embodiment of this application, the SMF network element may send the second message to the base station, so that the base station establishes the corresponding multicast session for the multicast service based on the second message, and then may add the terminal device to the multicast session, to send the data of the multicast service to the terminal device in the multicast manner. This improves the resource utilization.

In an example, that the SMF network element sends a second message to the base station may include or be replaced with:

When the base station has not established the multicast session corresponding to the multicast service, the SMF network element sends the second message to the base station.

The second message may be used to indicate the base station to establish the multicast session corresponding to the multicast service.

Optionally, in an implementation, the SMF network element determines that the base station has not established the multicast session corresponding to the multicast service, and sends the second message when determining that the base station has not established the multicast session corresponding to the multicast service.

The SMF network element obtains, from a first device, the multicast session that corresponds to the multicast service and that has been established by the base station.

The first device stores information about the established multicast session, and the information about the established multicast session includes at least one of the identifier of the multicast service corresponding to the established multicast session, an identifier of a base station corresponding to the established multicast session, an identifier of a serving SMF network element of the established multicast session, the multicast information of the multicast service, or the identifier of the established multicast session.

If the base station has established the multicast session corresponding to the multicast service, the first device sends the information about the multicast session to the SMF network element, or notifies the SMF network element that the base station has established the multicast session corresponding to the multicast service. Alternatively, if the base station has not established the multicast session corresponding to the multicast service, the first device indicates that the multicast session is not found, or indicates that the multicast session has not been established.

Before sending the second message to the base station, the SMF network element may first determine whether the base station has established the multicast session corresponding to the multicast service, to avoid a waste of resources caused by establishing a plurality of different multicast sessions for a same multicast service by the base station.

Optionally, in an implementation method, before the SMF network element sends the second message to the base station, the foregoing method may further include:

The SMF network element receives a first request message from the base station.

The first request message may include the identifier of the multicast service.

The first request message may be used to request the multicast information of the multicast service, or the first request message may be used to request to establish the multicast session corresponding to the multicast service.

The SMF network element may send the second message after the base station sends the first request message. In this way, the SMF network element may send the second message only when determining that the base station has not established the multicast session corresponding to the multicast service. This can avoid a waste of resources caused by unnecessary sending of the second message.

In another example, that the SMF network element sends a second message to the base station may include or be replaced with:

When the base station is located within a service range of the multicast service, the SMF network element sends the second message to the base station.

This can avoid sending the data of the multicast service to a terminal device outside the service range of the multicast service, where the sending violates the intention of a multicast service provider and causes unnecessary disputes.

Further, the foregoing method may further include:

The SMF network element obtains policy information, where the policy information includes the service range of the multicast service.

The SMF network element determines, based on information about the base station, that the base station is located within the service range of the multicast service.

It should be noted that, that the base station is located within the service range of the multicast service may mean that there is an intersection between a service range of the base station and the service range of the multicast service.

The intersection may mean that the service range of the multicast service includes the service range of the base station, the service range of the multicast service partially or completely overlaps the service range of the base station, or the service range of the base station includes the service range of the multicast service. This is not limited.

Further, the method may further include:

The SMF network element obtains the information about the base station.

The information about the base station may be identification information, for example, a TAI of a TA in which the base station is located, an identifier of the base station, or a cell identifier of the base station. This is not limited.

Specifically, the SMF network element may obtain the information about the base station from the AMF network element. For example, the SMF network element may subscribe to location information of the terminal device from the AMF network element. When a location of the terminal device changes, for example, when the terminal device moves from one base station to another base station, the AMF network element may send the location information of the terminal device to the SMF network element.

Further, the foregoing method may further include:

The SMF network element sends first identification information to an MCF network element or an M-SMF network element, and the SMF network element receives the multicast information of the multicast service from the MCF network element or the M-SMF network element, where the first identification information is the multicast address of the multicast service or the MBS-ID of the multicast service.

Optionally, in a second method for establishing the multicast session corresponding to the multicast service, the first message further includes the multicast information of the multicast service.

Correspondingly, the base station may establish the multicast session corresponding to the multicast service based on the multicast information of the multicast service. Alternatively, when the base station has not established the multicast session corresponding to the multicast service, the base station establishes the multicast session based on the multicast information.

Further, the first message may further include fourth indication information, where the fourth indication information is used to indicate the base station to establish the multicast session.

Correspondingly, that the base station establishes the multicast session corresponding to the multicast service based on the multicast information of the multicast service may include:

The base station establishes the multicast session corresponding to the multicast service based on the multicast information of the multicast service and the fourth indication information.

It should be noted that the SMF network element may include the multicast information of the multicast service, or the multicast information of the multicast service and the fourth indication information, in the first message only when the base station has not established the multicast session corresponding to the multicast service. This is not limited.

Further, the method further includes:

The base station determines the radio bearer information based on the multicast information.

For the determining the radio bearer information by the base station based on the multicast information, refer to related description in S203. Details are not described again.

The SMF network element sends the multicast information to the base station in the first message, where the first message is further used to request the base station to add the terminal device to the multicast session. In this way, the base station may directly add the terminal device to the multicast session based on the multicast information in the first message after establishing the multicast session corresponding to the multicast service. The method reduces a quantity of messages required for adding the terminal to the multicast session, reduces a latency, and improves efficiency.

It should be noted that the multicast information in embodiments of this application may include quality of service (QOS) information of the multicast QoS flow of the multicast service and an identifier of the multicast QoS flow.

Optionally, the foregoing method further includes:

The SMF network element obtains the multicast information according to a PCC rule of the multicast service, or the SMF network element obtains the multicast information from an MCF network element or an M-SMF network element.

The PCC rule may include at least one of the following information: the MBS-ID of the multicast service, description information of the multicast QoS flow of the multicast service, the identifier of the multicast QoS flow of the multicast service, the QoS information of the multicast QoS flow of the multicast service, a list of terminal devices supported by the multicast service, or a service range supported by the multicast service.

That the SMF network element obtains the multicast information from an MCF network element or an M-SMF network element includes:

The SMF network element sends first identification information to the MCF network element or the M-SMF network element, and the SMF network element receives the multicast information of the multicast service from the MCF network element or the M-SMF network element, where the first identification information is the multicast address of the multicast service or the MBS-ID of the multicast service.

Further, when the identifier of the multicast service in the third message is the multicast address of the multicast service, the SMF network element may further map the multicast address of the multicast service to the MBS-ID of the multicast service according to the PCC rule, and include the MBS-ID in the second message to identify the multicast service.

If the SMF network element obtains the multicast information according to the PCC rule, the SMF network element may control QoS of the multicast service, to meet a requirement of the multicast service.

Optionally, the foregoing method further includes: The SMF network element obtains access control information, where the access control information includes any one of the list of terminal devices allowed to access the multicast service or a list of multicast services allowed to be accessed by the terminal device.

Specifically, the SMF network element may obtain the access control information from a PCF network element or a UDM network element, and the access control information may be obtained based on subscription information of the terminal device.

Further, step S202 may include or be replaced with: The SMF network element sends the first message when determining, based on the access control information, that the terminal is allowed to access the multicast service.

Optionally, the foregoing method further includes:

The SMF network element sends fifth indication information to a first device, where the fifth indication information is used to indicate that the base station has established the multicast session corresponding to the multicast service.

The fifth indication information may be used by the first device to store information about the established multicast session.

The SMF network element notifies the first device to store the multicast session that corresponds to the multicast service and that is established by the base station. In this way, when another terminal device requests, through the base station and another SMF network element, to join the multicast service (that is, sends a third message), the another SMF network element may learn, from the first device, that the base station has established the multicast session corresponding to the multicast service, and therefore does not request the base station to repeatedly establish the multicast session corresponding to the multicast service.

Optionally, in a third method for establishing the multicast session, an MCF network element is responsible for managing the multicast session. In this case, before step S202, the foregoing method further includes:

The SMF network element sends a second request message to the MCF network element, where the second request message includes first identification information and identification information of the base station.

The SMF network element receives a response message from the MCF network element, where the response message includes second identification information.

The first identification information is the multicast address of the multicast service, and the second identification information is the MBS-ID of the multicast service. Alternatively, the first identification information is the multicast address of the multicast service or the MBS-ID of the multicast service, and the second identification information is the identifier of the multicast session or the MBS-ID of the multicast service.

The response message may further include the multicast information of the multicast service. The SMF may store the multicast information of the multicast service. Optionally, the SMF may further include the multicast information of the multicast service in the first message.

The second request message may further include the identifier of the terminal device, and the identifier of the terminal device is used by the MCF network element to determine whether the terminal device is allowed to perform the multicast service.

Alternatively, the response message includes a list of terminal devices supported by the multicast service, and the method further includes: The SMF network element determines, based on the list of terminal devices supported by the multicast service, whether the terminal device is allowed to perform the multicast service.

That the MCF network element determines whether the terminal device is allowed to perform the multicast service may be: The MCF network element determines, based on subscription information of the terminal device, whether the terminal device is allowed to perform the multicast service. Alternatively, the MCF network element determines, based on the list of terminal devices supported by the multicast service, whether the terminal device is allowed to perform the multicast service.

Optionally, before the SMF network element sends the second request message to the MCF network element, the foregoing method further includes:

The SMF network element selects the MCF network element based on at least one of the identifier of the multicast service or location information of the base station. For example, the SMF network element may send at least one of the identifier of the multicast service or the location information of the base station to an NRF network element, and the NRF network element sends, to the SMF network element, information about an MCF network element that meets a condition.

Before the SMF network element requests the base station to add the terminal to the multicast service, the SMF network element first obtains, from the MCF network element, the second identification information of the multicast session that corresponds to the multicast service and that is established by the base station. In this way, the SMF network element may send the first message to the base station based on the second identification information (corresponding to the first indication information in the first message), so that the base station adds the terminal device to the correct multicast session. In addition, the MCF may further determine whether the terminal device is allowed to perform the multicast service, to prevent an unallowed terminal device from receiving the data of the multicast service.

Optionally, in the first and the second methods for establishing the multicast session, the foregoing method further includes:

The SMF network element receives user plane tunnel information of the multicast session on the base station from the base station.

The SMF network element sends the user plane tunnel information of the multicast session on the base station to a user plane function (UPF) network element.

In addition/Alternatively, the SMF network element sends the user plane tunnel information of the multicast session on the base station or user plane tunnel information of the multicast session on the UPF network element to the MCF network element, so that the MCF network element sends the user plane tunnel information on the base station or the user plane tunnel information on the UPF network element to a MUF network element, to establish a downlink tunnel from the UPF network element or the MUF network element to the base station or a downlink tunnel from the MUF network element to the base station through the UPF network element, where the data of the multicast service may be sent to the base station through the downlink tunnel.

Optionally, in the third method for establishing the multicast session, further, the foregoing method may further include:

The SMF network element receives, from the base station, the indication information used to indicate that the terminal device successfully joins the multicast session.

The SMF network element sends, to the MCF network element, information about a QoS flow that is successfully established and/or information about a QoS flow that fails to be established in the multicast session.

The information about the QoS flow may include an identifier of the QoS flow.

The information about the QoS flow that is successfully established or fails to be established may be used to perform charging on the multicast service.

Optionally, in a fourth method for establishing the multicast session, the foregoing method further includes:

When the base station has not established the multicast session corresponding to the multicast service, the base station sends a first request message to a second network device, where the first request message is used to request to establish the multicast session corresponding to the multicast service, and the first request message includes the identifier of the multicast service.

The base station receives the multicast information of the multicast service from the second network device.

The base station determines the radio bearer information based on the multicast information.

The second network device may be the SMF network element or an MCF network element.

The first request message may further include indication information used to indicate to establish the multicast session.

That the base station sends a first request message to a second network device may include:

The base station determines an AMF network element serving the multicast session.

The base station sends the first request message to the second network device through the AMF network element.

That the base station determines an AMF network element serving the multicast session may include:

The base station determines the AMF network element based on at least one of location information of the base station or the identifier of the multicast service. For example, the base station may select, based on a configuration, an AMF network element corresponding to the multicast service or the base station. Alternatively, the base station determines an AMF network element serving the terminal device as the AMF network element serving the multicast session.

Further, the foregoing method may further include:

The base station allocates the identifier of the multicast session, and sends the identifier of the multicast session to the second network device.

Alternatively, the base station receives the identifier of the multicast session from the second network device.

Further, the foregoing method may further include:

The base station sends user plane tunnel information of the multicast session on the base station to the second network device.

After receiving the first message, the base station actively initiates establishment of the multicast session if the base station has not established the multicast session corresponding to the multicast service, to prevent a core network from determining, by using another mechanism, whether the base station has established the multicast session. This simplifies a message procedure.

Further, the foregoing method further includes:

The second network device receives the first request message from the base station, where the first request message includes a first identifier of the multicast service, and the first request message is used to establish the multicast session of the multicast service on the base station.

When the base station is located within a service range of the multicast service, the second network device establishes the multicast session corresponding to the multicast service.

For a method for determining, by the second network device, that the base station is located within the service range of the multicast service, refer to the method for determining, by the SMF network element, that the base station is located within the service range of the multicast service in the first method for establishing the multicast session corresponding to the multicast service. Details are not described herein again.

Optionally, in a fifth method for establishing the multicast session, the foregoing method further includes:

The base station receives a second message from a second network device, where the second message is used to indicate the base station to establish the multicast session corresponding to the multicast service, and the second message includes the multicast information of the multicast service.

The base station establishes the multicast session based on the second message.

The second message may further include third indication information, and the third indication information is used to indicate the base station to establish the multicast session.

The second network device is the SMF network element or an MCF network element. When the second network device is the SMF network element, for specific description, refer to the description in the first method for establishing the multicast session. When the second network device is the MCF network element, for specific description, refer to description in FIG. 3.

It should be noted that, for steps in the foregoing implementation scenarios, refer to related description in embodiments shown in FIG. 5A and FIG. 5B to FIG. 10. Details are not described again.

Figure 3:
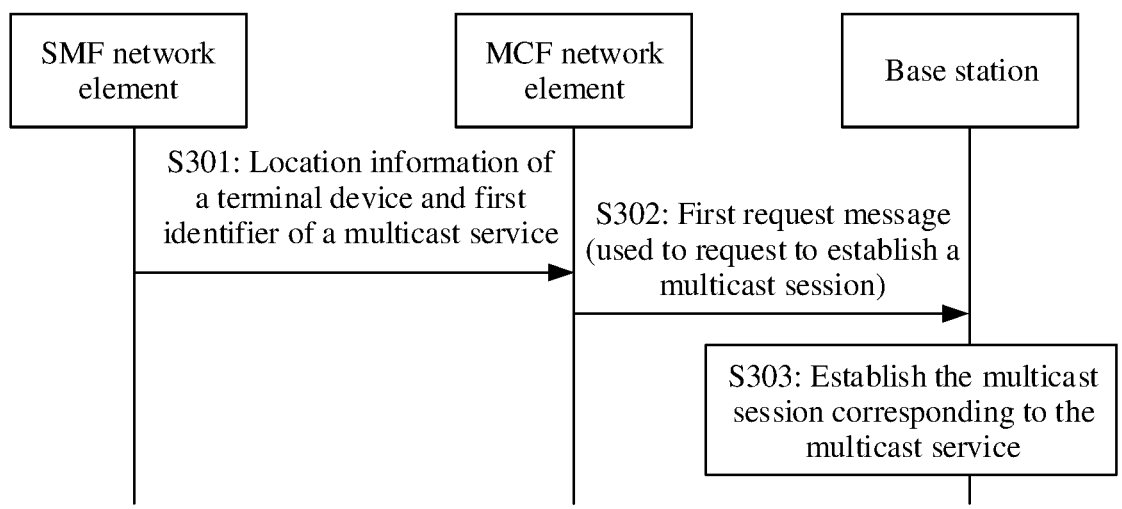
FIG. 3 is a schematic flowchart of another communication method according to an embodiment of this application.

In an actual application process, before the base station adds the terminal device to the multicast session, the base station needs to first establish the multicast session. With reference to FIG. 3, the following describes a manner in which the base station establishes the multicast session.

FIG. 3 is a schematic flowchart of another communication method according to an embodiment of this application. Refer to FIG. 3. The method may include the following steps.

S301: An SMF network element sends location information of a terminal device and a first identifier of a multicast service to an MCF network element.

The location information of the terminal device is used to indicate a location of the terminal device. For example, the location information may be physical coordinate information of the terminal device, or may be a base station identifier. The base station identifier is used to identify a base station that serves the terminal device, namely, a serving base station of the terminal device. The location information of the terminal device may alternatively be a cell identifier. The cell identifier is used to identify a cell that serves the terminal device, namely, a serving cell of the terminal device. The location information of the terminal device may alternatively be a tracking area identity (TAI), and the TAI is used to identify a tracking area in which the terminal device is located.

The first identifier of the multicast service may be an MBS-ID of the multicast service or multicast address information corresponding to the multicast service.

Optionally, the foregoing method further includes: The SMF network element further sends an identifier of the terminal device to the MCF network element.

Specifically, after receiving a third message sent by the terminal device, the SMF network element may send the location information of the terminal device and the first identifier of the multicast service to the MCF network element.

For the third message, refer to S201. Details are not described herein again.

S302: When a base station corresponding to the location information of the terminal device has not established a multicast session corresponding to the multicast service, the MCF network element sends a first request message to the base station corresponding to the location information of the terminal device.

The first request message may be used to request to establish the multicast session, that is, may be used to request the base station to establish the multicast session.

In an example, a message name of the first request message has the function of indicating the base station to establish the multicast session. For example, the message name is a multicast session establishment request message.

In another example, the first request message includes indication information used to indicate the base station to establish the multicast session. The indication information may correspond to a preset field in the first request message. For example, when a value of the preset field is a preset value, the preset field may be used to indicate the base station to establish the multicast session.

The first request message may include a second identifier of the multicast service.

The first request message may further include multicast information of the multicast service.

Optionally, the second identifier of the multicast service is the MBS-ID of the multicast service. It should be noted that the second identifier and the first identifier may be the same or different. This is not limited.

With reference to the location information of the terminal device in S301, the base station corresponding to the location information of the terminal device is described as follows:

When the location information of the terminal device is the physical coordinate information of the terminal device, the base station corresponding to the location information of the terminal device may be the base station that serves the terminal device.

Alternatively, when the location information of the terminal device is the base station identifier, the base station corresponding to the location information of the terminal device may be the base station identified by the base station identifier.

Alternatively, when the location information of the terminal device is the cell identifier, the base station corresponding to the location information of the terminal device may be a base station to which the cell identified by the cell identifier belongs.

Alternatively, when the location information of the terminal device is the TAI, the base station corresponding to the location information of the terminal device may be one or more base stations in the tracking area identified by the TAI.

Optionally, that the MCF network element sends a first request message to the base station in step S302 includes or is replaced with: When determining that the terminal device is allowed to receive the multicast service, the MCF network element sends the first request message to the base station.

The MCF network element may determine, in the following manner, whether the terminal device is allowed to access the multicast service: The MCF network element obtains access control information, where the access control information includes any one of a list of terminal devices allowed to access the multicast service or a list of multicast services allowed to be accessed by the terminal device. The MCF network element determines, based on the access control information, whether the terminal is allowed to access the multicast service. For example, the MCF network element may determine whether the terminal device is in the list of terminal devices allowed to access the multicast service; and if yes, the MCF network element determines that the terminal device is allowed to access the multicast service; or if no, the MCF network element determines that the terminal device is not allowed to access the multicast service.

Optionally, that the MCF network element sends a first request message to the base station in step S302 includes or is replaced with: When determining that there is an intersection between a service range of the multicast service and a service range of the base station (for example, the service range of the multicast service includes the service range of the base station, or partially overlaps the service range of the base station), the MCF network element sends the first request message to the base station.

The MCF network element may obtain the service range of the multicast service from a PCF network element.

Optionally, the foregoing method further includes: The MCF network element creates a multicast context for the multicast service on the base station; or the MCF network element creates a multicast context for the multicast service, and adds information about the base station to the multicast context.

S303: The base station establishes the multicast session corresponding to the multicast service based on the first request message.

Optionally, the first request message is a trigger condition for the base station to establish the multicast session corresponding to the multicast service. For example, after the base station receives the first request message, the base station establishes the multicast session corresponding to the multicast service.

Specifically, in step S303, the base station may create a context of the multicast session, and store the second identifier of the multicast service and the multicast information of the multicast service in the first request message in the context of the multicast session. Further, the base station may allocate, to the multicast session, user plane tunnel information of the multicast session on the base station, where the user plane tunnel information of the multicast session on the base station is used by the base station to receive data of the multicast service. In other words, the base station may receive the data of the multicast service based on the user plane tunnel information of the multicast session on the base station.

Optionally, the base station allocates an identifier of the multicast session to the multicast session.

Optionally, the base station determines, based on the multicast information, radio bearer information required for sending the data of the multicast service. This is described in the embodiment shown in FIG. 5A and FIG. 5B.

In the embodiment shown in FIG. 3, after the SMF network element sends the location information of the terminal device and the first identifier of the multicast service to the MCF network element, the MCF network element may determine whether the base station corresponding to the location information of the terminal device has established the multicast session corresponding to the multicast service. In addition, when determining that the base station has not established the multicast session corresponding to the multicast service, the MCF network element may send the first request message to the base station to request the base station to establish the multicast session corresponding to the multicast service. Further, after the base station receives the first request message, the base station establishes the multicast session corresponding to the multicast service.

In the method, the MCF network element is specially responsible for managing the multicast session, and the SMF network element is responsible for managing a PDU session of the terminal device. When the terminal device requests to join the multicast service, the SMF network element obtains, from the MCF network element, information about the multicast session that corresponds to the multicast service and that is on the base station. If the MCF network element determines that the base station has not established the multicast session corresponding to the multicast service, the MCF network element requests the base station to establish the multicast session corresponding to the multicast service. In this method, functions of the SMF network element and the MCF network element are clearly distinguished, to avoid integrating excessive irrelevant functions into one network element, so that functions of the network elements are simpler.

It should be noted that the MCF network element in this embodiment may alternatively be replaced with the SMF network element. For example, the SMF network element may be responsible for processing the multicast session, or be responsible for processing the multicast session and a unicast session. This is not limited in the present invention.

Optionally, in a first implementable scenario of the foregoing embodiment, the foregoing method further includes:

The MCF network element obtains the multicast information according to a PCC rule of the multicast service.

The PCC rule may include at least one of the following information: the multicast broadcast service identifier (MBS-ID) of the multicast service, description information of a multicast QoS flow of the multicast service, an identifier of the multicast QoS flow of the multicast service, QoS information of the multicast QoS flow of the multicast service, the list of terminal devices supported by the multicast service, or location information supported by the multicast service.

It should be noted that, for a method for obtaining the multicast information by the MCF network element according to the PCC rule of the multicast service, refer to related description in a subsequent embodiment, and details are not described again.

Optionally, in a second implementable scenario of the foregoing embodiment, after the MCF network element sends the first request message in S302, the foregoing method further includes:

The MCF network element receives the user plane tunnel information of the multicast session on the base station.

The MCF network element sends the user plane tunnel information of the multicast session on the base station to a MUF network element, where the user plane tunnel information is used to establish a user plane tunnel between the MUF network element and the base station.

Optionally, in a third implementable scenario of the foregoing embodiment, after the MCF network element sends the first request message, the foregoing method further includes:

The MCF network element receives user plane tunnel information of the multicast session on a UPF network element.

The MCF network element sends the user plane tunnel information of the multicast session on the UPF network element to a MUF network element, where the user plane tunnel information is used to establish a user plane tunnel between the MUF network element and the UPF network element.

Optionally, in a fourth implementable scenario of the foregoing embodiment, the foregoing method further includes:

The MCF network element receives the identifier of the multicast session from the base station.

Alternatively, the MCF network element allocates an identifier to the multicast session, and sends the identifier of the multicast session to the base station.

Optionally, in a fifth implementable scenario of the foregoing embodiment, the foregoing method further includes:

The MCF network element sends a response message to the SMF network element, where the response message includes the identifier of the multicast session or the second identifier of the multicast service.

Optionally, the response message further includes the multicast information of the multicast service. The SMF network element may store the multicast information. Optionally, the SMF network element may alternatively send the multicast information to the base station in a first message.

Optionally, in a sixth implementable scenario of the foregoing embodiment, the foregoing method further includes:

The MCF network element receives the identifier of the terminal device from the SMF network element.

The MCF network element obtains the access control information of the terminal device based on the identifier of the terminal device, where the access control information includes any one of the list of terminal devices allowed to access the multicast service or the list of multicast services allowed to be accessed by the terminal device.

When the MCF network element determines, based on the access control information, that the terminal device is allowed to perform the multicast service, the MCF network element sends the identifier of the multicast session or the second identifier of the multicast service to the SMF network element.

It should be noted that, for steps in the foregoing implementation scenarios, refer to related description in the embodiments shown in FIG. 5A and FIG. 5B to FIG. 10. Details are not described again.

It should be noted that FIG. 3 is merely used as an example to illustrate a process of establishing the multicast session by the base station, but does not limit the process of establishing the multicast session by the base station. Certainly, the base station may alternatively establish the multicast session in another manner. For example, the base station may alternatively establish the multicast session in manners in the embodiments in FIG. 5A and FIG. 5B, and FIG. 6A and FIG. 6B.

Figure 4A:
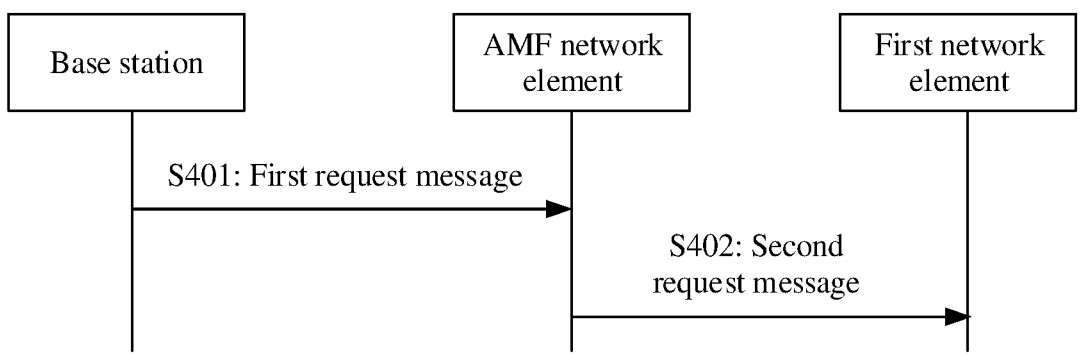
FIG. 4A is a schematic flowchart of still another communication method according to an embodiment of this application.

In an actual application process, user plane tunnels between the base station and the UPF network element and between the UPF and the MUF may be established during establishment of the multicast session. With reference to FIG. 4A, the following describes a process of establishing the user plane tunnels.

FIG. 4A is a schematic flowchart of still another communication method according to an embodiment of this application. Refer to FIG. 4A. The method may include the following steps.

S401: A base station sends a first request message to an AMF network element.

The first request message may be used to request to reestablish a multicast session for a multicast service, and the first request message may include user plane tunnel information of the multicast session on the base station.

The first request message includes an identifier of the multicast service.

The user plane tunnel information may be used to establish a user plane tunnel between the base station and a UPF network element.

S402: The AMF network element sends a second request message to a first network element.

The second request message is used to request the first network element to establish the multicast session, and the second request message may include the user plane tunnel information of the multicast session on the base station.

Optionally, the first network element is an SMF network element or an MCF network element.

In an example, when the first network element is the SMF network element, after the AMF network element sends the second request message to the SMF network element, the SMF network element sends the user plane tunnel information of the multicast session on the base station to the UPF network element, to establish the user plane tunnel between the base station and the UPF network element. If a user plane tunnel has not been established between the UPF network element and a MUF network element, the SMF network element may further send user plane tunnel information of the multicast session on the UPF network element to the MUF network element, for example, through a PCF network element or the MCF network element, to establish the user plane tunnel between the UPF network element and the MUF network element.

In another example, when the first network element is the MCF network element, the AMF network element determines the SMF network element based on at least one of an identifier of the base station or the identifier of the multicast service, and sends the user plane tunnel information of the multicast session on the base station to the SMF network element, so that the SMF network element sends the user plane tunnel information of the multicast session on the base station to the UPF network element, to establish the user plane tunnel between the base station and the UPF network element. If a user plane tunnel has not been established between the UPF network element and a MUF network element, the SMF network element further sends user plane tunnel information of the multicast session on the UPF network element to the AMF network element, and the AMF network element sends the user plane tunnel information of the multicast session on the UPF network element to the MCF network element, so that the MCF network element sends the user plane tunnel information of the multicast session on the UPF network element to the MUF network element, to establish the user plane tunnel between the UPF network element and the MUF network element.

Optionally, the foregoing method further includes: The AMF network element may determine the SMF network element based on at least one of the identifier of the base station or the identifier of the multicast service. For example, the AMF network element may send at least one of the identifier of the base station or the identifier of the multicast service to a network repository function (NRF) network element, and the NRF network element sends, to the AMF network element, information about an SMF network element that meets a condition.

The second request message may further include indication information used to indicate to establish the multicast session.

Optionally, in an implementation scenario of the foregoing embodiment, the foregoing method further includes:

The AMF network element determines the first network element based on at least one of the identifier of the base station or the identifier of the multicast service. The AMF network element may select the first network element through the NRF network element. For example, the AMF network element may send at least one of the identifier of the multicast service or location information of the base station to the NRF network element, and the NRF network element sends, to the AMF network element, information about an MCF network element that meets a condition.

Optionally, in another implementation scenario of the foregoing embodiment, the first network element is the MCF network element, and the foregoing method further includes:

The AMF network element selects the SMF network element based on at least one of the identifier of the base station or the identifier of the multicast service.

The AMF network element sends the user plane tunnel information of the multicast session on the base station to the SMF network element. For example, the AMF may send a multicast session establishment request message to the SMF network element, where the multicast session establishment request message includes the user plane tunnel information.

The AMF network element receives the user plane tunnel information of the multicast session on the UPF network element from the SMF network element.

The AMF network element or the SMF network element sends the user plane tunnel information of the multicast session on the UPF network element to the MCF network element.

If the SMF network element is selected, after the SMF network element receives a message (for example, the multicast session establishment request message) from the AMF, the SMF network element may alternatively send the second request message to the MCF network element.

It should be noted that, for steps in the foregoing implementation scenarios, refer to related description in the embodiments in FIG. 5A and FIG. 5B to FIG. 9A and FIG. 9B. Details are not described again.

In the embodiment shown in FIG. 4A, the user plane tunnel between the base station and the UPF network element and the user plane tunnel between the UPF network element and the MUF network element may be established.

Figure 4B:
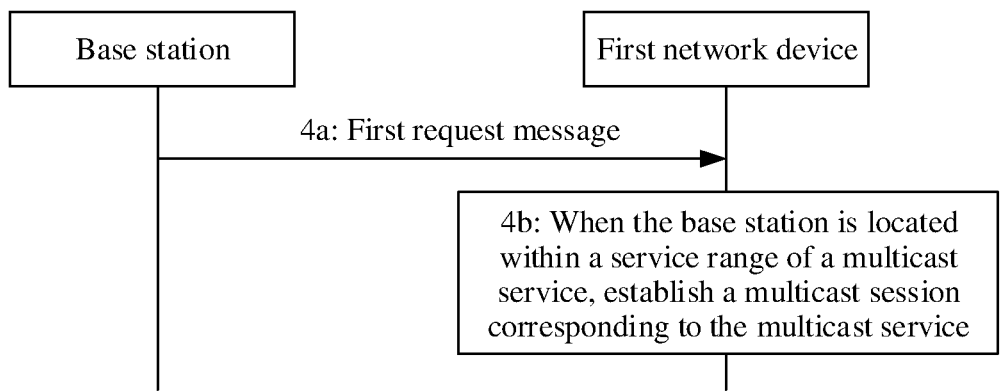
FIG. 4B is a schematic flowchart of yet another communication method according to an embodiment of this application.

FIG. 4B is a schematic flowchart of yet another communication method according to an embodiment of this application. Refer to FIG. 4B. The method may include the following steps.

4a: A base station sends a first request message to a first network device.

The first request message may include a first identifier of a multicast service, and the first request message is used to request to establish a multicast session of the multicast service on the base station.

Optionally, the first network device may be an SMF network element or an MCF network element.

The first request message may further include user plane tunnel information of the multicast session on the base station.

4b: The first network device establishes the multicast session corresponding to the multicast service.

Optionally, the first network device may first determine whether the base station is located within a service range of the multicast service; and if yes, the first network device establishes the multicast session corresponding to the multicast service.

It should be noted that, for a process in which the first network device determines whether the base station is located within the service range of the multicast service, refer to S505, and details are not described herein again.

A process in which the first network device establishes the multicast session is similar to a process in which a base station establishes a multicast session in S506, and details are not described herein again.

It should be noted that FIG. 4B and FIG. 4A may be combined, so that the corresponding user plane tunnels are established in a multicast session establishment process, to send data of the multicast service to the base station. When FIG. 4B and FIG. 4A are combined, the first request message includes the first identifier of the multicast service and the user plane tunnel information of the multicast session on the base station.

In the embodiment shown in FIG. 4B, after the first network device receives the first request message from the base station, the first network device determines whether the base station is located within the service range of the multicast service. When determining that the base station is located within the service range of the multicast service, the first network device establishes the multicast session corresponding to the multicast service, so that service data can be sent to a terminal device in a multicast manner, to improve resource utilization.

Based on any one of the foregoing embodiments, the following describes the communication method in detail with reference to FIG. 5A and FIG. 5B to FIG. 7A and FIG. 7B.

Figure 5A:
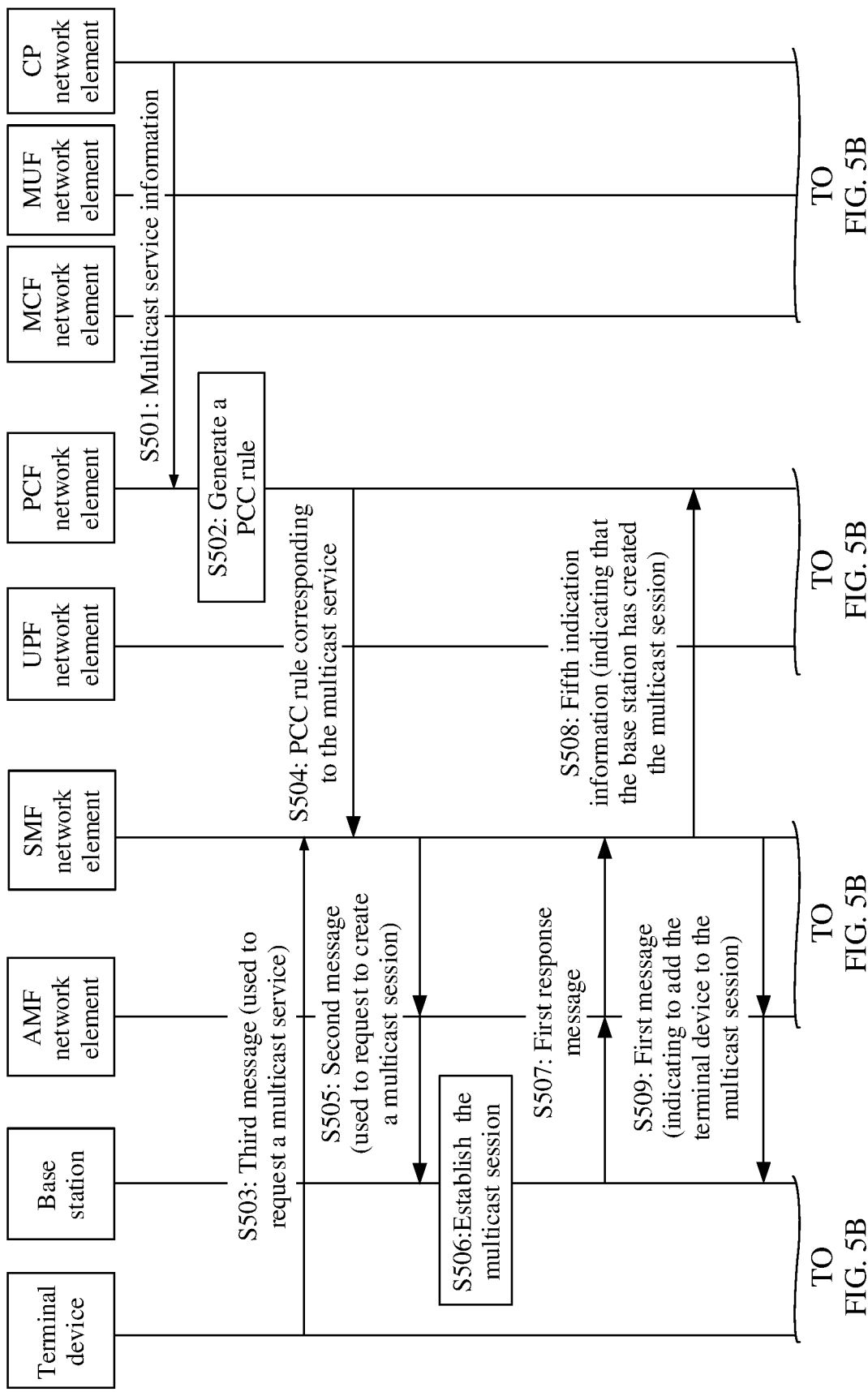
FIG. 5A and FIG. 5B are a schematic flowchart of another communication method according to an embodiment of this application.
Figure 5B:
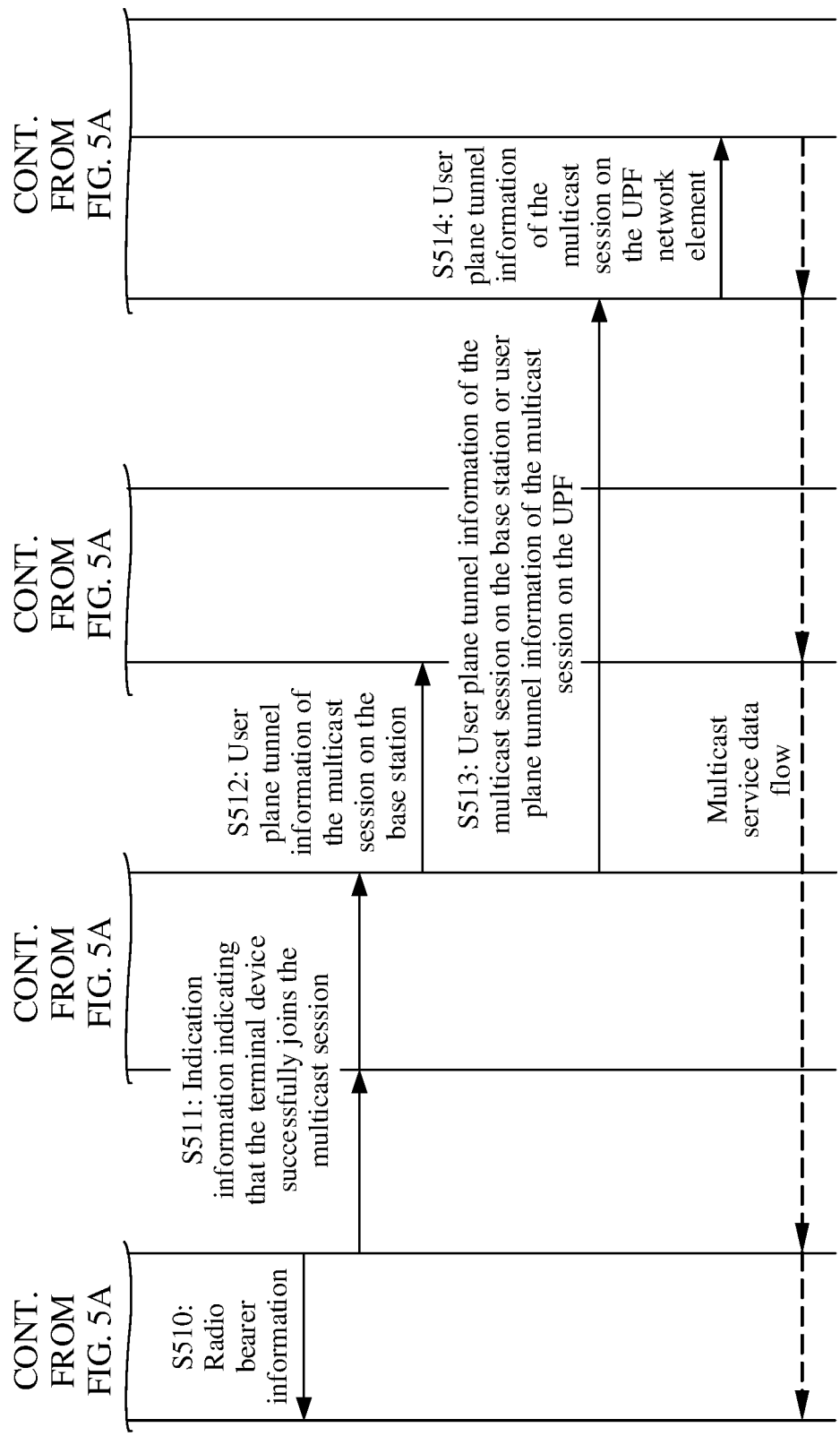

FIG. 5A and FIG. 5B are a schematic flowchart of another communication method according to an embodiment of this application. The embodiment shown in FIG. 5A and FIG. 5B may be applied to the architectures of the communication systems shown in FIG. 1B and FIG. 1C. In the embodiment shown in FIG. 5A and FIG. 5B, after a terminal device requests to join a multicast session corresponding to a multicast service, an SMF network element first requests a base station to establish the multicast session corresponding to the multicast service, and then requests the base station to add the terminal device to the multicast session corresponding to the multicast service. Refer to FIG. 5A and FIG. 5B. The method may include the following steps.

S501: A PCF network element obtains multicast service information from a CP network element.

The multicast service information may include description information of the multicast service.

Optionally, the multicast service information further includes information about the terminal device. For example, the information about the terminal device may be one or more identifiers of one or more terminal devices that are allowed (or request) to join the multicast service or an identifier of a terminal device group.

Optionally, the description information of the multicast service includes description information of one or more multicast service flows, where the description information of the multicast service flow includes at least one of the following content: feature information of the multicast service flow, a bandwidth requirement of the multicast service flow, a priority of the multicast service flow, a QoS requirement (for example, a jitter, a latency, or a packet loss rate) of the multicast service flow, or the like. For example, the feature information of the multicast service flow may include at least one of a multicast address, a destination port number, a source address, or the like of the multicast service.

Optionally, the PCF network element allocates a unique identifier to the multicast service. For example, the unique identifier may be an MBS-ID, and the MBS-ID may uniquely identify the multicast service in a public land mobile network (PLMN). For example, after obtaining the multicast service information, the PCF network element may allocate the unique identifier to the corresponding multicast service.

Optionally, the PCF network element requests to obtain the multicast service information from the CP network element. Alternatively, the CP network element actively sends the multicast service information to the PCF network element. When the PCF network element requests to obtain the multicast service information from the CP network element, the PCF network element sends the MBS-ID of the multicast service to the CP network element, so that the CP network element obtains multicast service information corresponding to the MBS-ID of the multicast service, and sends the multicast service information to the PCF network element.

It should be noted that, in S501, a NEF network element may alternatively obtain the multicast service information from the CP network element, and send the multicast service information to the PCF network element. For a manner in which the NEF network element obtains the multicast service information from the CP network element, refer to the manner in which the PCF network element obtains the multicast service information from the CP network element. Details are not described herein again.

S502: The PCF network element generates a PCC rule based on the multicast service information.

If the multicast service information may be used in all terminal devices, the PCC rule generated by the PCF network element may also be applied to all the terminal devices. If the multicast service information may be applied to one or more terminal devices related to the multicast service, the PCC rule generated by the PCF network element may also be applied to the one or more terminal devices.

Optionally, the PCC rule includes at least one of the following information: the MBS-ID of the multicast service, the description information of the multicast service flow of the multicast service, QOS information of the multicast service flow of the multicast service, a list of terminal devices supported by the multicast service, or location information supported by the multicast service.

Optionally, the PCF network element determines a correspondence between a multicast service flow and a multicast QoS flow. The PCF network element allocates a QFI to each multicast QoS flow. In this case, the PCC rule includes at least one of the following information: the MBS-ID of the multicast service, description information of a multicast QoS flow of the multicast service, a QFI of the multicast QOS flow of the multicast service, QoS information of the multicast QoS flow of the multicast service, a list of terminal devices supported by the multicast service, or location information supported by the multicast service.

S503: The terminal device sends a third message to the SMF network element.

The third message may be used to request the multicast service, and the third message may include an identifier of the multicast service.

It should be noted that the description in S201 is applicable to S503, and details are not described herein again.

Optionally, the third message is an Internet group management protocol (IGMP) message. In this case, the terminal device may send the IGMP message to the SMF network element through an AN node and a UPF network element. The terminal device may send the IGMP message to the SMF network element through an established PDU session. The identifier of the multicast service included in the IGMP message may be the multicast address of the multicast service, and the multicast address may identify the multicast service. The IGMP message may further include source address information corresponding to the multicast service (an address of a device that sends data of the multicast service).

Optionally, the third message is a NAS message. For example, the NAS message may be a PDU session modification request message. When the third message is the NAS message, the identifier of the multicast service included in the NAS message may be the MBS-ID of the multicast service if the terminal device has obtained the MBS-ID of the multicast service. Alternatively, the identifier of the multicast service included in the NAS message may be the multicast address of the multicast service if the terminal has not obtained the MBS-ID of the multicast service, where the multicast address may identify the multicast service. The NAS message may further include source address information corresponding to the multicast service (an address of a device that sends data of the multicast service).

Optionally, the SMF network element determines, based on a service range of the multicast service, whether the base station serving the terminal device is within the service range of the multicast service; and if the base station is not within the service range of the multicast service, the SMF network element rejects access of the terminal device to the multicast service.

Optionally, the SMF network element may further determine whether the terminal device is allowed to access the multicast service. If the terminal device is allowed to access the multicast service, subsequent steps are performed. If the terminal device is not allowed to access the multicast service, the SMF network element rejects access of the terminal device to the multicast service. For example, the SMF network element may send, to the terminal device, indication information used to indicate to reject the access of the terminal device to the multicast service.

S504: The SMF network element obtains the PCC rule corresponding to the multicast service from the PCF network element.

Optionally, the SMF network element requests to obtain the PCC rule corresponding to the multicast service from the PCF network element. Alternatively, the PCF network element actively sends the PCC rule corresponding to the multicast service to the SMF network element.

S504 is an optional step. For example, if the SMF network element does not locally store the PCC rule corresponding to the multicast service, the SMF network element may request to obtain the PCC rule corresponding to the multicast service from the PCF network element. If the SMF network element locally stores the PCC rule corresponding to the multicast service, the SMF network element does not need to request to obtain the PCC rule corresponding to the multicast service from the PCF network element.

A manner in which the SMF network element requests to obtain the PCC rule from the PCF network element may vary with the identifier of the multicast service included in the third message. This may include the following cases:

Case 1: The third message includes the MBS-ID of the multicast service.

In this case, the SMF network element may obtain the PCC rule corresponding to the multicast service from the PCF network element based on the MBS-ID. For example, the SMF network element may send a request message to the PCF network element, where the request message carries the MBS-ID, so that the PCF network element may obtain the PCC rule corresponding to the multicast service based on the MBS-ID in the request message, and send the PCC rule corresponding to the multicast service to the SMF network element.

Case 2: The third message includes the multicast address of the multicast service.

In this case, the third message may further include the source address information. The SMF network element may obtain the PCC rule corresponding to the multicast service from the PCF network element based on the multicast address (or the multicast address and the source address information). For example, the SMF network element may send a request message to the PCF network element, where the request message carries the multicast address (or the multicast address and the source address information), so that the PCF network element may obtain the PCC rule corresponding to the multicast service based on the multicast address (or the multicast address and the source address information) in the request message, and send the PCC rule corresponding to the multicast service to the SMF network element.

Optionally, the SMF network element further sends an identifier of the base station to the PCF network element, to query, in the PCF network element, whether the base station has established the multicast session for the multicast service. For example, the SMF network element may send the identifier of the base station to the PCF network element when requesting to obtain the PCC rule from the PCF network element, or may send the identifier of the base station to the PCF network element before S504 or after S504.

After the PCF network element receives the identifier of the base station, the PCF network element may further determine, based on the identifier of the base station, whether the base station has established the multicast session for the multicast service (that is, whether a context of the multicast service exists on the base station). If the base station has established the multicast session corresponding to the multicast service, the PCF network element may notify the SMF network element that the base station has established the multicast session corresponding to the multicast service. Alternatively, if the base station has not established the multicast session corresponding to the multicast service, the PCF network element may notify the SMF network element that the base station has not established the multicast session corresponding to the multicast service.

When determining that the base station has established the multicast session corresponding to the multicast service, the PCF network element may send an identifier of the multicast session to the SMF network element. In other words, if the SMF network element receives the identifier of the multicast session sent by the PCF network element, it indicates that the base station has established the multicast session corresponding to the multicast service. If the SMF network element does not receive the identifier of the multicast session sent by the PCF network element, it indicates that the base station has not established the multicast session corresponding to the multicast service.

When the SMF network element maps the multicast service flow to the multicast QoS flow, and determines that the base station has not established the multicast session corresponding to the multicast service, the SMF network element determines the multicast QoS flow based on the multicast service flow, and allocates a QFI to the multicast QoS flow. For example, the SMF network element may determine each multicast service flow as one multicast QoS flow, or may determine a plurality of multicast service flows as one multicast QoS flow. This is not limited.

Optionally, the SMF network element further sends an identifier of the SMF network element to the PCF network element. For example, the SMF network element may send the identifier of the SMF network element to the PCF network element when requesting to obtain the PCC rule from the PCF network element, or may send the identifier of the SMF network element to the PCF network element before S504 or after S504.

After the PCF network element receives the identifier of the SMF network element, if the base station has not previously established the multicast session for the multicast service, the PCF network element may store the SMF network element as an SMF network element serving the multicast service on the base station. In this way, when another terminal device subsequently requests, through a same base station but different SMF network elements, to join the multicast service, the PCF network element indicates, to an SMF network element corresponding to the terminal device, that the multicast session corresponding to the multicast service has been established on the base station.

The following provides description by using an example in which the base station has not established the multicast session corresponding to the multicast service.

S505: The SMF network element sends a second message to the base station.

The second message may include multicast information of the multicast service.

The second message may be used to indicate the base station to establish the multicast session corresponding to the multicast service.

In an example, a message name of the second message has the function of indicating the base station to establish the multicast session corresponding to the multicast service. For example, the message name is a multicast session establishment request message.

In another example, the second message includes third indication information, and the third indication information is used to indicate the base station to establish the multicast session corresponding to the multicast service. The third indication information in the second message may correspond to a preset field in the second message. For example, when a value of the preset field is a preset value, the preset field may be used to indicate the base station to establish the multicast session corresponding to the multicast service.

Optionally, the SMF network element obtains the multicast information according to the PCC rule of the multicast service, and then sends the second message including the multicast information to the base station.

Specifically, the SMF may obtain the multicast information according to the PCC rule of the multicast service in the following manner:

In a possible implementation, the SMF network element determines the multicast QoS flow based on QoS information of one or more multicast service flows in the PCC rule. For example, the SMF network element combines one or more multicast service flows with a same 5G quality of service identifier (5G QoS identifier, 5QI) into one multicast QoS flow, determines QoS information of the multicast QoS flow based on QoS information of the multicast service flow corresponding to the multicast QoS flow, and sums up bandwidth requirements of all the multicast service flows corresponding to the multicast QoS flow, to obtain a bandwidth requirement of the multicast QoS flow. Optionally, the SMF network element allocates a QFI to the multicast QoS flow.

In another possible implementation, the PCC rule includes the description information of the multicast QoS flow, the QoS information of the multicast QoS flow, and the optional QFI of the multicast QoS flow. The SMF network element may obtain the QoS information of the multicast QoS flow from the PCC rule. If the PCC rule does not include the QFI corresponding to the multicast QoS flow, the SMF network element allocates a QFI to the multicast QoS flow. If the PCC rule includes the QFI corresponding to the multicast QoS flow, the SMF network element determines the QFI in the PCC rule as a QFI of the multicast QoS flow. The PCF network element may determine the PCC rule in the following manner: The PCF network element determines the correspondence between a multicast service flow and a multicast QoS flow, that is, the PCF network element determines a corresponding multicast QoS flow based on QoS information of one or more multicast service flows. In addition, the PCF network element allocates a QFI to the multicast QoS flow. The PCF network element combines one or more multicast service flows with a same 5QI into one multicast QoS flow, and determines QoS information of the multicast QOS flow based on QoS information of the multicast service flow corresponding to the multicast QoS flow. Optionally, the PCF network element allocates a QFI to the multicast QoS flow.

The SMF network element may send the second message to the base station in the following manners:

Manner 1: The SMF network element actively sends the second message to the base station.

In this manner, after the base station receives the second message, the base station determines whether the base station has established the multicast session corresponding to the multicast service. When determining that the base station has not established the multicast session corresponding to the multicast service, the base station establishes the multicast session corresponding to the multicast service.

Manner 2: The SMF network element determines whether the base station has established the multicast session corresponding to the multicast service. When determining that the base station has not established the multicast session corresponding to the multicast service, the SMF network element sends the second message to the base station.

In this manner, after receiving the second message, the base station establishes the multicast session corresponding to the multicast service.

Optionally, the SMF network element may determine, in the following manner, whether the base station has established the multicast session corresponding to the multicast service: The SMF network element may learn, from a first device, whether the base station has established the multicast session corresponding to the multicast service. For example, in this embodiment, the first device may be the PCF network element. The PCF network element indicates, to the SMF network element, whether the base station has established the multicast session corresponding to the multicast service (refer to S504). The first device may alternatively be another device, for example, a UDM network element. The SMF network element may query, in the first device, whether the base station has established the multicast session corresponding to the multicast service. The first device stores information about the established multicast session, and the information about the established multicast session includes at least one of the identifier of the multicast service corresponding to the established multicast session, an identifier of a base station corresponding to the established multicast session, an identifier of a serving SMF network element of the established multicast session, the multicast information of the multicast service, or the identifier of the established multicast session. For example, the SMF network element may send the identifier of the base station and the identifier of the multicast service to the first device. The first device determines, based on the identifier of the base station, the identifier of the multicast service, and the information about the established multicast session that is stored in the first device, whether the base station has established the multicast session corresponding to the multicast service. When the first device is the PCF network element, the SMF network element may learn, from the PCF network element by using a separate message, whether the base station has established the multicast session corresponding to the multicast service, that is, the PCF network element does not indicate, in step S504, whether the base station has established the multicast session corresponding to the multicast service. Optionally, if the base station has established the multicast session for the multicast service, the first device sends the identifier of the multicast session to the SMF network element. Optionally, the identifier of the multicast session obtained from the first device may be sent to the base station in a first message in step S509.

Optionally, the second message is an N2 request message. The SMF network element may send the N2 request message to an AMF network element, and the AMF network element sends the N2 request message to the base station. Because the SMF network element needs to indicate that a session to be established by the base station is the multicast session, the SMF network element may use a new N2 request message, where the N2 request message indicates to establish the multicast session; or the SMF network element may use an existing N2 request message for establishing a PDU session, but add an additional information element to the N2 request message. For example, the additional information element may be the identifier of the multicast session, the MBS-ID, or indication information, to notify the base station that the message is used to indicate to establish the multicast session.

Optionally, the SMF network element may send the N2 request message to the base station in the following two feasible implementations:

First implementation: The SMF network element sends the N2 request message to the base station through a signaling connection of the terminal device. This means that the SMF network element sends, through an interface related to the terminal device, the N2 request message to the AMF network element serving the terminal device, that is, the request message (a uniform resource identifier (URI) included in the request message) sent by the SMF network element to the AMF network element carries an identifier of the terminal device, and then the AMF network element sends the N2 request message to the base station through an N2 signaling connection that has been established for the terminal device. In this implementation, the base station may associate the N2 request message with the terminal device through the N2 signaling connection. Therefore, in this implementation, the N2 request message may be further used to request the base station to add the terminal device to the multicast service. For example, the SMF network element may include, in the N2 request message, indication information used to indicate to add the terminal device to the multicast service. Because the N2 request message is sent through the N2 signaling connection of the terminal device, the base station may associate the N2 request message with the terminal device, to add the terminal device to the multicast session. Optionally, the N2 request message carries a PDU session identifier of the terminal device. In this way, the base station may associate the PDU session of the terminal device with the multicast session.

Second implementation: The SMF network element does not send the N2 request message to the base station through a signaling connection of the terminal device. In this implementation, when sending the N2 request message to the AMF network element, the SMF network element does not include an identifier of the terminal device in a URI of the request message. In this way, the AMF network element cannot associate the N2 request message with the terminal device. For example, the AMF network element may add a new service (for example, a multicast session service), where the new service is used by the SMF network element to send the N2 request message related to the multicast service to the base station. The SMF network element may first obtain a profile of the AMF network element, obtain an address (an endpoint address) of the new service from the profile, and generate a URI by using the address, to send the N2 request message to the AMF network element. When the AMF network element does not use the N2 signaling connection of the terminal device to send the N2 request message to the base station, the AMF network element may send the N2 request message by using a node-level message; or the AMF network element establishes an N2 signaling connection for the multicast session, that is, the AMF network element allocates an AMF N2 interface identifier to the multicast session, and sets an N2 interface identifier of the base station to be unallocated, so that the base station allocates a base station N2 interface identifier to the multicast session when receiving the request message. If the AMF network element allocates the AMF N2 interface identifier, the AMF network element stores the AMF N2 interface identifier. The AMF network element may further allocate a resource URI to the multicast session, so that the SMF network element may subsequently update the multicast session by using the resource URI. The AMF network element may also allocate a local identifier to the multicast session, and may include the local identifier of the multicast session in a response message sent to the SMF network element. In this way, a session identifier allocated by the AMF network element may be carried when the SMF network element subsequently needs to send a message to the AMF network element to modify the multicast session, to identify the session in the AMF network element.

The N2 request message may include one or more of the multicast information of the multicast service or an identifier that is of the multicast session and that is allocated by the SMF network element.

It should be noted that, if the N2 request message is not sent through the signaling connection of the terminal device, while being indicated to establish the session, the base station cannot be indicated to add the terminal device to the multicast session. After the multicast session is established, the base station needs to be further requested through the signaling connection of the terminal device to add the terminal device to the multicast session. If the N2 request message is not sent through the signaling connection of the terminal device, the SMF network element may select another AMF network element to send the N2 request message. The another AMF network element is an AMF network element that does not serve the terminal device.

Optionally, the SMF network element may first determine whether the service range of the multicast service includes the base station. When the service range of the multicast service includes the base station, the SMF network element sends the second message to the base station. That the service range of the multicast service includes the base station means: A service range of the base station falls within the service range of the multicast service.

The SMF network element may determine, in the following manner, whether the service range of the multicast service includes the base station: The SMF network element may obtain policy information, where the policy information includes the service range of the multicast service. The SMF network element determines, based on the policy information, whether the service range of the multicast service includes the base station. Alternatively, the SMF network element may further obtain information about the base station, and determine, based on the information about the base station, that the service range of the multicast service includes the base station. For example, the information about the base station may include one or more of the identifier of the base station, an identifier of a cell corresponding to the base station, or a TAI corresponding to the base station.

S506: The base station establishes the multicast session based on the multicast information.

Optionally, the base station establishes the multicast session in the following manner: After the base station receives the second message, the base station establishes a context of the multicast service, and stores QoS information of the multicast service and the QFI in the context of the multicast service.

Optionally, the base station may further establish a radio bearer for the multicast session. For example, the base station determines, based on the multicast session, the radio bearer that needs to be established and how to map the multicast QoS flow corresponding to the multicast session to the radio bearer. Optionally, the base station allocates user plane tunnel information of the multicast session on the base station, where the user plane tunnel information of the multicast session on the base station may include an IP address of the base station and a tunnel identifier, so that the terminal device receives the data of the multicast service based on the user plane tunnel information of the multicast session on the base station. The base station may allocate the user plane tunnel information of the multicast session on the base station when the terminal device does not support receiving the data of the multicast service in a multicast manner.

Optionally, the base station allocates an identifier of the multicast session to the multicast session, and stores the identifier of the multicast session in the context of the multicast service. The identifier of the multicast session uniquely identifies the multicast session in the base station.

Optionally, in S505, if the SMF network element requests the base station to add the terminal device to the multicast session, the base station further sends radio bearer information to the terminal device. For a process thereof, refer to S509.

The following provides description by using an example in which in S505, the SMF network element does not request the base station to add the terminal device to the multicast session.

S507: The base station sends a first response message to the SMF network element.

Optionally, the first response message is used to indicate that the base station successfully completes establishment of the multicast session. The first response message may be an N2 response message. For example, the N2 response message is a response message for the N2 request message in S505. If the AMF network element allocates, in step S505, an N2 interface signaling connection identifier to send the multicast session N2 request message, the base station further sends, to the AMF network element, an N2 signaling connection identifier allocated by the base station to the multicast session.

Optionally, if the base station allocates the identifier of the multicast session to the established multicast session, the first response message further includes the identifier of the multicast session.

Optionally, if the base station allocates the user plane tunnel information of the multicast session on the base station to the multicast service, the first response message further includes the user plane tunnel information of the multicast session on the base station.

It should be noted that if the base station fails to establish the multicast session, the base station sends a second response message to the SMF network element, where the second response message is used to indicate that the base station fails to establish the multicast session, and the second response message may further include a failure cause. For example, the failure cause may be insufficient resources of the base station.

S508: The SMF network element sends fifth indication information to the first device.

The fifth indication information may be used to indicate that the base station has established the multicast session for the multicast service.

Optionally, the fifth indication information may further indicate that the SMF network element is the SMF network element serving the multicast session of the multicast service on the base station.

Optionally, the fifth indication information includes the information about the established multicast session. The information about the established multicast session includes at least one of the identifier of the multicast service corresponding to the established multicast session, information about a base station corresponding to the established multicast session, the identifier of the serving SMF network element of the established multicast session, the multicast information of the multicast service, or the identifier of the established multicast session.

Optionally, the first device may be the PCF network element. The following provides description by using an example in which the first device is the PCF network element. It should be noted that, in FIG. 5A and FIG. 5B, the example in which the first device is the PCF network element is used for description.

Optionally, the SMF network element sends the fifth indication information to the PCF network element through a policy session corresponding to the PDU session of the terminal device, to notify the PCF network element that the SMF network element has established the multicast session for the multicast service on the base station, that is, the SMF network element is the SMF network element serving the multicast session of the multicast service on the base station.

Optionally, the fifth indication information is further used to request the PCF network element to establish the policy session for the multicast session, that is, when requesting the PCF network element to establish the policy session for the multicast session, the SMF network element notifies the PCF network element that the SMF network element has established the multicast session for the multicast service on the base station.

The fifth indication information may include the identifier of the multicast service, so that the PCF network element determines the multicast service corresponding to the multicast session.

Optionally, the fifth indication information includes the identifier of the base station corresponding to the multicast session. The PCF network element may determine, based on the identifier of the base station, that the SMF network element is the SMF network element serving the multicast session of the multicast service on the base station. In this way, when another SMF network element queries the PCF network element, for whether the base station has established the multicast session for the multicast service, the PCF network element may determine that the base station has established the multicast session for the multicast service, and indicate the another SMF network element not to establish the multicast session.

Optionally, the fifth indication information includes the identifier of the multicast session, so that the PCF network element may identify the multicast session by using the identifier of the multicast session.

S509: The SMF network element sends the first message to the base station.

The first message may be used to indicate to add the terminal device to the multicast session corresponding to the multicast service, the first message may include the identifier of the terminal device and first indication information, and the first indication information is used to indicate the multicast session.

It should be noted that the description in S202 is applicable to S509, and details are not described herein again.

Optionally, if the multicast session of the multicast service on the base station is established by the SMF network element, in a multicast session establishment process, the SMF network element obtains the identifier of the multicast session, and the SMF network element may set the first indication information to be the identifier of the multicast session. If the multicast session of the multicast service on the base station is established by another network element, the SMF network element obtains the identifier of the multicast session from the first device (refer to step S505), and sets the first indication information to be the identifier of the multicast session.

Optionally, the first message is an N2 request message.

The SMF network element may first determine whether the terminal device is allowed to access the multicast service. When determining that the terminal device is allowed to access the multicast service, the SMF network element further sends the first message to the base station. For a process in which the SMF network element determines whether the terminal device is allowed to access the multicast service, refer to S302. Details are not described herein again.

The SMF network element may send the N2 request message to the base station through the signaling connection of the terminal device. In other words, when sending the N2 request message to the base station, the AMF network element sends the N2 request message through the N2 signaling connection that has been established for the terminal device. For example, the URI used by the SMF network element to send the N2 request message to the AMF network element carries the identifier of the terminal device, and the AMF network element includes a RAN UE NGAP ID when sending the N2 request message to the base station.

S510: The base station sends the radio bearer information corresponding to the multicast session to the terminal device based on the first message.

The radio bearer information may be used by the terminal device to receive the data of the multicast service.

It should be noted that the description in S203 is applicable to S510, and details are not described herein again.

Optionally, the base station determines a type (a unicast resource or a multicast resource) of an air interface resource to be allocated to the terminal device, where multicast refers to point-to-multipoint (point to multicast, PTM). For example, the base station may determine, based on a measurement report of the terminal device and whether another terminal device joins the multicast service, to allocate the unicast resource or the multicast resource to the terminal device. For example, when the measurement report of the terminal device indicates that a signal of the base station is strong and/or a plurality of other terminal devices join the multicast service, the base station determines to use a PTM mode.

Optionally, the base station sends a radio resource control (RRC) message to the terminal device, where the RRC message includes the radio bearer information corresponding to the multicast session. For example, the RRC message may be an RRC reconfiguration request message. In this way, the radio bearer on the terminal device may be configured to receive the multicast service. If the base station sends the data of the multicast service to the terminal device in the multicast manner, the base station further sends an identifier (for example, a group radio network temporary identifier (G-RNTI)) corresponding to a multicast resource to the terminal device, so that the terminal device obtains the radio bearer information corresponding to the multicast service based on the identifier corresponding to the multicast resource, to receive the data of the multicast service based on the radio bearer information.

S511: The base station sends, to the SMF network element, indication information used to indicate that the terminal device successfully joins the multicast session.

Optionally, after the base station successfully adds the terminal device to the multicast session, the base station sends, to the SMF network element, the indication information used to indicate that the terminal device successfully joins the multicast session. The indication information may further include information (for example, a QFI) about a QoS flow that is of the multicast service and that is successfully joined and/or information about a QoS flow that is of the multicast service that fails to be joined. If the base station fails to add the terminal device to the multicast session, the base station sends, to the SMF network element, indication information used to indicate that the terminal device fails to join the multicast session. The indication information may further carry a cause for failing to add the terminal device to the multicast session.

For example, when the base station has sufficient resources to serve the multicast service, the base station may successfully add the terminal device to the multicast session.

Optionally, the base station sends the indication information to the SMF network element through the AMF network element. For example, the base station first sends the indication information to the AMF network element, and then the AMF network element sends the indication information to the SMF network element. The AMF network element is an AMF network element serving the terminal device.

S512: The SMF network element sends the user plane tunnel information of the multicast session on the base station to the UPF network element.

Optionally, after the SMF network element receives the user plane tunnel information of the multicast session on the base station, the SMF network element sends the user plane tunnel information of the multicast session on the base station to the UPF network element. That is, S512 may be performed after S507.

S513: The SMF network element sends the user plane tunnel information of the multicast session on the base station or user plane tunnel information of the multicast session on the UPF to an MCF network element.

Optionally, if a user plane path of the multicast session passes through a MUF network element and the UPF network element, and a user plane tunnel between the UPF network element and the MUF network element has not been established, the SMF network element sends the user plane tunnel information of the multicast session on the UPF network element to the MCF network element, to establish the user plane tunnel between the UPF network element and the MUF network element. To identify the multicast service, the SMF network element sends the identifier of the multicast service to the MCF network element. For example, the identifier of the multicast service may be the MBS-ID allocated by the MCF network element, or the identifier of the multicast service may be the multicast address, the destination port number, the source address, or the like of the multicast service. Optionally, if the SMF network element or the base station allocates the identifier of the multicast session, the SMF network element may further send the identifier of the multicast session to the MCF network element. The MCF network element stores the identifier of the multicast service, so that when the multicast service needs to be updated subsequently, the identifier of the multicast service may be used to identify the multicast service.

Optionally, if a user plane path of the multicast session does not pass through the UPF network element, after the SMF network element receives the user plane tunnel information of the multicast session on the base station, the SMF network element sends the user plane tunnel information of the multicast session on the base station to the MCF network element, to establish a direct user plane tunnel from a MUF network element to the base station.

Optionally, the SMF network element may send the identifier of the base station to the MCF network element, and the MCF network element identifies the base station as a base station having established the multicast session for the multicast service. Alternatively, the MCF network element identifies the SMF network element as an SMF network element that has established the multicast session for the multicast service, that is, the MCF network element may not record which base stations have established the multicast session for the multicast service, but the SMF network element maintains the multicast session corresponding to the multicast service.

S514: The MCF network element sends the user plane tunnel information of the multicast session on the UPF network element or the user plane tunnel information of the multicast session on the base station to the MUF network element.

The user plane tunnel information of the multicast session on the UPF network element is used to establish the user plane tunnel between the MUF network element and the UPF network element. The user plane tunnel information of the multicast session on the base station is used to establish the user plane tunnel between the MUF network element and the base station.

Optionally, if the MCF network element receives the user plane tunnel information on the UPF network element or the user plane tunnel information on the base station, the MCF network element sends the user plane tunnel information of the multicast session on the UPF network element or the user plane tunnel information of the multicast session on the base station to the MUF network element.

It should be noted that S509 to S511 may be simultaneously performed with S512 to S514, or may be performed after S514.

In the embodiment shown in FIG. 5A and FIG. 5B, after the terminal device sends a request to the SMF network element for joining the multicast session corresponding to the multicast service, the SMF network element requests the base station to establish the multicast session corresponding to the multicast service and then add the terminal device to the multicast session corresponding to the multicast service, so that service data can be sent to the terminal device in the multicast manner, to improve resource utilization.

Figure 6A:
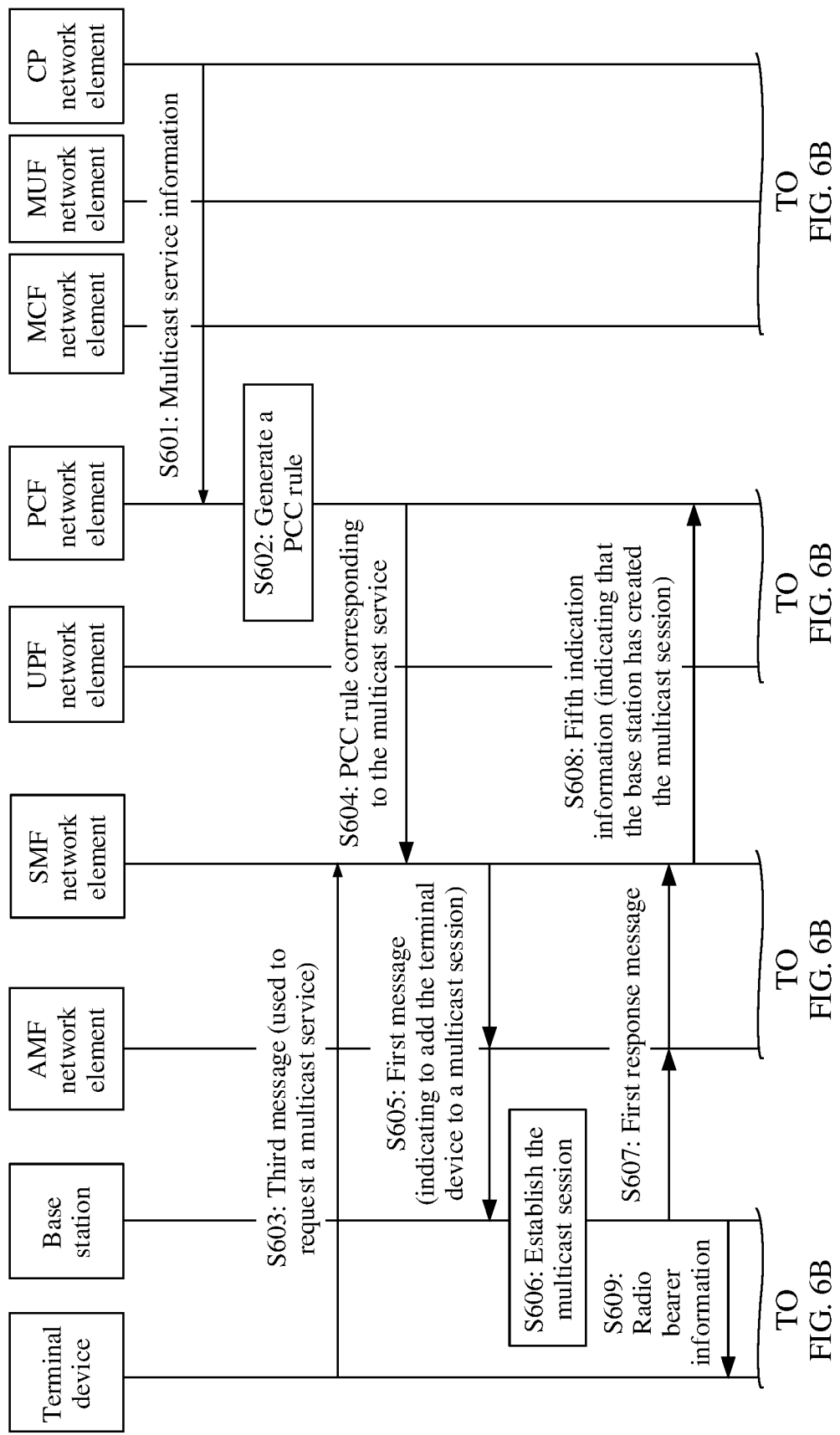
FIG. 6A and FIG. 6B are a schematic flowchart of still another communication method according to an embodiment of this application.
Figure 6B:
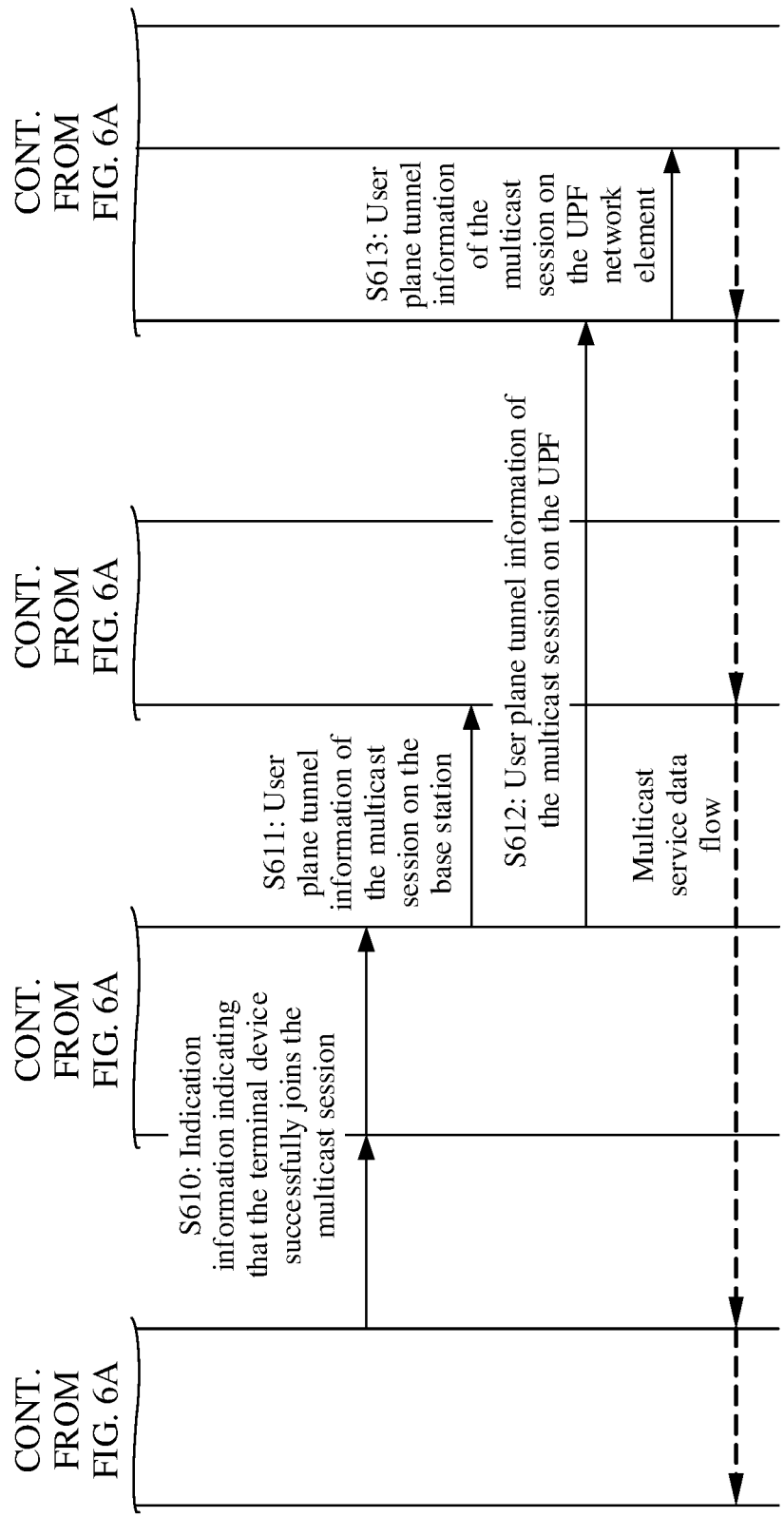

FIG. 6A and FIG. 6B are a schematic flowchart of still another communication method according to an embodiment of this application. The embodiment shown in FIG. 6A and FIG. 6B may be applied to the architectures of the communication systems shown in FIG. 1B and FIG. 1C. In the embodiment shown in FIG. 6A and FIG. 6B, after a terminal device requests to join a multicast session corresponding to a multicast service, an SMF network element requests a base station to add the terminal device to the multicast session corresponding to the multicast service. If the base station has not established the multicast session corresponding to the multicast service, the base station first establishes the multicast session, and then adds the terminal device to the multicast session. Refer to FIG. 6A and FIG. 6B. The method may include the following steps.

S601: A PCF network element obtains multicast service information from a CP network element.

S602: The PCF network element generates a PCC rule based on the multicast service information.

S603: The terminal device sends a third message to the SMF network element.

The third message may be used to request the multicast service, and the third message may include an identifier of the multicast service.

S604: The SMF network element obtains the PCC rule corresponding to the multicast service from the PCF network element.

It should be noted that, for a process of performing S601 to S604, refer to the process of performing S501 to S504. Details are not described herein again.

S605: The SMF network element sends a first message to the base station.

The first message may be used to indicate to add the terminal device to the multicast session corresponding to the multicast service, the first message may include an identifier of the terminal device and first indication information, and the first indication information is used to indicate the multicast session.

It should be noted that the description in S509 is applicable to S605, and details are not described herein again.

The first message may be used to indicate to add the terminal device to the multicast session corresponding to the multicast service. Alternatively, the first message may be used to indicate the base station to establish the multicast session corresponding to the multicast service and add the terminal device to the multicast session corresponding to the multicast service. This may include the following two cases:

First case: The first message is used to indicate to add the terminal device to the multicast session corresponding to the multicast service.

Optionally, the SMF network element may first determine whether the base station has established the multicast session corresponding to the multicast service. After the SMF network element determines that the base station has established the multicast session, the SMF network element sends the first message to the base station, where the first message does not include multicast information. After the base station receives the first message, because the first message does not include the multicast information, the base station may determine that the base station has established the multicast session, and the base station adds the terminal device to the established multicast session. Optionally, the base station may alternatively determine, based on local information, that the multicast session has been established for the multicast service.

Optionally, the SMF network element may not determine whether the base station has established the multicast session corresponding to the multicast service, but send the first message to the base station, where the first message includes multicast information. The base station determines whether the multicast session has been established. If the base station has not established the multicast session, the base station establishes the multicast session based on the multicast information in the first message.

Optionally, the SMF network element may not determine whether the base station has established the multicast session corresponding to the multicast service, but send the first message to the base station, where the first message does not include multicast information. The base station determines whether the multicast session has been established. If the base station has not established the multicast session, the base station obtains the multicast information from a network, and establishes the multicast session based on the obtained multicast information.

Second case: The first message is used to indicate the base station to establish the multicast session corresponding to the multicast service and add the terminal device to the multicast session corresponding to the multicast service.

In this case, the SMF network element determines that the base station has not established the multicast session for the multicast service. Therefore, the first message may further include multicast information, and the multicast information is used to indicate the base station to establish the multicast session corresponding to the multicast service. Alternatively, the first message may further include multicast information and fourth indication information, where the fourth indication information is used to indicate the base station to establish the multicast session.

In this case, after the base station receives the first message, if the first message includes the multicast information, or the first message further includes the multicast information and the fourth indication information, the base station may determine that the base station has not established the multicast session corresponding to the multicast service. In this case, the base station first establishes the multicast session corresponding to the multicast service, and then adds the terminal device to the multicast session corresponding to the multicast service. Optionally, the base station may alternatively determine, based on local information, that the multicast session has been established for the multicast service.

It should be noted that, for a manner in which the SMF network element determines whether the base station has established the multicast session corresponding to the multicast service, refer to S505, and details are not described herein again.

S606: The base station establishes the multicast session.

Before the base station establishes the multicast session, the base station may first obtain the multicast information, and establish the multicast session based on the multicast information.

Optionally, the base station may obtain the multicast information in the following feasible implementations:

First manner: The first message includes the multicast information, and the base station may obtain the multicast information from the first message.

In the second case in step S605, the first message includes the multicast information. In a part of scenarios of the first case in step S605, the first message also includes the multicast information. When the first message includes the multicast information, the base station may obtain the multicast information from the first message.

Second manner: The first message does not include the multicast information. After receiving the first message, the base station determines whether the base station has established the multicast session corresponding to the multicast service. When the base station determines that the multicast session corresponding to the multicast service has not been established, the base station sends, to the SMF network element, indication information used to indicate that the base station does not have the multicast service. After receiving the indication information, the SMF network element sends a second message to the base station, where the second message includes the multicast information of the multicast service. In this manner, for description of sending the second message by the SMF network element to the base station and establishing the multicast session by the base station based on the message, refer to S505 and S506.

Third manner: The first message does not include the multicast information. After receiving the first message, the base station determines whether the base station has established the multicast session corresponding to the multicast service. When the base station has not established the multicast session corresponding to the multicast service, the base station sends a first request message to the SMF network element (or an M-SMF network element or an MCF network element), where the first request message is used to request to establish the multicast session corresponding to the multicast service. After receiving the request message, the SMF network element sends the multicast information to the base station. The first request message includes the identifier of the multicast service.

Optionally, the first request message may further include indication information used to indicate to establish the multicast session.

In the third manner, the base station may send the first request message to the SMF network element in the following two manners:

Manner 1: The base station sends the request message to an AMF network element serving the terminal device. The AMF network element determines the SMF network element, and sends the request message to the SMF network element. For example, the base station may send the first request message and an identifier of a PDU session (a PDU session corresponding to the third message sent by the terminal device) to the AMF network element serving the terminal device. The AMF network element determines the SMF network element based on the identifier of the PDU session, and sends the first request message to the SMF network element.

Manner 2: The base station may alternatively not select a serving AMF network element of the terminal device to send the first request message. In this case, the base station may select another AMF network element (namely, an M-AMF network element) based on a service area of the base station and/or the multicast service. Correspondingly, the M-AMF network element may alternatively not select an SMF network element corresponding to a PDU session to send the request message. In this case, the M-AMF network element selects another SMF network element (namely, the M-SMF or the MCF network element) based on the service area of the base station and/or the multicast service to send the request message.

Optionally, the first request message sent by the base station further includes user plane tunnel information of the multicast session on the base station, where the user plane tunnel information is used by the base station to receive data of the multicast service.

Optionally, the first request message further includes an identifier of the multicast session. The identifier of the multicast session is an identifier allocated by the base station to the multicast session.

The SMF network element sends a response message for the first request message to the base station, where the response message includes the multicast information.

Optionally, the response message includes an identifier of the multicast session. The identifier of the multicast session is an identifier allocated by the SMF network element to the multicast session.

Optionally, the response message further includes user plane tunnel information of the multicast session on the base station. The user plane tunnel information of the multicast session on the base station is used by the base station to receive the data of the multicast service, and includes a multicast address and a multicast tunnel identifier. After receiving the user plane tunnel information of the multicast session on the base station, the base station sends an IGMP message based on the multicast address to join a multicast group corresponding to the multicast address, to receive a data packet by using the multicast address.

Optionally, after receiving the first request message, the SMF network element may request the PCF network element to establish a policy session for the multicast session. Optionally, the SMF network element may send the identifier of the multicast service to the PCF network element, so that the PCF network element associates the policy session with the multicast service. For example, the SMF network element may send a policy session establishment request to the PCF network element. The PCF network element establishes the policy session based on the policy session establishment request, and associates the established policy session with the multicast service.

For a process in which the base station establishes the multicast session based on the multicast information, refer to step S506. Details are not described herein again.

S607: The base station sends a first response message to the SMF network element.

In the third manner of step S606, step S607 does not need to be performed.

S608: The SMF network element sends fifth indication information to a first device.

It should be noted that, in FIG. 6A and FIG. 6B, an example in which the first device is the PCF network element is used for description.

It should be noted that, for a process of performing S607 and S608, refer to the process of performing S507 and S508. Details are not described herein again.

S609: The base station sends radio bearer information corresponding to the multicast session to the terminal device based on the first message.

S610: The base station sends, to the SMF network element, indication information used to indicate that the terminal device successfully joins the multicast session.

S611: The SMF network element sends the user plane tunnel information of the multicast session on the base station to a UPF network element.

Optionally, after the SMF network element receives the user plane tunnel information of the multicast session on the base station, the SMF network element sends the user plane tunnel information of the multicast session on the base station to the UPF network element. That is, S611 may be performed after S607.

S612: The SMF network element sends the user plane tunnel information of the multicast session on the base station or user plane tunnel information of the multicast session on the UPF to the MCF network element.

S613: The MCF network element sends the user plane tunnel information of the multicast session on the UPF network element to a MUF network element, where the user plane tunnel information is used to establish a user plane tunnel between the MUF network element and the UPF network element.

It should be noted that, for a process of performing S609 to S613, refer to the process of performing S510 to S514. Details are not described herein again.

It should be noted that S609 and S610 may be simultaneously performed with S611 to S613.

In the embodiment shown in FIG. 6A and FIG. 6B, after the terminal device sends a request to the SMF network element for joining the multicast session corresponding to the multicast service, the SMF network element requests the base station to add the terminal device to the multicast session. If the base station has not established the multicast session corresponding to the multicast service, the base station first establishes the multicast session corresponding to the multicast service, and then adds the terminal device to the multicast session corresponding to the multicast service, so that service data can be sent to the terminal device in a multicast manner, to improve resource utilization.

It should be noted that, in the embodiments shown in FIG. 5A and FIG. 5B, and FIG. 6A and FIG. 6B, when an architecture of a communication system is that shown in FIG. 1C, the AMF network element in the embodiments in FIG. 5A and FIG. 5B, and FIG. 6A and FIG. 6B may alternatively be the M-AMF network element, the SMF network element may alternatively be the M-SMF network element, and the UPF network element may alternatively be the M-UPF network element.

Figure 7A:
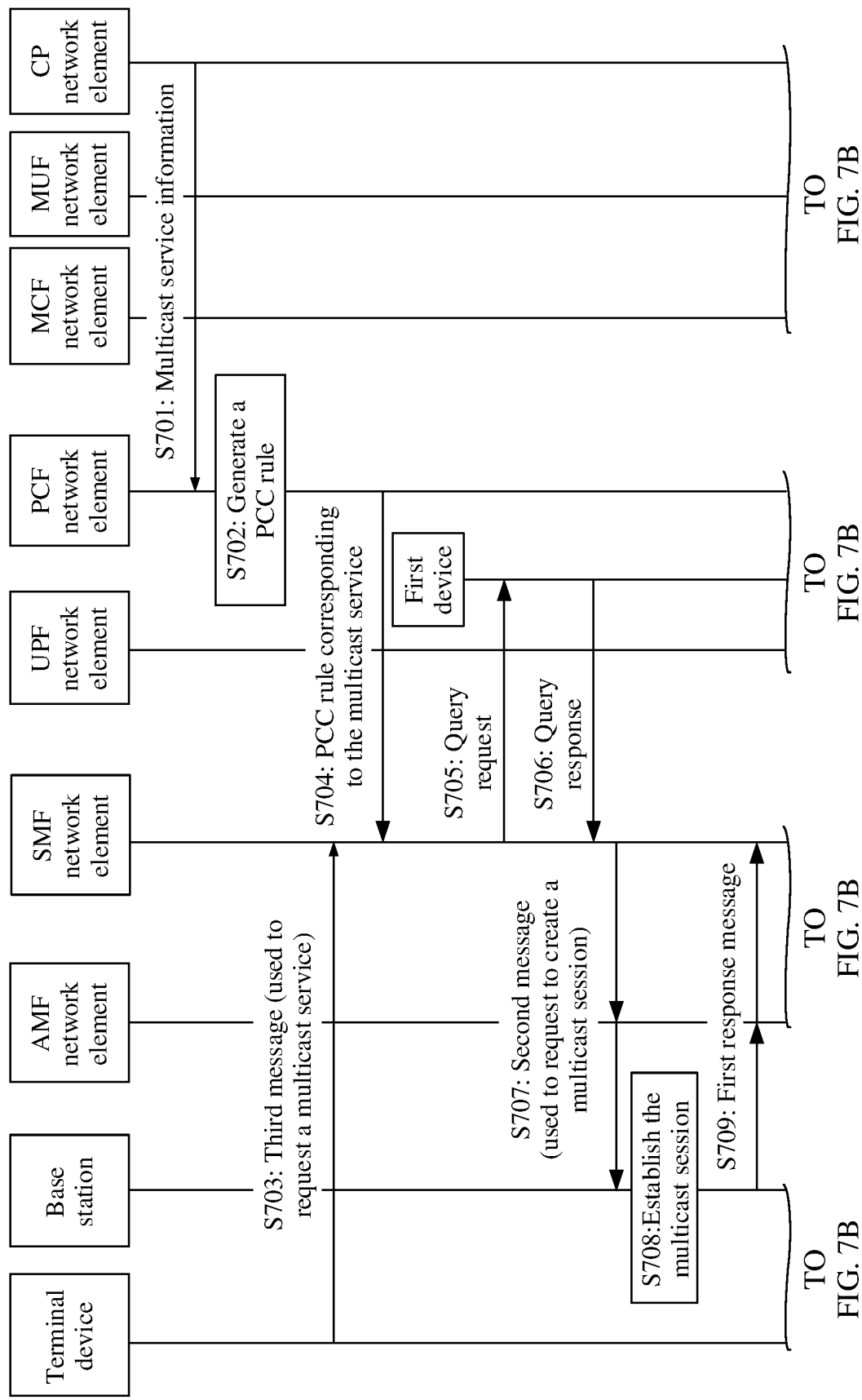
FIG. 7A and FIG. 7B are a schematic flowchart of another communication method according to an embodiment of this application.
Figure 7B:
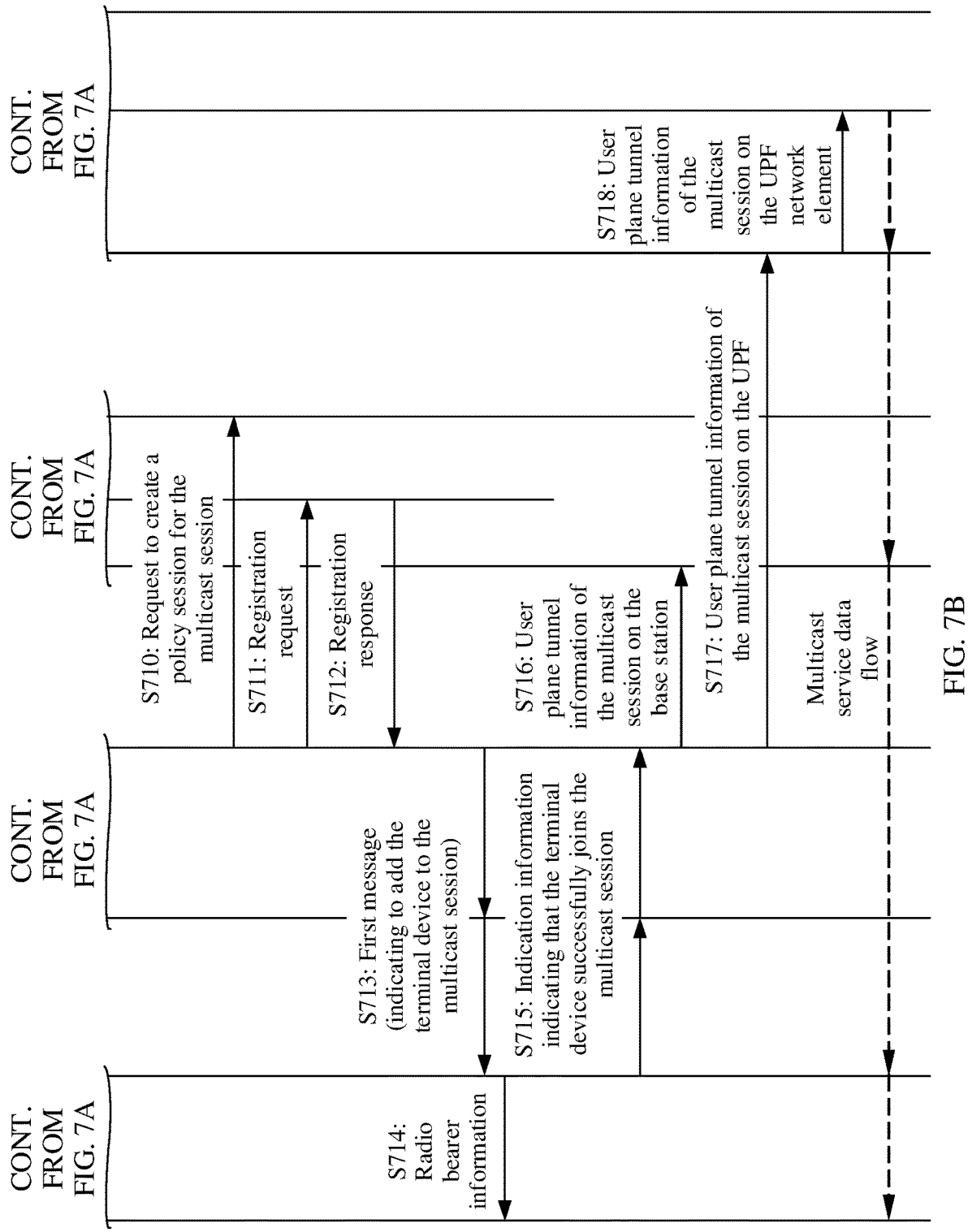

FIG. 7A and FIG. 7B are a schematic flowchart of another communication method according to an embodiment of this application. The embodiment shown in FIG. 7A and FIG. 7B may be applied to the architectures of the communication systems shown in FIG. 1B and FIG. 1C. In the embodiment shown in FIG. 7A and FIG. 7B, after a terminal device requests to join a multicast session corresponding to a multicast service, whether a base station has established the multicast session corresponding to the multicast service is first queried in a storage device. If the base station has not established the multicast session, an SMF network element first requests the base station to establish the multicast session corresponding to the multicast service, and then requests the base station to add the terminal device to the multicast session. Refer to FIG. 7A and FIG. 7B. The method may include the following steps.

S701: A PCF network element obtains multicast service information from a CP network element.

S702: The PCF network element generates a PCC rule based on the multicast service information.

S703: The terminal device sends a third message to the SMF network element.

The third message may be used to request the multicast service, and the third message may include an identifier of the multicast service.

S704: The SMF network element obtains the PCC rule corresponding to the multicast service from the PCF network element.

It should be noted that, for a process of performing S701 to S704, refer to the process of performing S501 to S504. Details are not described herein again.

A difference from S504 lies in: In S704, the SMF network element does not need to send an identifier of the base station to the PCF network element, and the PCF network element does not need to determine, based on the identifier of the base station, whether the base station has established the multicast session for the multicast service.

Optionally, the PCF network element may send an MBS-ID of the multicast service to the SMF network element.

S705: The SMF network element sends a query request to a first device.

The query request may be used to query whether the base station has established the multicast session corresponding to the multicast service.

Optionally, the first device may be a UDM network element, a unified data repository (UDR) network element, or an unstructured data storage function (UDSF). Certainly, the first device may alternatively be another network element, for example, an MCF network element or the PCF network element. This is not limited in this embodiment of this application.

The first device may store information about the established multicast session, where the information about the established multicast session includes at least one of the identifier of the multicast service corresponding to the established multicast session, an identifier of a base station corresponding to the established multicast session, an identifier of a serving SMF network element of the established multicast session, multicast information of the multicast service, or an identifier of the established multicast session.

In an actual application process, when the base station has established the multicast session, the SMF network element stores, to the first device, the information about the multicast session established by the base station.

Optionally, the query request may include an identifier of the base station and/or the identifier of the multicast service (the MBS-ID, a multicast address of the multicast service, or an optional source address of the multicast service).

S706: The first device sends a query response to the SMF network element.

Content included in the query response varies with content included in the query request. This may include the following three cases:

First case: The query request includes the identifier of the base station and the MBS-ID of the multicast service.

In this case, the first device queries, based on the identifier of the base station and the MBS-ID of the multicast service, whether the corresponding multicast session exists. If the corresponding multicast session does not exist, the first device notifies the SMF network element by using the query response that the corresponding multicast session is not found. If the corresponding multicast session exists, the first device notifies the SMF network element by using the query response that the corresponding multicast session is found. Optionally, the query response includes at least one of the identifier allocated by the base station to the multicast session of the multicast service or an identifier of a network device serving the multicast session.

Second case: The query request includes the identifier of the base station.

In this case, the query response may include identifiers of multicast services of all multicast sessions corresponding to the base station.

After the SMF network element receives the query response, the SMF network element may query, among all the multicast sessions, whether the multicast session corresponding to the multicast service exists.

Third case: The query request includes the MBS-ID of the multicast service.

In this case, the query response includes information about base stations corresponding to all multicast sessions corresponding to the multicast service.

After the SMF network element receives the query response, the SMF network element queries, among all the multicast sessions, whether the multicast session corresponding to the base station exists.

Optionally, if the base station has established the multicast session of the multicast service, the response message includes the identifier of the multicast session.

The following provides description by using an example in which the SMF network element determines that the base station has not established the multicast session corresponding to the multicast service. It should be noted that S713 may be performed if the SMF network element determines that the base station has established the multicast session corresponding to the multicast service.

S707: The SMF network element sends a second message to the base station.

S708: The base station establishes the multicast session based on the multicast information.

S709: The base station sends a first response message to the SMF network element.

It should be noted that, for a process of performing S707 to S709, refer to the process of performing S505 to S507. Details are not described herein again.

S710: The SMF network element requests the PCF network element to establish a policy session for the multicast session.

The SMF network element may request the PCF network element to establish the corresponding policy session for the multicast session.

Optionally, the SMF network element may send the identifier of the multicast service to the PCF network element, so that the PCF network element associates the policy session with the multicast service. For example, the SMF network element may send a policy session establishment request to the PCF network element. The PCF network element establishes the policy session based on the policy session establishment request, and associates the established policy session with the multicast service.

It should be noted that S710 is an optional step.

S711: The SMF network element sends a registration request to the storage device.

The registration request may be used to request to store (register) the multicast session in (with) the storage device. The registration request may include at least one of the identifier of the multicast service, the identifier of the base station, the identifier of the multicast session, or the identifier of the serving SMF of the multicast session.

S712: The storage device sends a registration response to the SMF network element.

After the storage device successfully registers the multicast session, the storage device sends the registration response to the SMF network element, where the registration response is used to indicate that the storage device successfully registers the multicast session.

S713: The SMF network element sends a first message to the base station.

S714: The base station sends radio bearer information corresponding to the multicast session to the terminal device based on the first message.

Optionally, first indication information in the first message is the identifier of the multicast session. The identifier of the multicast session is obtained from the first device in step S706, or is obtained in the process of steps S707 to S709.

S715: The base station sends, to the SMF network element, indication information used to indicate that the terminal device successfully joins the multicast session.

S716: The SMF network element sends user plane tunnel information of the multicast session on the base station to a UPF network element.

S717: The SMF network element sends the user plane tunnel information of the multicast session on the base station or user plane tunnel information of the multicast session on the UPF to an MCF network element.

S718: The MCF network element sends the user plane tunnel information of the multicast session on the UPF network element to a MUF network element, where the user plane tunnel information is used to establish a user plane tunnel between the MUF network element and the UPF network element.

It should be noted that, for a process of performing S713 to S718, refer to the process of performing S509 to S514. Details are not described herein again.

It should be noted that S713 to S715 may be simultaneously performed with S716 to S718.

In the embodiment shown in FIG. 7A and FIG. 7B, after the terminal device sends a request to the SMF network element for joining the multicast session corresponding to the multicast service, the SMF network element queries the storage device for whether the base station has established the multicast session corresponding to the multicast service. If determining that the base station has not established the multicast session corresponding to the multicast service, the SMF network element requests the base station to establish the multicast session corresponding to the multicast service and then add the terminal device to the multicast session corresponding to the multicast service, so that service data can be sent to the terminal device in a multicast manner, to improve resource utilization.

It should be noted that, in the embodiment shown in FIG. 7A and FIG. 7B, when the SMF network element determines that the base station has not established the multicast session corresponding to the multicast service, the SMF network element may further send, to the base station, the first message that carries fourth indication information, so that after receiving the first message, the base station establishes the multicast session corresponding to the multicast service, and adds the terminal device to the multicast session. For a process thereof, refer to the embodiment shown in FIG. 6A and FIG. 6B, and details are not described herein again.

Figure 8A:
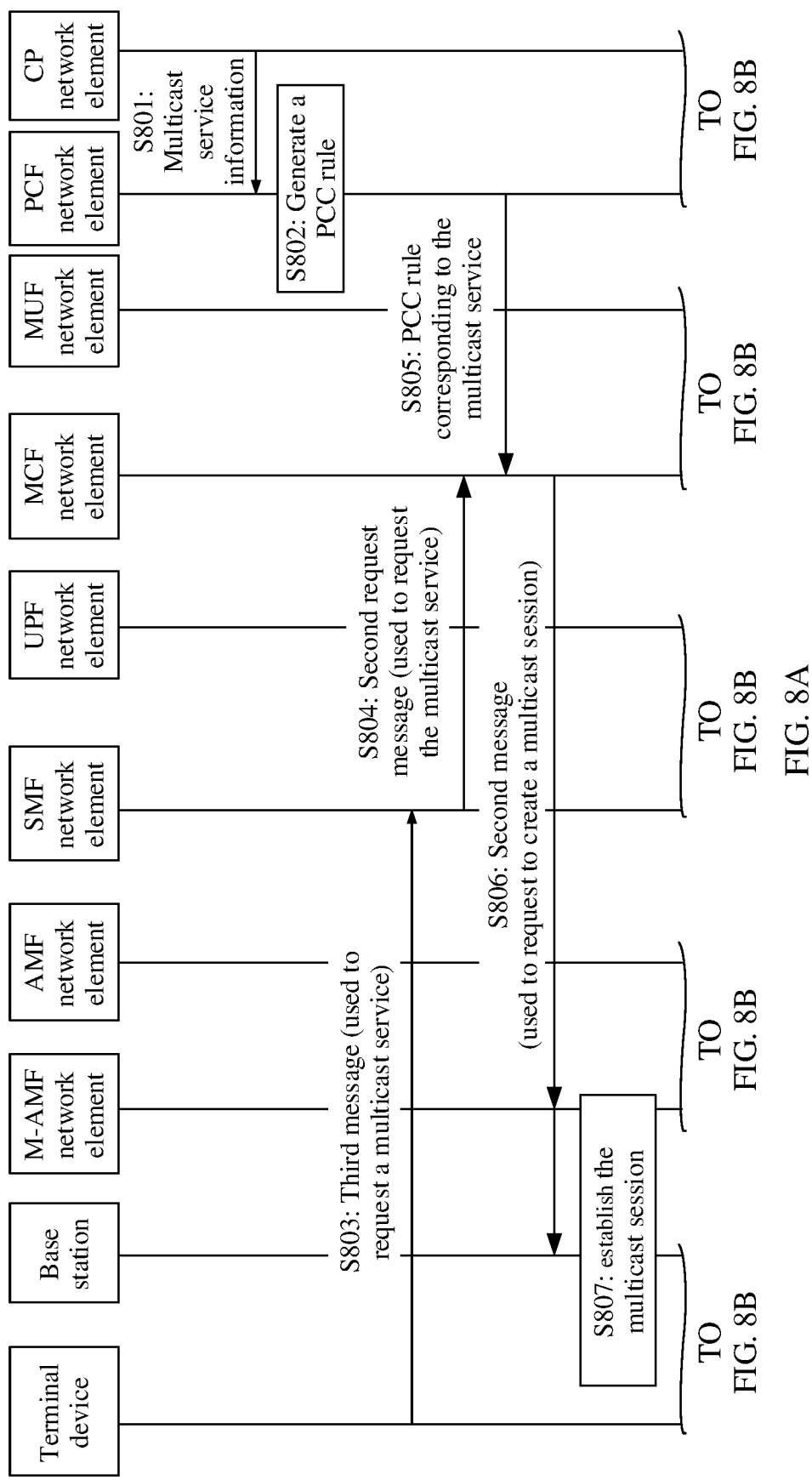
FIG. 8A and FIG. 8B are a schematic flowchart of yet another communication method according to an embodiment of this application.
Figure 8B:
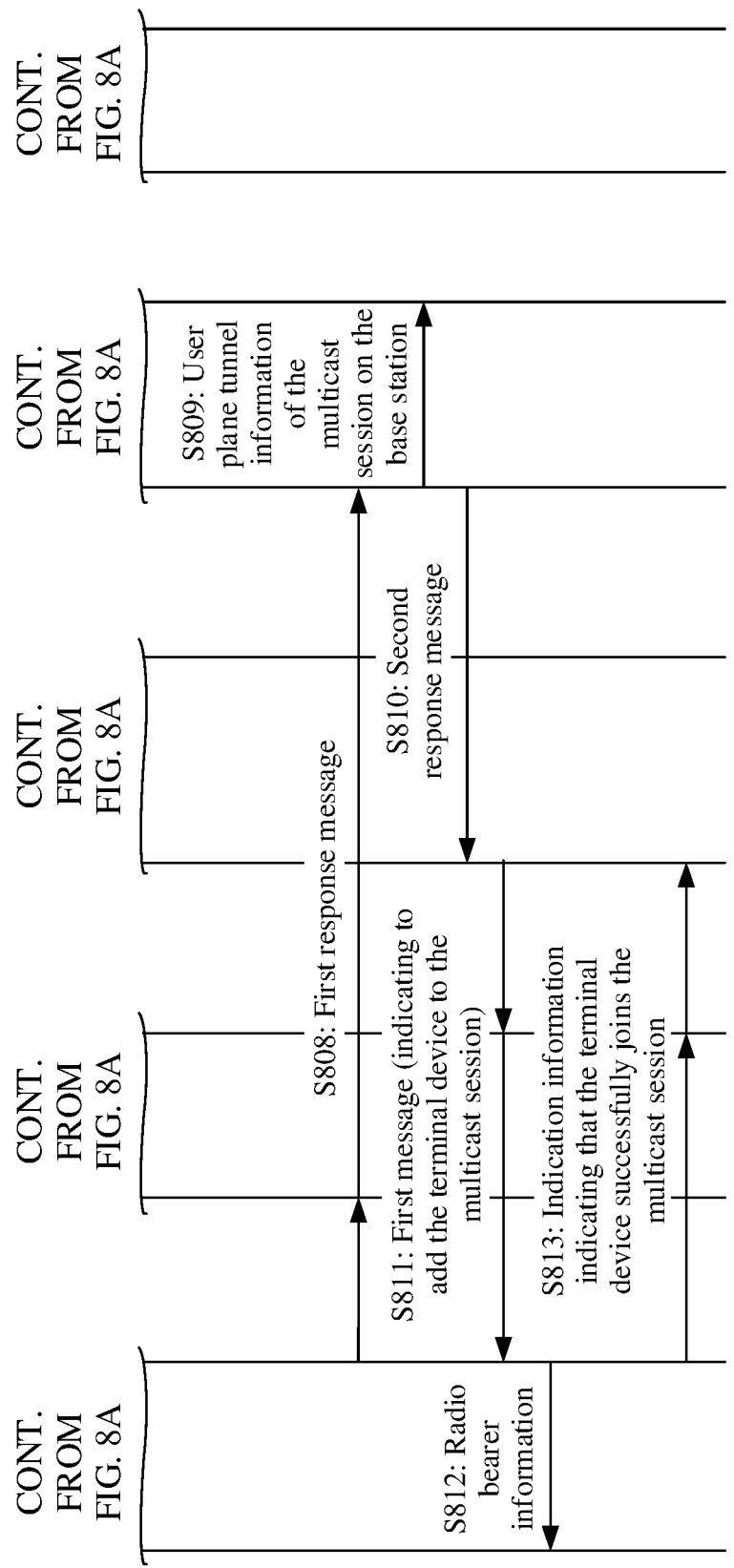

FIG. 8A and FIG. 8B are a schematic flowchart of yet another communication method according to an embodiment of this application. The embodiment shown in FIG. 8A and FIG. 8B may be applied to the architecture of the communication system shown in FIG. 1D. In the embodiment shown in FIG. 8A and FIG. 8B, after a terminal device sends a request to an SMF network element for joining a multicast session corresponding to a multicast service, the SMF network element may send, to an MCF network element, a request indicating that the terminal device requests to join the multicast session, so that the MCF requests a base station to establish the multicast session, and requests the base station to add the terminal device to the multicast session. Refer to FIG. 8A and FIG. 8B. The method may include the following steps.

S801: A PCF network element obtains multicast service information from a CP.

It should be noted that, for description of the multicast service information, refer to S501, and details are not described herein again.

Optionally, the PCF network element may request to obtain the multicast service information from the CP, or the CP may actively send the multicast service information to the PCF network element.

Optionally, the PCF network element may allocate an MBS-ID to the multicast service. If the PCF network element allocates the MBS-ID to the multicast service, the PCF network element may send the MBS-ID of the multicast service to the CP.

It should be noted that the CP may interface with the PCF network element through a NEF network element. In other words, the CP first sends the multicast service information to the NEF network element, and then the NEF network element sends the multicast service information to the PCF network element. If the NEF network element exists, the NEF network element may alternatively allocate the MBS-ID to the multicast service, and separately send the MBS-ID of the multicast service to the PCF network element and the CP.

S802: The PCF network element generates a PCC rule based on the multicast service information.

S803: The terminal device sends a third message to the SMF network element.

The third message may be used to request the multicast service, and the third message may include an identifier of the multicast service.

It should be noted that, for a process of performing S802 and S803, refer to the process of performing S502 and S503. Details are not described herein again.

S804: The SMF network element sends a second request message to the MCF network element.

The second request message may include an identifier of the base station accessed by the terminal device and the identifier of the multicast service.

Optionally, the second request message is used to indicate that a terminal device is to receive the multicast service from the base station.

Optionally, the second request message is used to obtain information about the multicast session established for the multicast service on the base station.

Optionally, the SMF network element first determines the MCF network element, and then sends the second request message to the MCF network element. The SMF may select the MCF based on at least one of information about the base station or the identifier of the multicast service, and send the identifier of the base station and the identifier of the multicast service to the MCF. For example, the SMF network element may select the MCF network element through an NRF network element.

Optionally, the SMF network element determines whether a service range of the multicast service includes the base station. The SMF network element may determine, in the manner described in S505, whether the service range of the multicast service includes the base station.

Optionally, before the SMF network element sends the second request message to the MCF network element, the SMF network element first determines whether the terminal device is allowed to access the multicast service, and sends the second request message only when determining that the terminal device is allowed to access the multicast service. Accessing the multicast service may also be referred to as receiving the multicast service. For a process in which the SMF network element determines whether the terminal device is allowed to access the multicast service, refer to S302. Details are not described herein again.

Optionally, the MCF network element may alternatively determine whether the terminal device is allowed to access the multicast service. In this case, the second request message further includes an identifier of the terminal device. After the MCF network element receives the second request message, the MCF network element first determines whether the terminal device is allowed to access the multicast service. The MCF network element may alternatively determine, in the manner in S302, whether the terminal device is allowed to access the multicast service. Details are not described herein again.

S805: The MCF network element obtains the PCC rule corresponding to the multicast service from the PCF network element.

Optionally, the MCF network element determines, based on the identifier of the multicast service, whether the PCC rule corresponding to the multicast service already exists locally. If the PCC rule does not exist locally, the MCF network element obtains the PCC rule corresponding to the multicast service from the PCF network element.

It should be noted that for a process of performing S805, refer to the process of performing S504. Different from S504, S805 is performed by the MCF network element. In addition, in S805, the PCF network element does not need to determine, based on the identifier of the base station, whether the base station has established the multicast session for the multicast service.

S806: The MCF network element sends a second message to the base station.

Optionally, the MCF network element sends the second message when determining that the service range of the multicast service includes the base station.

Optionally, the MCF network element sends the second message when determining that the terminal device is allowed to receive the multicast service and that the service range of the multicast service includes the base station.

Optionally, the MCF network element sends the second message if determining that the base station has not established the multicast session for the multicast service. For a method for determining, by the MCF network element, that the base station has not established the multicast session for the multicast service, refer to S505, where an execution body in S505 is replaced with the MCF.

The second message includes multicast information of the multicast service.

The second message is used to indicate the base station to establish the multicast session corresponding to the multicast service.

It should be noted that for a process of performing S806, refer to the process of performing S505. Different from S505, S806 is performed by the MCF network element. In addition, in S806, the MCF network element can send an N2 request message to the base station only in the second implementation in S505. That is, the MCF network element cannot send the N2 request message through a signaling connection of the terminal device.

Optionally, the MCF network element first selects an M-AMF network element, and sends the second message to the base station through the M-AMF network element. For example, the MCF network element may select an AMF network element based on the identifier of the base station accessed by the terminal device and/or the identifier of the multicast service, and the MCF network element may select the AMF network element through the NRF. For example, the AMF network element may send at least one of the identifier of the base station or the identifier of the multicast service to the NRF network element, and the NRF network element sends, to the AMF network element, information about an SMF network element that meets a condition.

S807: The base station establishes the multicast session based on the multicast information.

It should be noted that, for a process of performing S807, refer to the process of performing S506. Details are not described herein again.

S808: The base station sends a first response message to the MCF network element.

It should be noted that for a process of performing S808, refer to the process of performing S507. A difference from S507 lies in: In S808, the base station sends the first response message to the MCF network element.

Optionally, the base station may first send the first response message to the M-AMF network element, and then the M-AMF network element sends the first response message to the MCF network element.

S809: The MCF network element sends user plane tunnel information of the multicast session on the base station to a MUF network element.

After receiving the user plane tunnel information of the multicast session on the base station, the MUF network element may establish a user plane tunnel between the MCF network element and the MUF network element.

S810: The MCF network element sends a second response message to the SMF network element.

The second response message may be used to indicate that the base station accessed by the terminal device successfully establishes the multicast session.

Optionally, the second response message includes an identifier of the multicast session or the identifier of the multicast service.

Optionally, the second response message further includes the multicast information of the multicast service.

S811: The SMF network element sends a first message to the base station.

The first message includes the identifier of the multicast session or the identifier of the multicast service.

Optionally, the first message includes the multicast information of the multicast service.

S812: The base station sends radio bearer information corresponding to the multicast session to the terminal device based on the first message.

S813: The base station sends, to the SMF network element, indication information used to indicate that the terminal device successfully joins the multicast session.

It should be noted that, for a process of performing S812 and S813, refer to the process of performing S510 to S511. Details are not described herein again.

In the embodiment shown in FIG. 8A and FIG. 8B, after the terminal device sends the request to the SMF network element to join the multicast session corresponding to the multicast service, the SMF network element may send, to the MCF network element, the request indicating that the terminal device requests to join the multicast session, so that the MCF requests the base station to establish the multicast session, and requests the base station to add the terminal device to the multicast session.

It should be noted that, in the embodiment shown in FIG. 8A and FIG. 8B, when the MCF network element determines that the base station has not established the multicast session corresponding to the multicast service, the MCF network element may further send, to the base station, the first message that carries fourth indication information, so that after receiving the first message, the base station establishes the multicast session corresponding to the multicast service, and adds the terminal device to the multicast session. For a process thereof, refer to the embodiment shown in FIG. 6A and FIG. 6B, and details are not described herein again.

Figure 9A:
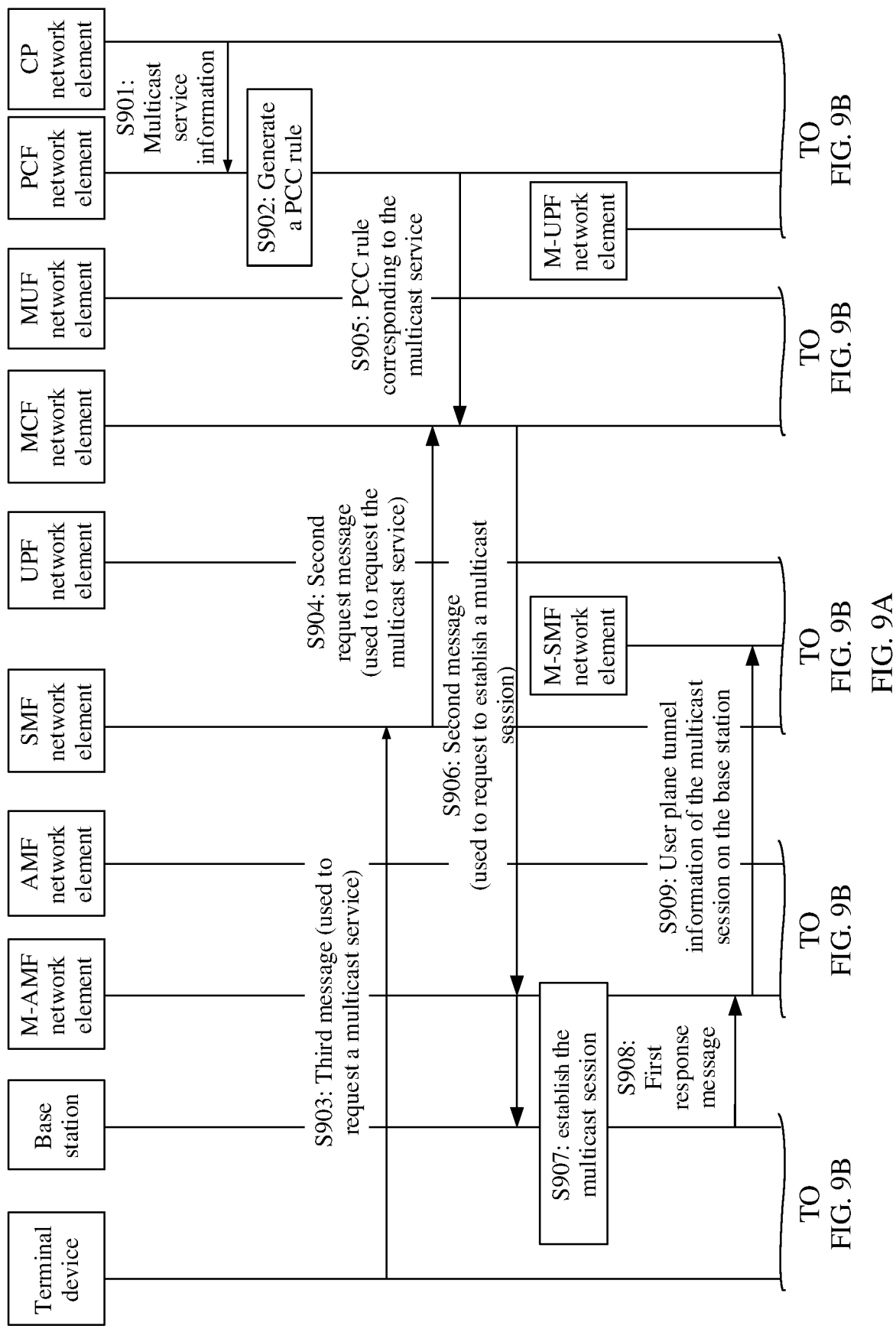
FIG. 9A and FIG. 9B are a schematic flowchart of still another communication method according to an embodiment of this application.
Figure 9B:
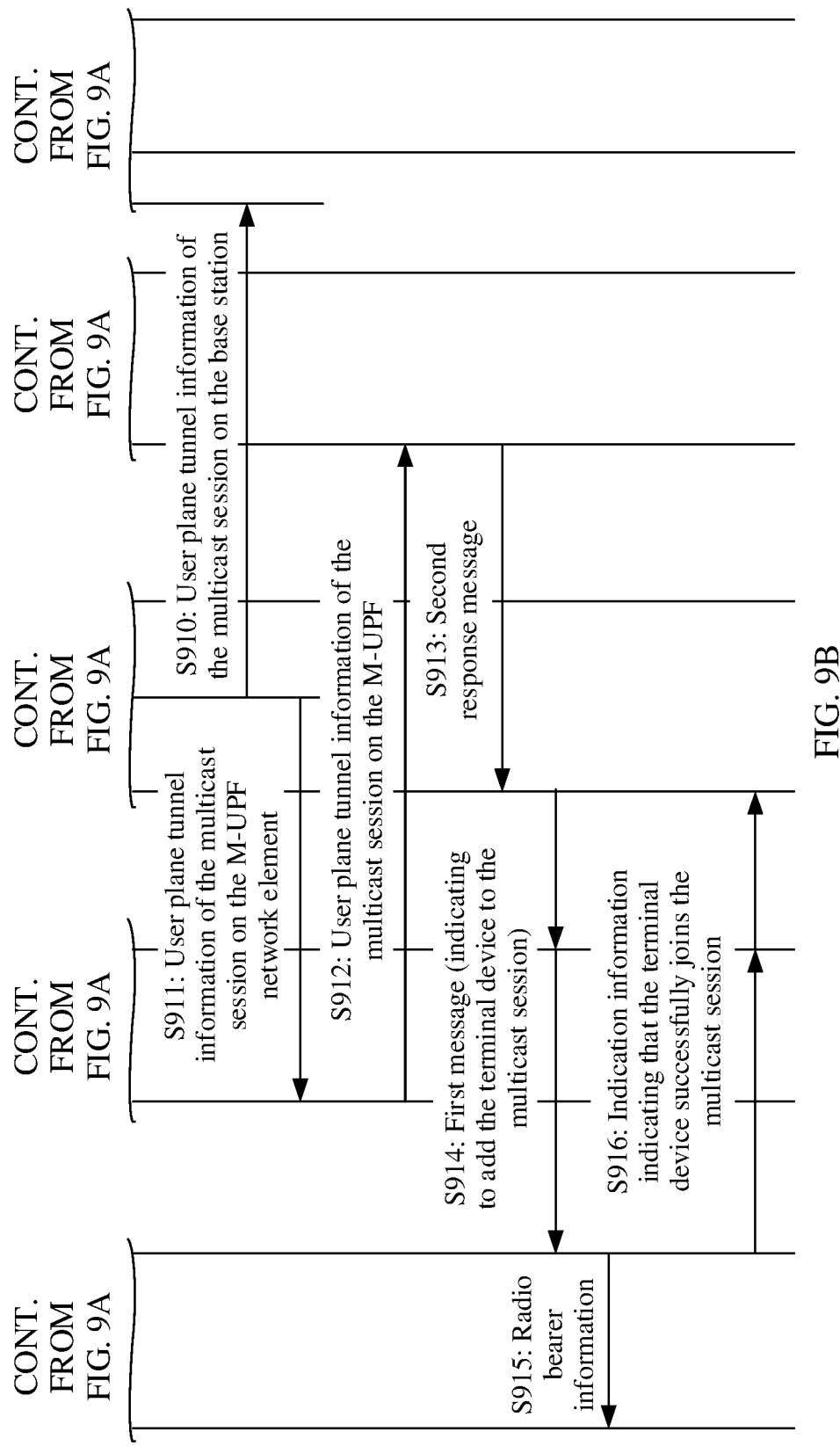

FIG. 9A and FIG. 9B are a schematic flowchart of still another communication method according to an embodiment of this application. The embodiment shown in FIG. 9A and FIG. 9B may be applied to the architecture of the communication system shown in FIG. 1D. In the embodiment shown in FIG. 9A and FIG. 9B, after a terminal device sends a request to an SMF network element for joining a multicast session corresponding to a multicast service, the SMF network element may send, to an MCF network element, a request indicating that the terminal device requests to join the multicast session, so that the MCF requests a base station to establish the multicast session, and requests the base station to add the terminal device to the multicast session. Refer to FIG. 9A and FIG. 9B. The method may include the following steps.

S901: A PCF network element obtains multicast service information from a CP network element.

S902: The PCF network element generates a PCC rule based on the multicast service information.

S903: The terminal device sends a third message to the SMF network element.

The third message may be used to request the multicast service, and the third message may include an identifier of the multicast service.

S904: The SMF network element sends a request message to the MCF network element.

The request message may be used to request to obtain the multicast service. The request message may include an identifier of the base station accessed by the terminal device and the identifier of the multicast service.

S905: The MCF network element obtains the PCC rule corresponding to the multicast service from the PCF network element.

S906: The MCF network element sends a second message to the base station.

S907: The base station establishes the multicast session based on multicast information.

It should be noted that, for a process of performing S901 to S907, refer to the process of performing S801 to S807. Details are not described herein again.

S908: The base station sends a first response message to an M-AMF network element.

It should be noted that for a process of performing S908, refer to the process of performing S507. A difference from S507 lies in: In S908, the base station sends the first response message to the M-AMF network element.

S909: The M-AMF network element sends user plane tunnel information of the multicast session on the base station to an M-SMF network element.

Optionally, the M-AMF network element first selects the M-SMF network element, and then sends the user plane tunnel information of the multicast session on the base station to the M-SMF network element. For example, the M-AMF network element may select the M-SMF network element based on the identifier of the base station and/or the identifier of the multicast service, and the M-AMF may obtain, from an NRF, information about an M-SMF network element that meets a condition.

The M-AMF network element may further send an identifier of the multicast session and/or the identifier of the multicast service to the M-SMF network element.

S910: The M-SMF network element sends the user plane tunnel information of the multicast session on the base station to an M-UPF network element.

After receiving the user plane tunnel information of the multicast session on the base station, the M-UPF network element establishes a user plane tunnel between the M-SMF and the M-UPF network element.

Optionally, the M-SMF or the M-UPF further allocates user plane tunnel information of the multicast session on the M-UPF network element.

S911: The M-SMF network element sends the user plane tunnel information of the multicast session on the M-UPF to the M-AMF network element.

S912: The M-AMF network element sends the user plane tunnel information of the multicast session on the M-UPF to the MCF network element. The MCF sends the user plane tunnel information of the multicast session on the M-UPF to the M-UPF.

S913: The MCF network element sends a second response message to the SMF network element.

The second response message may be used to indicate that the base station accessed by the terminal device successfully establishes the multicast session.

Optionally, the second response message may include the identifier of the multicast session or the identifier of the multicast service.

Optionally, the second response message further includes the multicast information of the multicast service.

S914: The SMF network element sends a first message to the base station.

The first message includes the identifier of the multicast session or the identifier of the multicast service.

Optionally, the first message includes the multicast information of the multicast service.

S915: The base station sends radio bearer information corresponding to the multicast session to the terminal device based on the first message.

S916: The base station sends, to the SMF network element, indication information used to indicate that the terminal device successfully joins the multicast session.

It should be noted that, for a process of performing S913 to S916, refer to the process of performing S810 to S813. Details are not described herein again.

In the embodiment shown in FIG. 9A and FIG. 9B, after the terminal device sends the request to the SMF network element to join the multicast session corresponding to the multicast service, the SMF network element may send, to the MCF network element, the request indicating that the terminal device requests to join the multicast session, so that the MCF requests the base station to establish the multicast session, and requests the base station to add the terminal device to the multicast session.

It should be noted that, in the embodiment shown in FIG. 9A and FIG. 9B, when the MCF network element determines that the base station has not established the multicast session corresponding to the multicast service, the MCF network element may further send, to the base station, the first message that carries fourth indication information, so that after receiving the first message, the base station establishes the multicast session corresponding to the multicast service, and adds the terminal device to the multicast session. For a process thereof, refer to the embodiment shown in FIG. 6A and FIG. 6B, and details are not described herein again.

It should be noted that, on the basis of the foregoing embodiments, the base station may alternatively request the first network device (for example, the M-SMF network element or the MCF network element) to establish the multicast session corresponding to the multicast service, and the first network device establishes the multicast session corresponding to the multicast service. For example, the base station may send a second request message to the first network device, where the second request message includes the information about the base station and a first identifier of the multicast service. The first network device determines whether the base station is located within the service range corresponding to the multicast service. When the base station is located within the service range of the multicast service, the first network device establishes the multicast session corresponding to the multicast service on the base station.

Figure 10:
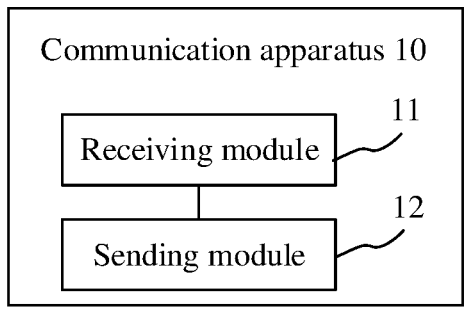
FIG. 10 is a schematic diagram of a structure of a communication apparatus according to an embodiment of this application.

FIG. 10 is a schematic diagram of a structure of a communication apparatus according to an embodiment of this application. The communication apparatus may be disposed in a base station. Refer to FIG. 10. The communication apparatus 10 may include a receiving module 11 and a sending module 12.

The receiving module 11 is configured to receive a first message from a first network device, where the first message is used to indicate to add a terminal device to a multicast session corresponding to a multicast service, the first message includes first indication information, and the first indication information is used to indicate the multicast session.

The sending module 12 is configured to send radio bearer information corresponding to the multicast session to the terminal device based on the first message, where the radio bearer information is used by the terminal device to join the multicast session.

Optionally, the receiving module 11 may perform S202 in the embodiment in FIG. 2, S509 in the embodiment in FIG. 5A and FIG. 5B, S605 in the embodiment in FIG. 6A and FIG. 6B, S713 in the embodiment in FIG. 7A and FIG. 7B, S811 in the embodiment in FIG. 8A and FIG. 8B, and S914 in the embodiment in FIG. 9A and FIG. 9B. It should be noted that the receiving module 11 may further perform steps related to receiving by the base station in the embodiments in FIG. 2 to FIG. 9A and FIG. 9B, for example, S505 in the embodiment in FIG. 5A and FIG. 5B and S707 in the embodiment in FIG. 7A and FIG. 7B.

Optionally, the sending module 12 may perform S203 in the embodiment in FIG. 2, S510 in the embodiment in FIG. 5A and FIG. 5B, S608 in the embodiment in FIG. 6A and FIG. 6B, S714 in the embodiment in FIG. 7A and FIG. 7B, S812 in the embodiment in FIG. 8A and FIG. 8B, and S915 in the embodiment in FIG. 9A and FIG. 9B. It should be noted that the sending module 12 may further perform steps related to sending by the base station in the embodiments in FIG. 2 to FIG. 9A and FIG. 9B, for example, S507 and S511 in the embodiment in FIG. 5A and FIG. 5B and S607 and S610 in the embodiment in FIG. 6A and FIG. 6B.

It should be noted that the communication apparatus may further include a processing module 13, and the receiving module 11 and the sending module 12 may work under control of the processing module 13.

It should be noted that the communication apparatus in this embodiment of this application may perform the technical solutions in the foregoing method embodiments. Implementation principles and beneficial effects thereof are similar, and details are not described herein again.

In a possible implementation, the first message further includes second indication information, and the second indication information is used to indicate to add the terminal device to the multicast session.

In a possible implementation, the radio bearer information includes configuration information of a radio bearer corresponding to the multicast session, and the configuration information includes an identifier of the radio bearer and an identifier of a multicast quality of service (QOS) flow mapped to the radio bearer.

Figure 11:
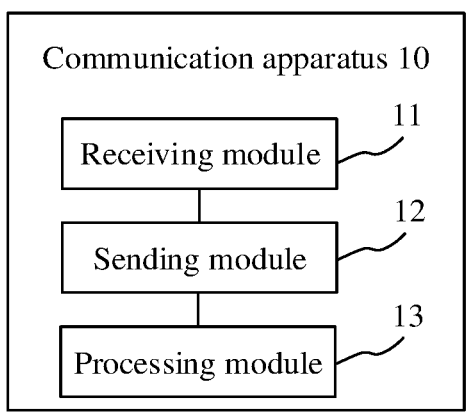
FIG. 11 is a schematic diagram of a structure of another communication apparatus according to an embodiment of this application.

FIG. 11 is a schematic diagram of a structure of another communication apparatus according to an embodiment of this application. Refer to FIG. 11. Based on the embodiment shown in FIG. 10, the communication apparatus 10 further includes a processing module 13.

The processing module 13 is configured to determine a manner of receiving data of the multicast session by the terminal device.

When the manner of receiving the data of the multicast session by the terminal device is multicast, the radio bearer information further includes first information of the multicast session, and the first information is used to indicate radio resource information for sending and/or receiving the data of the multicast session.

In a possible implementation, the sending module 12 is further configured to: when a base station has not establish the multicast session corresponding to the multicast service, send a first request message to a second network device, where the first request message is used to request to establish the multicast session corresponding to the multicast service, and the first request message includes an identifier of the multicast service.

The receiving module 11 is further configured to receive multicast information of the multicast service from the second network device.

The processing module 13 is further configured to determine the radio bearer information based on the multicast information.

In a possible implementation, the first request message further includes indication information used to indicate to establish the multicast session.

In a possible implementation, the receiving module 11 is further configured to receive a second message from a second network device, where the second message is used to indicate a base station to establish the multicast session corresponding to the multicast service, and the second message includes multicast information of the multicast service.

The processing module 13 is further configured to establish the multicast session based on the second message.

In a possible implementation, the second message further includes third indication information, and the third indication information is used to indicate the base station to establish the multicast session.

In a possible implementation, the sending module 12 is further configured to send indication information to the second network device when the base station has not established the multicast session corresponding to the multicast service, where the indication information is used to indicate that the base station has no information about the multicast service.

In a possible implementation, the first message further includes the multicast information of the multicast service, and the processing module 13 is further configured to:
  Establish the multicast session based on the multicast information; and
  determine the radio bearer information based on the multicast information.

In a possible implementation, the processing module 13 is specifically configured to: when the base station has not established the multicast session corresponding to the multicast service, establish the multicast session based on the multicast information.

In a possible implementation, the first message further includes fourth indication information, where the fourth indication information is used to indicate the base station to establish the multicast session corresponding to the multicast service.

The processing module 13 is specifically configured to establish the multicast session based on the multicast information and the fourth indication information.

In a possible implementation, the processing module 13 is further configured to determine an access and mobility management function (AMF) network element serving the multicast session.

The sending module 12 is further configured to send the first request message to the second network device through the AMF network element.

In a possible implementation, the processing module 13 is specifically configured to:
  determine the AMF network element based on at least one of location information of the base station or the identifier of the multicast service; or
  determine an AMF network element serving the terminal device as the AMF network element serving the multicast session.

In a possible implementation, the multicast information includes: quality of service (QoS) information of a multicast QoS flow of the multicast service and an identifier of the multicast QoS flow.

In a possible implementation, the processing module 13 is further configured to allocate an identifier of the multicast session. The sending module 12 is further configured to send the identifier of the multicast session to the first network device or the second network device.

Alternatively, the receiving module 11 is further configured to receive an identifier of the multicast session from the first network device or the second network device.

In a possible implementation, the sending module 12 is further configured to send user plane tunnel information of the multicast session on the base station to the first network device or the second network device.

In a possible implementation, the sending module 12 is further configured to send, to a session management function (SMF) network element, indication information used to indicate that the terminal device successfully joins the multicast session.

In a possible implementation, the identifier of the multicast service is a globally unique identifier of the multicast service or multicast address information of the multicast service.

In a possible implementation, the first network device is an SMF network element serving the terminal device, and the second network device is the SMF network element or a multicast control function (MCF) network element.

It should be noted that the communication apparatus in this embodiment of this application may perform the technical solutions in the foregoing method embodiments. Implementation principles and beneficial effects thereof are similar, and details are not described herein again.

Figure 12:
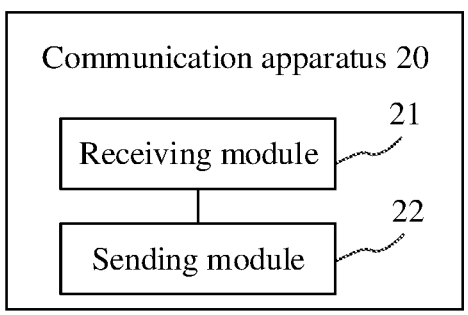
FIG. 12 is a schematic diagram of a structure of still another communication apparatus according to an embodiment of this application.

FIG. 12 is a schematic diagram of a structure of still another communication apparatus according to an embodiment of this application. The communication apparatus 20 may be disposed in an SMF network element. Refer to FIG. 12. The communication apparatus 20 may include a receiving module 21 and a sending module 22.

The receiving module 21 is configured to receive a third message from a terminal device, where the third message is used to request a multicast service, and the third message includes an identifier of the multicast service.

The sending module 22 is configured to send a first message to a base station, where the first message is used to indicate to add the terminal device to a multicast session corresponding to the multicast service, the first message includes first indication information, the first indication information is used to indicate the multicast session, and the base station is a base station accessed by the terminal device.

Optionally, the receiving module 21 may perform S201 in the embodiment in FIG. 2, S503 in the embodiment in FIG. 5A and FIG. 5B, S603 in the embodiment in FIG. 6A and FIG. 6B, S703 in the embodiment in FIG. 7A and FIG. 7B, S803 in the embodiment in FIG. 8A and FIG. 8B, and S903 in the embodiment in FIG. 9A and FIG. 9B. It should be noted that the receiving module 21 may further perform steps related to receiving by the SMF network element in the embodiments in FIG. 2 to FIG. 9A and FIG. 9B, for example, S504 and S507 in the embodiment in FIG. 5A and FIG. 5B and S607 and S610 in the embodiment in FIG. 6A and FIG. 6B.

Optionally, the sending module 22 may perform S202 in the embodiment in FIG. 2, S509 in the embodiment in FIG. 5A and FIG. 5B, S605 in the embodiment in FIG. 6A and FIG. 6B, S713 in the embodiment in FIG. 7A and FIG. 7B, S811 in the embodiment in FIG. 8A and FIG. 8B, and S914 in the embodiment in FIG. 9A and FIG. 9B. It should be noted that the sending module 22 may further perform steps related to sending by the SMF network element in the embodiments in FIG. 2 to FIG. 9A and FIG. 9B, for example, S505 in the embodiment in FIG. 5A and FIG. 5B and S608 in the embodiment in FIG. 6A and FIG. 6B.

It should be noted that the communication apparatus may further include a processing module 23, and the receiving module 21 and the sending module 22 may work under control of the processing module 23.

It should be noted that the communication apparatus in this embodiment of this application may perform the technical solutions in the foregoing method embodiments. Implementation principles and beneficial effects thereof are similar, and details are not described herein again.

In a possible implementation, the first message further includes second indication information, and the second indication information is used to indicate to add the terminal device to the multicast session.

In a possible implementation, the third message further includes indication information used to request the multicast service.

In a possible implementation, the sending module 22 is specifically configured to:
when the base station has established the multicast session corresponding to the multicast service, send the first message to the base station.

In a possible implementation, the sending module 22 is further configured to:
send a second message to the base station, where the second message is used to indicate the base station to establish the multicast session corresponding to the multicast service, and the second message includes multicast information of the multicast service.

In a possible implementation, the sending module 22 is specifically configured to:
when the base station has not established the multicast session corresponding to the multicast service, send the second message to the base station, where the second message is used to indicate the base station to establish the multicast session corresponding to the multicast service.

In a possible implementation, the second message further includes third indication information, and the third indication information is used to indicate the base station to establish the multicast session.

In a possible implementation, the receiving module 21 is further configured to receive a first request message from the base station, where the first request message includes the identifier of the multicast service, and the first request message is used to request the multicast information of the multicast service, or is used to request to establish the multicast session corresponding to the multicast service.

In a possible implementation, the first message further includes the multicast information of the multicast service.

Alternatively, the first message further includes the multicast information of the multicast service and fourth indication information, where the fourth indication information is used to indicate the base station to establish the multicast session.

In a possible implementation, when the base station has not established the multicast session corresponding to the multicast service, the first message further includes the multicast information of the multicast service, or the first message further includes the multicast information of the multicast service and the fourth indication information.

In a possible implementation, the multicast information includes: quality of service (QoS) information of a multicast QoS flow of the multicast service and an identifier of the multicast QoS flow.

Figure 13:
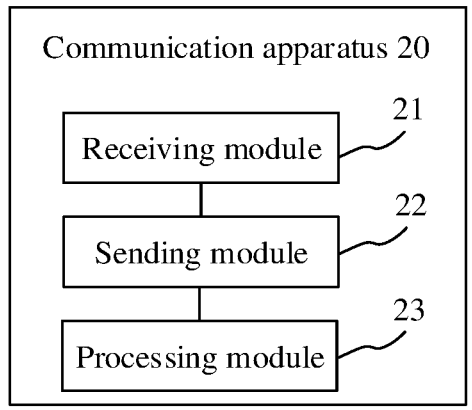
FIG. 13 is a schematic diagram of a structure of yet another communication apparatus according to an embodiment of this application.

FIG. 13 is a schematic diagram of a structure of yet another communication apparatus according to an embodiment of this application. Refer to FIG. 13. Based on the embodiment shown in FIG. 12, the communication apparatus 20 may further include a processing module 23.

The processing module 23 is further configured to obtain the multicast information according to a PCC rule of the multicast service.

The PCC rule includes at least one of the following information: a multicast broadcast service identifier (MBS-ID) of the multicast service, description information of the multicast QoS flow of the multicast service, the identifier of the multicast QoS flow of the multicast service, the QoS information of the multicast QoS flow of the multicast service, a list of terminal devices supported by the multicast service, or a service range supported by the multicast service.

In a possible implementation, the sending module 22 is specifically configured to send the second message to the base station when the base station is located within the service range of the multicast service.

In a possible implementation, the processing module 23 is specifically configured to:
obtain policy information, where the policy information includes the service range of the multicast service; and
determine, based on information about the base station, that the base station is located within the service range of the multicast service.

In a possible implementation, the processing module 23 is further configured to:
obtain the information about the base station.

In a possible implementation, the processing module 23 is further configured to obtain access control information, where the access control information includes any one of the list of terminal devices allowed to access the multicast service or a list of multicast services allowed to be accessed by the terminal device.

The sending module 22 is specifically configured to send the first message when the communication apparatus determines, based on the access control information, that the terminal is allowed to access the multicast service.

In a possible implementation, the processing module 23 is further configured to obtain, from a first device, the multicast session that corresponds to the multicast service and that has been established by the base station.

The first device stores information about the established multicast session, and the information about the established multicast session includes at least one of the identifier of the multicast service corresponding to the established multicast session, an identifier of a base station corresponding to the established multicast session, an identifier of a serving SMF network element of the established multicast session, the multicast information of the multicast service, or an identifier of the established multicast session.

In a possible implementation, the sending module 22 is further configured to send fifth indication information to the first device, where the fifth indication information is used to indicate that the base station has established the multicast session corresponding to the multicast service.

In a possible implementation, the sending module 22 is further configured to send a second request message to an MCF network element, where the second request message includes first identification information and identification information of the base station.

The receiving module 21 is further configured to receive a response message from the MCF network element, where the response message includes second identification information.

The first identification information is a multicast address of the multicast service, and the second identification information is an MBS-ID of the multicast service. Alternatively, the first identification information is a multicast address of the multicast service or an MBS-ID of the multicast service, and the second identification information is the identifier of the multicast session or the MBS-ID of the multicast service.

In a possible implementation, the second request message further includes an identifier of the terminal device, and the identifier of the terminal device is used by the MCF network element to determine whether the terminal device is allowed to perform the multicast service.

Alternatively, the response message includes the list of terminal devices supported by the multicast service, and the processing module 23 is further configured to determine, based on the list of terminal devices supported by the multicast service, whether the terminal device is allowed to perform the multicast service.

In a possible implementation, the processing module 23 is further configured to select the MCF network element based on at least one of the identifier of the multicast service or location information of the base station.

In a possible implementation, the receiving module 21 is further configured to receive, from the base station, indication information used to indicate that the terminal device successfully joins the multicast session.

In a possible implementation, the receiving module 21 is further configured to receive, from the base station, user plane tunnel information of the multicast session on the base station.

The sending module 22 is further configured to send the user plane tunnel information of the multicast session on the base station to a user plane function (UPF) network element, and/or send the user plane tunnel information of the multicast session on the base station or user plane tunnel information of the multicast session on the UPF network element to the MCF network element.

In a possible implementation, the sending module 22 is further configured to send, to the MCF network element, information about a QoS flow that is successfully established and/or information about a QoS flow that fails to be established in the multicast session, where the information about the QoS flow includes an identifier of the QoS flow.

In a possible implementation, the identifier of the multicast service is the MBS-ID of the multicast service or the multicast address of the multicast service.

It should be noted that the communication apparatus in this embodiment of this application may perform the technical solutions in the foregoing method embodiments. Implementation principles and beneficial effects thereof are similar, and details are not described herein again.

Figure 14:
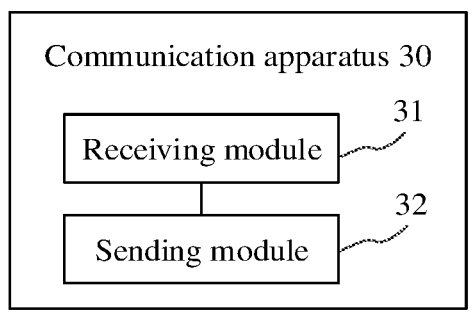
FIG. 14 is a schematic diagram of a structure of another communication apparatus according to an embodiment of this application.

FIG. 14 is a schematic diagram of a structure of another communication apparatus according to an embodiment of this application. The communication apparatus 30 may be disposed in an MCF network element. Refer to FIG. 14. The communication apparatus 30 may include a receiving module 31 and a sending module 32.

The receiving module 31 is configured to receive location information of a terminal device and a first identifier of a multicast service from a session management function (SMF) network element.

The sending module 32 is configured to: when a base station corresponding to the location information of the terminal device has not established a multicast session corresponding to the multicast service, send a first request message to the base station, where the first request message is used to request to establish the multicast session, and the first request message includes a second identifier of the multicast service and multicast information of the multicast service.

Optionally, the receiving module 31 may perform S301 in the embodiment in FIG. 3. It should be noted that the receiving module 31 may further perform steps related to receiving by the MCF network element in the embodiments in FIG. 2 to FIG. 9A and FIG. 9B, for example, S513 in the embodiment in FIG. 5A and FIG. 5B and S612 in the embodiment in FIG. 6A and FIG. 6B.

Optionally, the sending module 32 may perform S302 in the embodiment in FIG. 3. It should be noted that the sending module 32 may further perform steps related to sending by the MCF network element in the embodiments in FIG. 2 to FIG. 9A and FIG. 9B, for example, S514 in the embodiment in FIG. 5A and FIG. 5B and S613 in the embodiment in FIG. 6A and FIG. 6B.

It should be noted that the communication apparatus may further include a processing module 33, and the receiving module 31 and the sending module 32 may work under control of the processing module 33.

It should be noted that the communication apparatus in this embodiment of this application may perform the technical solutions in the foregoing method embodiments. Implementation principles and beneficial effects thereof are similar, and details are not described herein again.

In a possible implementation, the first request message further includes indication information used to indicate the base station to establish the multicast session.

In a possible implementation, the multicast information includes: quality of service (QoS) information of a multicast QoS flow of the multicast service and an identifier of the multicast QoS flow.

Figure 15:
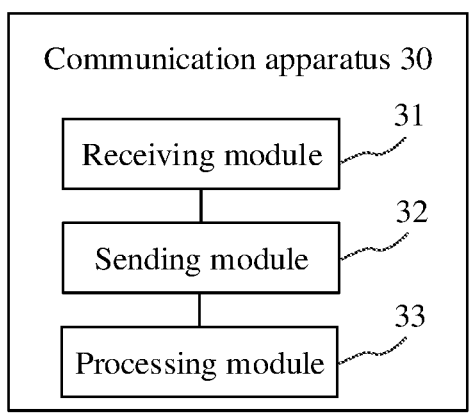
FIG. 15 is a schematic diagram of a structure of still another communication apparatus according to an embodiment of this application.

FIG. 15 is a schematic diagram of a structure of still another communication apparatus according to an embodiment of this application. Refer to FIG. 15. Based on the embodiment shown in FIG. 14, the communication apparatus 30 may further include a processing module 33.

The processing module 33 is configured to obtain the multicast information according to a policy and charging control (PCC) rule of the multicast service.

The PCC rule includes at least one of the following information: a multicast broadcast service identifier (MBS-ID) of the multicast service, description information of the multicast QoS flow of the multicast service, the identifier of the multicast QoS flow of the multicast service, the QoS information of the multicast QoS flow of the multicast service, a list of terminal devices supported by the multicast service, or location information supported by the multicast service.

In a possible implementation, the receiving module 31 is further configured to receive user plane tunnel information of the multicast session on the base station.

The sending module 32 is further configured to send the user plane tunnel information of the multicast session on the base station to a MUF network element, where the user plane tunnel information is used to establish a user plane tunnel between the MUF network element and the base station.

In a possible implementation, the receiving module 31 is further configured to receive user plane tunnel information of the multicast session on a user plane function (UPF) network element.

The sending module 32 is further configured to send the user plane tunnel information of the multicast session on the UPF network element to the MUF network element, where the user plane tunnel information is used to establish a user plane tunnel between the MUF network element and the UPF network element.

In a possible implementation, the receiving module 31 is further configured to: receive an identifier of the multicast session from the base station; or allocate an identifier to the multicast session, and send the identifier of the multicast session to the base station.

In a possible implementation, the sending module 32 is further configured to send a response message to the SMF network element, where the response message includes the identifier of the multicast session or the second identifier of the multicast service.

In a possible implementation, the receiving module 31 is further configured to receive an identifier of the terminal device from the SMF network element.

The processing module 33 is further configured to obtain access control information of the terminal device based on the identifier of the terminal device, where the access control information includes any one of a list of terminal devices allowed to access the multicast service or a list of multicast services allowed to be accessed by the terminal device.

The sending module 32 is further configured to: when the MCF network element determines, based on the access control information, that the terminal device is allowed to perform the multicast service, send the identifier of the multicast session or the second identifier of the multicast service to the SMF network element.

In a possible implementation, the first identifier of the multicast service is the MBS-ID of the multicast service or multicast address information corresponding to the multicast service.

The second identifier of the multicast service is the MBS-ID of the multicast service.

It should be noted that the communication apparatus in this embodiment of this application may perform the technical solutions in the foregoing method embodiments. Implementation principles and beneficial effects thereof are similar, and details are not described herein again.

Figure 16:
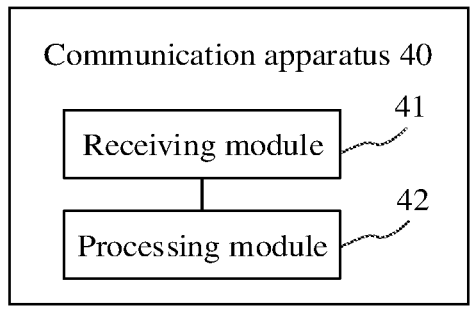
FIG. 16 is a schematic diagram of a structure of yet another communication apparatus according to an embodiment of this application.

FIG. 16 is a schematic diagram of a structure of yet another communication apparatus according to an embodiment of this application. The communication apparatus 40 may be disposed in a first network device. For example, the first network device may be an SMF network element or an MCF network element. Refer to FIG. 16. The communication apparatus 40 includes a receiving module 41 and a processing module 42.

The receiving module 41 is configured to receive a first request message from a base station, where the first request message includes a first identifier of a multicast service, and the first request message is used to establish a multicast session of the multicast service on the base station.

The processing module 42 is configured to: when the base station is located within a service range of the multicast service, establish the multicast session corresponding to the multicast service.

Optionally, the receiving module 41 may perform S401 in the embodiment in FIG. 4A.

Optionally, the processing module 42 may perform S402 in the embodiment in FIG. 4A.

It should be noted that the receiving module 41 may work under control of the processing module 42.

It should be noted that the communication apparatus in this embodiment of this application may perform the technical solutions in the foregoing method embodiments. Implementation principles and beneficial effects thereof are similar, and details are not described herein again.

In a possible implementation, the processing module 42 is further configured to:
 obtain policy information, where the policy information includes the service range of the multicast service; and
 determine, based on information about the base station, that the base station is located within the service range of the multicast service.

In a possible implementation, the processing module 42 is further configured to:
 obtain the information about the base station.

It should be noted that the communication apparatus in this embodiment of this application may perform the technical solutions in the foregoing method embodiments. Implementation principles and beneficial effects thereof are similar, and details are not described herein again.

Figure 17:
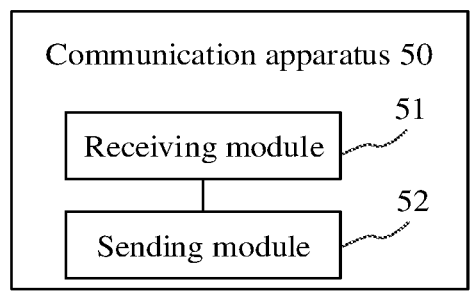
FIG. 17 is a schematic diagram of a structure of another communication apparatus according to an embodiment of this application.

FIG. 17 is a schematic diagram of a structure of another communication apparatus according to an embodiment of this application. The communication apparatus 50 may be disposed in an AMF network element. Refer to FIG. 17. The communication apparatus 50 includes a receiving module 51 and a sending module 52.

The receiving module 51 is configured to receive a first request message from a base station, where the first request message is used to request to establish a multicast session for a multicast service, the first request message includes user plane tunnel information of the multicast session on the base station, and the user plane tunnel information is used to establish a user plane tunnel between the base station and a user plane function (UPF) network element.

The sending module 52 is configured to send a second request message to a first network element, where the second request message is used to request the first network element to establish the multicast session, and the second request message includes the user plane tunnel information of the multicast session on the base station.

Optionally, the receiving module 51 may perform S401 in the embodiment in FIG. 4A. It should be noted that the receiving module 51 may further perform steps related to receiving by the AMF network element in the embodiments in FIG. 2 to FIG. 9A and FIG. 9B. For example, the AMF network element receives a message from an SMF network element.

Optionally, the sending module 52 may perform S402 in the embodiment in FIG. 4A. It should be noted that the sending module 52 may further perform steps related to sending by the AMF network element in the embodiments in FIG. 2 to FIG. 9A and FIG. 9B. For example, the AMF network element sends a message to the base station.

It should be noted that the communication apparatus 50 may further include a processing module 53, and the receiving module 51 and the sending module 52 may work under control of the processing module 53.

It should be noted that the communication apparatus in this embodiment of this application may perform the technical solutions in the foregoing method embodiments. Implementation principles and beneficial effects thereof are similar, and details are not described herein again.

In a possible implementation, the first request message and/or the second request message further include/includes indication information used to indicate to establish the multicast session.

Figure 18:
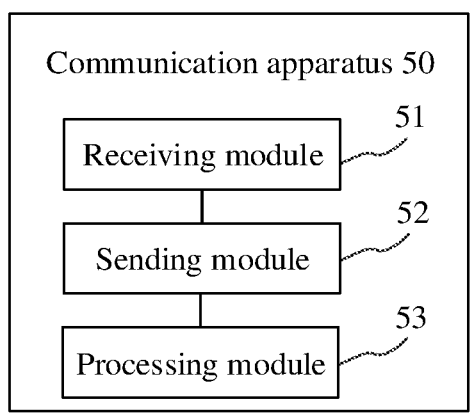
FIG. 18 is a schematic diagram of a structure of still another communication apparatus according to an embodiment of this application.

FIG. 18 is a schematic diagram of a structure of still another communication apparatus according to an embodiment of this application. Refer to FIG. 18. Based on the embodiment shown in FIG. 17, the communication apparatus 50 further includes a processing module 53.

The processing module 53 is configured to determine the first network element based on at least one of an identifier of the base station or an identifier of the multicast service.

In a possible implementation, the first network element is a multicast control function (MCF) network element.

The processing module 53 is further configured to select an SMF network element based on at least one of the identifier of the base station or the identifier of the multicast service.

The sending module 52 is further configured to send the user plane tunnel information of the multicast session on the base station to the SMF network element.

The receiving module 51 is further configured to receive user plane tunnel information of the multicast session on the UPF network element from the SMF network element.

The sending module 52 is further configured to send the user plane tunnel information of the multicast session on the UPF network element to the MCF network element.

It should be noted that the communication apparatus in this embodiment of this application may perform the technical solutions in the foregoing method embodiments. Implementation principles and beneficial effects thereof are similar, and details are not described herein again.

Figure 19:
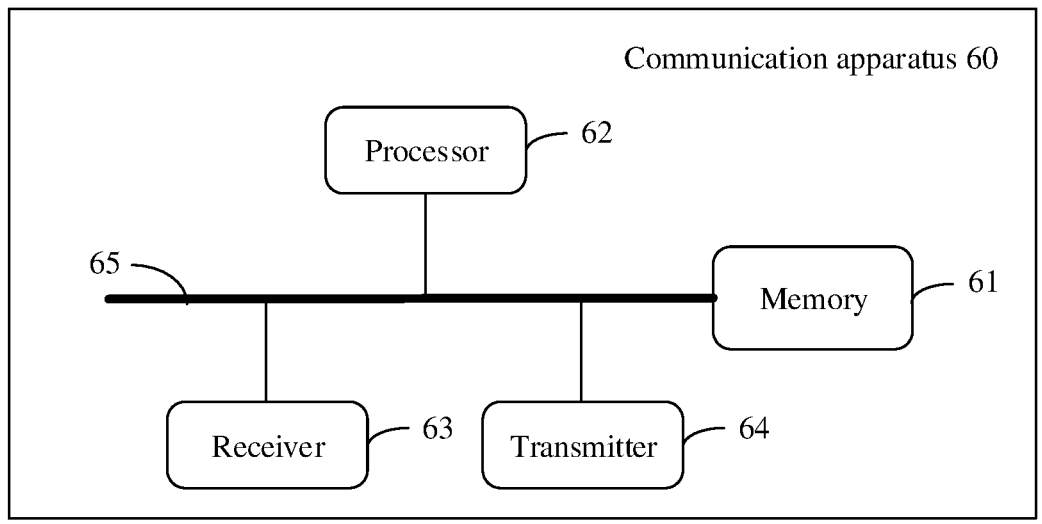
FIG. 19 is a schematic diagram of a hardware structure of a communication apparatus according to this application.

FIG. 19 is a schematic diagram of a hardware structure of a communication apparatus according to this application. The communication apparatus 60 may be disposed in a base station. Refer to FIG. 19. The communication apparatus 60 includes a memory 61, a processor 62, a receiver 63, and a transmitter 64. The memory 61 communicates with the processor 62. For example, the memory 61, the processor 62, the receiver 63, and the transmitter 64 may communicate with each other through a communication bus 65. The memory 61 is configured to store a computer program, and the processor 62 executes the computer program to implement the foregoing communication methods.

Optionally, the receiver 63 in this application may implement functions of the receiving module 11 in the embodiments in FIG. 10 and FIG. 11. The transmitter 64 may implement functions of the sending module 12 in the embodiments in FIG. 10 and FIG. 11. The processor 62 may implement functions of the processing module 13 in the embodiment in FIG. 11. Details are not described herein again.

Optionally, the processor may be a central processing unit (CPU), or may be another general purpose processor, a digital signal processor (DSP), an application-specific integrated circuit (ASIC), or the like. The general purpose processor may be a microprocessor, or the processor may be any conventional processor or the like. Steps in the communication method embodiments disclosed with reference to this application may be directly performed by a hardware processor, or may be performed by a combination of hardware and a software module in the processor.

Figure 20:
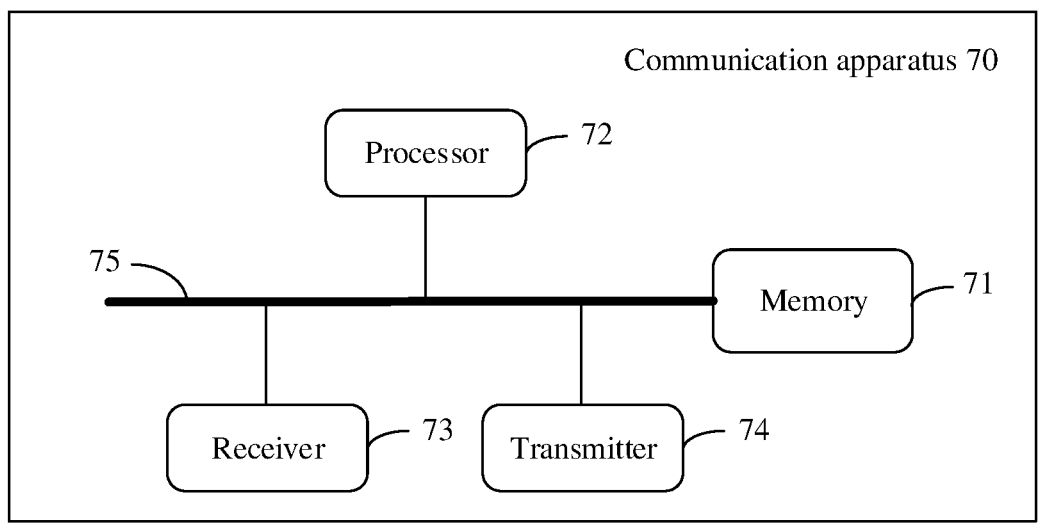
FIG. 20 is a schematic diagram of a hardware structure of a communication apparatus according to this application.

FIG. 20 is a schematic diagram of a hardware structure of a communication apparatus according to this application. The communication apparatus 70 may be disposed in an SMF network element. Refer to FIG. 20. The communication apparatus 70 includes a memory 71, a processor 72, a receiver 73, and a transmitter 74. The memory 71 communicates with the processor 72. For example, the memory 71, the processor 72, the receiver 73, and the transmitter 74 may communicate with each other through a communication bus 75. The memory 71 is configured to store a computer program, and the processor 72 executes the computer program to implement the foregoing communication method.

Optionally, the receiver 73 in this application may implement functions of the receiving module 21 in the embodiments in FIG. 12 and FIG. 13. The transmitter 74 may implement functions of the sending module 22 in the embodiments in FIG. 12 and FIG. 13. The processor 72 may implement functions of the processing module 23 in the embodiment in FIG. 13. Details are not described herein again.

Optionally, the processor may be a central processing unit (CPU), or may be another general purpose processor, a digital signal processor (DSP), an application-specific integrated circuit (ASIC), or the like. The general purpose processor may be a microprocessor, or the processor may be any conventional processor or the like. Steps in the communication method embodiments disclosed with reference to this application may be directly performed by a hardware processor, or may be performed by a combination of hardware and a software module in the processor.

Figure 21:
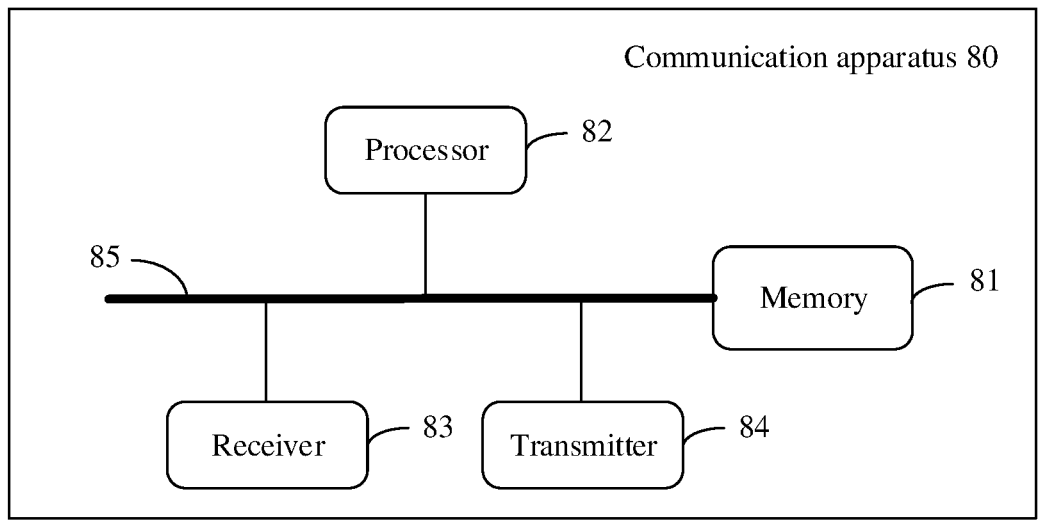
FIG. 21 is a schematic diagram of a hardware structure of a communication apparatus according to this application.

FIG. 21 is a schematic diagram of a hardware structure of a communication apparatus according to this application. The communication apparatus 80 may be disposed in an MCF network element. Refer to FIG. 21. The communication apparatus 80 includes a memory 81, a processor 82, a receiver 83, and a transmitter 84. The memory 81 communicates with the processor 82. For example, the memory 81, the processor 82, the receiver 83, and the transmitter 84 may communicate with each other through a communication bus 85. The memory 81 is configured to store a computer program, and the processor 82 executes the computer program to implement the foregoing communication methods.

Optionally, the receiver 83 in this application may implement functions of the receiving module 31 in the embodiments in FIG. 14 and FIG. 15. The transmitter 84 may implement functions of the sending module 32 in the embodiments in FIG. 14 and FIG. 15. The processor 82 may implement functions of the processing module 33 in the embodiment in FIG. 15. Details are not described herein again.

Optionally, the processor may be a central processing unit (CPU), or may be another general purpose processor, a digital signal processor (DSP), an application-specific integrated circuit (ASIC), or the like. The general purpose processor may be a microprocessor, or the processor may be any conventional processor or the like. Steps in the communication method embodiments disclosed with reference to this application may be directly performed by a hardware processor, or may be performed by a combination of hardware and a software module in the processor.

Figure 22:
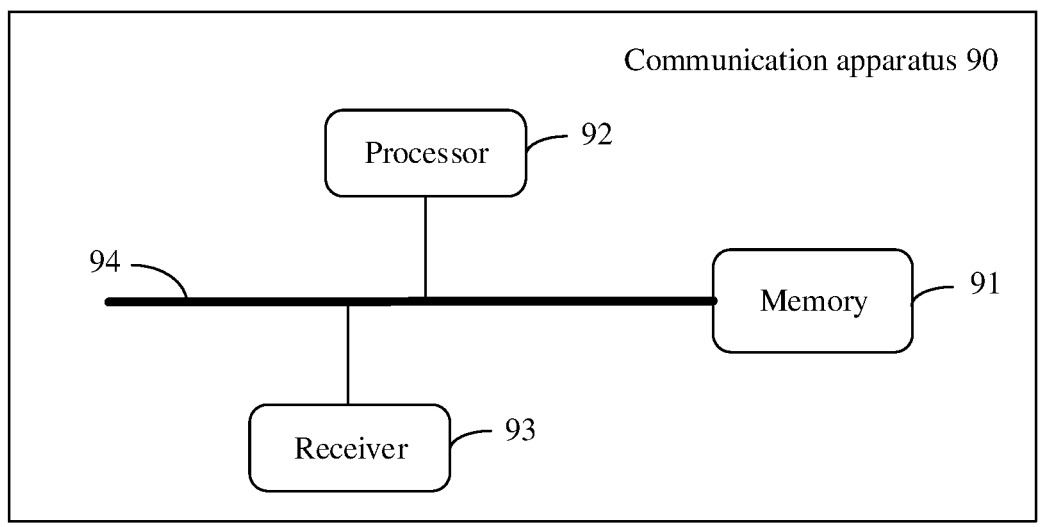
FIG. 22 is a schematic diagram of a hardware structure of a communication apparatus according to this application.

FIG. 22 is a schematic diagram of a hardware structure of a communication apparatus according to this application. The communication apparatus 90 may be disposed in a first network device. For example, the first network device may be an SMF network element or an MCF network element. Refer to FIG. 22. The communication apparatus 90 includes a memory 91, a processor 92, and a receiver 93. The memory 91 communicates with the processor 92. For example, the memory 91, the processor 92, and the receiver 93 may communicate with each other through a communication bus 94. The memory 91 is configured to store a computer program, and the processor 92 executes the computer program to implement the foregoing communication methods.

Optionally, the receiver 93 in this application may implement functions of the receiving module 41 in the embodiment in FIG. 16. The processor 92 may implement functions of the processing module 42 in the embodiment in FIG. 16. Details are not described herein again.

Optionally, the processor may be a central processing unit (CPU), or may be another general purpose processor, a digital signal processor (DSP), an application-specific integrated circuit (ASIC), or the like. The general purpose processor may be a microprocessor, or the processor may be any conventional processor or the like. Steps in the communication method embodiments disclosed with reference to this application may be directly performed by a hardware processor, or may be performed by a combination of hardware and a software module in the processor.

Figure 23:
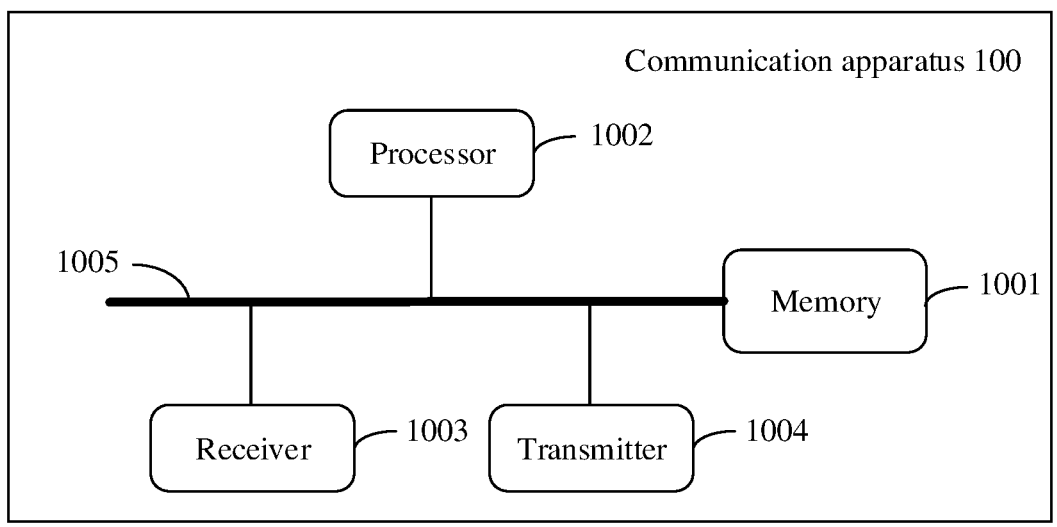
FIG. 23 is a schematic diagram of a hardware structure of a communication apparatus according to this application.

FIG. 23 is a schematic diagram of a hardware structure of a communication apparatus according to this application. The communication apparatus 100 may be disposed in an AMF network element. Refer to FIG. 23. The communication apparatus 100 includes a memory 1001, a processor 1002, a receiver 1003, and a transmitter 1004. The memory 1001 communicates with the processor 1002. For example, the memory 1001, the processor 1002, the receiver 1003, and the transmitter 1004 may communicate with each other through a communication bus 1005. The memory 1001 is configured to store a computer program, and the processor 1002 executes the computer program to implement the foregoing communication methods.

Optionally, the receiver 1003 in this application may implement functions of the receiving module 51 in the embodiments in FIG. 17 and FIG. 18. The transmitter 1004 may implement functions of the sending module 52 in the embodiments in FIG. 17 and FIG. 18. The processor 1002 may implement functions of the processing module 53 in the embodiment in FIG. 18. Details are not described herein again.

Optionally, the processor may be a central processing unit (CPU), or may be another general purpose processor, a digital signal processor (DSP), an application-specific integrated circuit (ASIC), or the like. The general purpose processor may be a microprocessor, or the processor may be any conventional processor or the like. Steps in the communication method embodiments disclosed with reference to this application may be directly performed by a hardware processor, or may be performed by a combination of hardware and a software module in the processor.

An embodiment of this application provides a readable storage medium. The storage medium is configured to store a computer program, and the computer program is used to implement the communication methods in the foregoing embodiments.

An embodiment of this application provides a communication system. The communication system includes at least two of a base station (the communication apparatus shown in FIG. 19 is disposed in the base station), an SMF network element (the communication apparatus shown in FIG. 20 or FIG. 22 is disposed in the SMF network element), an MCF network element (the communication apparatus shown in FIG. 21 or FIG. 22 is disposed in the MCF network element), or an AMF network element (the communication apparatus shown in FIG. 23 is disposed in the AMF network element).

An embodiment of this application provides a computer program product. The computer program product includes instructions; and when the instructions are executed, a computer is enabled to perform the foregoing communication methods.

An embodiment of this application provides a system-on-a-chip or a system chip. The system-on-a-chip or the system chip may be used in a base station, and includes at least one communication interface, at least one processor, and at least one memory. The communication interface, the memory, and the processor are interconnected via a bus, and the processor executes instructions stored in the memory, so that the base station can perform the foregoing communication methods.

An embodiment of this application provides a system-on-a-chip or a system chip. The system-on-a-chip or the system chip may be used in an SMF network element, and includes at least one communication interface, at least one processor, and at least one memory. The communication interface, the memory, and the processor are interconnected via a bus, and the processor executes instructions stored in the memory, so that the SMF network element can perform the foregoing communication methods.

An embodiment of this application provides a system-on-a-chip or a system chip. The system-on-a-chip or the system chip may be used in an MCF network element, and includes at least one communication interface, at least one processor, and at least one memory. The communication interface, the memory, and the processor are interconnected via a bus, and the processor executes instructions stored in the memory, so that the MCF network element can perform the foregoing communication methods.

An embodiment of this application provides a system-on-a-chip or a system chip. The system-on-a-chip or the system chip may be used in an AMF network element, and includes at least one communication interface, at least one processor, and at least one memory. The communication interface, the memory, and the processor are interconnected via a bus, and the processor executes instructions stored in the memory, so that the AMF network element can perform the foregoing communication methods.

All or some of the steps in the method embodiments may be implemented by a program instructing related hardware. The foregoing program may be stored in a readable memory. When the program is executed, the steps in the foregoing method embodiments are performed. The foregoing memory (storage medium) includes a read-only memory (ROM for short), a RAM, a flash memory, a hard disk, a solid-state drive, a magnetic tape, a floppy disk, an optical disc, and any combination thereof.

Embodiments of this application are described with reference to the flowcharts and/or block diagrams of the method, the device (system), and the computer program product according to embodiments of this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a special-purpose computer, an embedded processor, or a processing unit of another programmable data processing device to generate a machine, so that instructions executed by the computer or the processing unit of the another programmable data processing device generate an apparatus for implementing a specific function in one or more processes in the flowcharts and/or in one or more blocks in the block diagrams.

The computer program instructions may be stored in a computer-readable memory that can indicate the computer or the another programmable data processing device to work in a specific manner, so that the instructions stored in the computer-readable memory generate an artifact that includes an instruction apparatus. The instruction apparatus implements a specific function in one or more processes in the flowcharts and/or in one or more blocks in the block diagrams.

These computer program instructions may alternatively be loaded onto the computer or the another programmable data processing device, so that a series of operations and steps are performed on the computer or the another programmable device, to generate computer-implemented processing. Therefore, the instructions executed on the computer or the another programmable device provide steps for implementing a specified function in one or more processes in the flowcharts and/or in one or more blocks in the block diagrams.

It is clear that a person skilled in the art can make various modifications and variations to embodiments of this application without departing from the spirit and scope of this application. This application is intended to cover these modifications and variations of embodiments of this application provided that they fall within the scope of the claims of this application and equivalent technologies thereof.

In this application, the term "include" and variations thereof may mean non-limitative inclusion. The term "or" and variations thereof may mean "and/or". In this application, the terms "first", "second", and the like are intended to distinguish between similar objects but do not necessarily indicate a specific order or sequence. In this application, "a plurality of" means two or more than two. The term "and/or" describes an association relationship between associated objects and represents that three relationships may exist. For example, A and/or B may represent the following three cases: Only A exists, both A and B exist, and only B exists. The character "/" generally indicates an "or" relationship between associated objects.

What is claimed is:

1. A communication method, comprising:
sending, by a session management function network element, a first message to a base station, wherein the first message comprises first indication information, and the first indication information indicates a multicast session;
receiving, by the base station, the first message;
sending, by the base station, a first request message to a multicast control function network element, wherein the first request message requests to establish the multicast session corresponding to a multicast service, and the first request message comprises an identifier of the multicast service;
receiving, by the base station, multicast information of the multicast service from the multicast control function network element;
determining, by the base station, radio bearer information based on the multicast information; and
sending, by the base station, the radio bearer information corresponding to the multicast session to a terminal device based on the first message, wherein the first message comprises information indicating the terminal device, wherein the radio bearer information indicates to the terminal device to join the multicast session.

2. The method according to claim 1, wherein the first message is an N2 message.

3. The method according to claim 1, wherein
the first request message is sent in response to the base station having not established the multicast session corresponding to the multicast service.

4. The method according to claim 1, wherein the multicast information comprises: quality of service (QOS) information of a multicast QoS flow of the multicast service and an identifier of the multicast QoS flow.

5. The method according to claim 1, wherein the method further comprises:
sending, by the base station, user plane tunnel information of the multicast session on the base station to the multicast control function network element.

6. The method according to claim 1, further comprising:
receiving, by the session management function network element, a second message from a terminal device, wherein the second message requests the multicast service, and the second message comprises an identifier of the multicast service;
sending, by the session management function network element, first identification information to the multicast control function network element, wherein the first identification information is a multicast address of the multicast service or a multicast broadcast service identifier of the multicast service; and
receiving, by the session management function network element, multicast information of the multicast service from the multicast control function network element.

7. The method according to claim 1, further comprising:
selecting, by the session management function network element, the multicast control function network element based on the identifier of the multicast service.

8. A communication system, comprising: a base station, and a session management function network element, wherein
the session management function network element is configured to: send a first message to a base station, wherein the first message comprises first indication information, and the first indication information indicates a multicast session;
the base station is configured to: receive the first message, and send a first request message to a multicast control function network element, wherein the first request message requests to establish the multicast session corresponding to a multicast service, and the first request message comprises an identifier of the multicast service; and
the base station is further configured to: receive multicast information of the multicast service from the multicast control function network element, determine radio bearer information based on the multicast information, and send the radio bearer information corresponding to the multicast session to a terminal device based on the first message, wherein the first message comprises information indicating the terminal device, wherein the radio bearer information indicates to the terminal device to join the multicast session.

9. The system according to claim 8, wherein
the first request message is sent in response to the base station having not established the multicast session corresponding to the multicast service.

10. The system according to claim 8, wherein the first indication information is an identifier of the multicast session.

11. The system according to claim 8, wherein the session management function network element is further configured to:
    receive a second message from a terminal device, wherein the second message requests the multicast service, and the second message comprises an identifier of the multicast service;
    send first identification information to the multicast control function network element, wherein the first identification information is a multicast address of the multicast service or a multicast broadcast service identifier of the multicast service; and
    receive multicast information of the multicast service from the multicast control function network element.

12. The system according to claim 8, the session management function network element is further configured to select the multicast control function network element based on the identifier of the multicast service.

13. A non-transitory computer readable medium comprising computer program codes stored thereon, executable by one or more digital processors for providing system configurations, the computer program codes including instructions for implementing following operations:
    receiving a first message from a session management function network element, wherein the first message comprises first indication information, and the first indication information indicates a multicast session;
    sending a first request message to a multicast control function network element, wherein the first request message requests to establish the multicast session corresponding to a multicast service, and the first request message comprises an identifier of the multicast service;
    receiving multicast information of the multicast service from the multicast control function network element;
    determining radio bearer information based on the multicast information; and
    sending the radio bearer information corresponding to the multicast session to a terminal device based on the first message, wherein the first message comprises information indicating the terminal device, wherein the radio bearer information indicates to the terminal device to join the multicast session.

14. The non-transitory computer readable medium according to claim 13, wherein the first indication information is an identifier of the multicast session.

15. The non-transitory computer readable medium according to claim 13, wherein the first request message is sent in response to a base station having not established the multicast session corresponding to the multicast service.

16. The non-transitory computer readable medium according to claim 13, wherein the multicast information comprises: quality of service (QOS) information of a multicast QoS flow of the multicast service and an identifier of the multicast QoS flow.

17. The non-transitory computer readable medium according to claim 13, wherein the operations further comprise:
    sending user plane tunnel information of the multicast session on a base station to the multicast control function network element, where the base station is a base station accessed by the terminal device.

18. A non-transitory computer readable medium comprising computer program codes stored thereon, executable by one or more digital processors for providing system configurations, the computer program codes including instructions for implementing following operations:
    receiving a second message from a terminal device, wherein the second message requests a multicast service, and the second message comprises an identifier of the multicast service;
    sending first identification information to a multicast control function network element, wherein the first identification information is a multicast address of the multicast service or a multicast broadcast service identifier of the multicast service;
    receiving multicast information of the multicast service from the multicast control function network element; and
    sending a first message to a base station, wherein the first message comprises information indicating a terminal device to be added to a multicast session corresponding to the multicast service, the first message comprises first indication information, the first indication information indicates the multicast session, and the base station is a base station accessed by the terminal device.

19. The non-transitory computer readable medium according to claim 18, wherein the first message is an N2 message.

20. The non-transitory computer readable medium according to claim 18, wherein the operations further comprise:
    selecting the multicast control function network element based on the identifier of the multicast service.

* * * * *